US008509990B2

(12) United States Patent
Bennett et al.

(10) Patent No.: US 8,509,990 B2
(45) Date of Patent: Aug. 13, 2013

(54) SYSTEM AND METHOD FOR PERFORMING REAL-TIME DATA ANALYSIS

(75) Inventors: Peter Bennett, Mission Viejo, CA (US); Collin Shroy, Woodinville, WA (US)

(73) Assignee: Panasonic Avionics Corporation, Lake Forest, CA (US)

( * ) Notice: Subject to any disclaimer, the term of this patent is extended or adjusted under 35 U.S.C. 154(b) by 771 days.

(21) Appl. No.: 12/638,655

(22) Filed: Dec. 15, 2009

(65) Prior Publication Data

US 2010/0152962 A1 Jun. 17, 2010

Related U.S. Application Data

(60) Provisional application No. 61/122,661, filed on Dec. 15, 2008.

(51) Int. Cl.
*G01M 17/00* (2006.01)

(52) U.S. Cl.
USPC .............................................. 701/36; 707/602

(58) Field of Classification Search
USPC ............ 701/2, 14, 3, 36, 99, 29.1–29.6, 30.3, 701/31.4–31.9, 32.1, 32.2; 700/26; 707/602
See application file for complete search history.

(56) References Cited

U.S. PATENT DOCUMENTS

| | | | |
|---|---|---|---|
| 3,037,812 | A | 6/1962 | Monroe |
| 3,795,771 | A | 3/1974 | Gundersen et al. |
| 3,980,954 | A | 9/1976 | Whyte |
| 4,208,740 | A | 6/1980 | Yin et al. |
| 4,367,488 | A | 1/1983 | Leventer et al. |
| 4,428,078 | A | 1/1984 | Kuo |
| 4,584,603 | A | 4/1986 | Harrison |
| 4,742,544 | A | 5/1988 | Kupnicki et al. |
| 4,774,514 | A | 9/1988 | Hildebrandt et al. |
| 4,835,604 | A | 5/1989 | Kondo et al. |
| 4,866,515 | A | 9/1989 | Tagawa et al. |

(Continued)

FOREIGN PATENT DOCUMENTS

| | | |
|---|---|---|
| CN | 1462552 A | 12/2003 |
| CN | ZL200520103236.4 | 12/2006 |

(Continued)

OTHER PUBLICATIONS

KR, Office Action, Sep. 16, 2011.

(Continued)

*Primary Examiner* — Dalena Tran

(74) *Attorney, Agent, or Firm* — Orrick, Herrington & Sutcliffe LLP

(57) ABSTRACT

A data monitoring and analysis system suitable for performing real-time monitoring of vehicle information systems installed aboard a passenger vehicle fleet and methods for manufacturing and using same. The data monitoring and analysis system includes a loadscript system for establishing a communication channel with each vehicle information system. Continuously receiving performance data accumulated by the vehicle information systems, the loadscript system validates and parses the performance data and provides the resultant performance data to a database system for further analysis. The database system enables fleet operators to generate reports with consolidated performance data for the vehicle fleet, to stratify the performance data based upon one or more variables, and/or to drill down into subsets of the performance data to understand root causes underlying system performance. A large volume of performance data accumulated by the fleet thereby can be presented in a meaningful manner for rapid human intervention, as needed.

20 Claims, 42 Drawing Sheets

(56) References Cited

U.S. PATENT DOCUMENTS

| | | | |
|---|---|---|---|
| 4,866,704 | A | 9/1989 | Bergman |
| 4,866,732 | A | 9/1989 | Carey et al. |
| 4,887,152 | A | 12/1989 | Matsuzaki et al. |
| 4,890,104 | A | 12/1989 | Takanabe et al. |
| 4,896,209 | A | 1/1990 | Matsuzaki et al. |
| 4,897,714 | A | 1/1990 | Ichise et al. |
| 4,939,527 | A | 7/1990 | Lamberty et al. |
| 4,958,381 | A | 9/1990 | Toyoshima |
| 4,975,696 | A | 12/1990 | Salter, Jr. et al. |
| 5,005,183 | A | 4/1991 | Carey et al. |
| 5,027,124 | A | 6/1991 | Fitzsimmons et al. |
| 5,034,808 | A | 7/1991 | Murray |
| 5,123,015 | A | 6/1992 | Brady, Jr. et al. |
| 5,136,304 | A | 8/1992 | Peters |
| 5,151,896 | A | 9/1992 | Bowman et al. |
| 5,177,616 | A | 1/1993 | Riday |
| 5,208,590 | A | 5/1993 | Pitts |
| 5,237,659 | A | 8/1993 | Takats |
| 5,247,414 | A | 9/1993 | Mitchell et al. |
| 5,276,455 | A | 1/1994 | Fitzsimmons et al. |
| 5,289,272 | A | 2/1994 | Rabowsky et al. |
| 5,295,089 | A | 3/1994 | Ambasz |
| 5,311,302 | A | 5/1994 | Berry et al. |
| 5,311,515 | A | 5/1994 | Henderson et al. |
| 5,325,131 | A | 6/1994 | Penney |
| 5,343,456 | A | 8/1994 | Maeda |
| 5,383,178 | A | 1/1995 | Unverrich |
| 5,390,326 | A | 2/1995 | Shah |
| 5,410,754 | A | 4/1995 | Klotzbach et al. |
| 5,444,762 | A | 8/1995 | Frey et al. |
| 5,463,656 | A | 10/1995 | Polivka et al. |
| 5,469,363 | A | 11/1995 | Saliga |
| 5,481,478 | A | 1/1996 | Palmieri et al. |
| 5,493,702 | A | 2/1996 | Crowley et al. |
| 5,524,272 | A | 6/1996 | Podowski et al. |
| 5,543,805 | A | 8/1996 | Thaniyavarn |
| 5,555,466 | A | 9/1996 | Scribner et al. |
| 5,557,656 | A | 9/1996 | Ray et al. |
| 5,568,484 | A | 10/1996 | Margis |
| 5,596,647 | A | 1/1997 | Wakai et al. |
| 5,610,822 | A | 3/1997 | Murphy |
| 5,617,331 | A | 4/1997 | Wakai et al. |
| 5,640,002 | A | 6/1997 | Ruppert et al. |
| 5,666,291 | A | 9/1997 | Scott et al. |
| 5,701,582 | A | 12/1997 | DeBey |
| 5,706,353 | A | 1/1998 | Arai et al. |
| 5,709,448 | A | 1/1998 | Jennings et al. |
| 5,711,014 | A | 1/1998 | Crowley et al. |
| 5,745,159 | A | 4/1998 | Wax et al. |
| 5,751,248 | A | 5/1998 | Thaniyavarn |
| 5,760,819 | A | 6/1998 | Sklar et al. |
| 5,790,175 | A | 8/1998 | Sklar et al. |
| 5,790,787 | A | 8/1998 | Scott et al. |
| 5,801,751 | A | 9/1998 | Sklar et al. |
| 5,808,660 | A | 9/1998 | Sekine et al. |
| 5,832,380 | A | 11/1998 | Ray et al. |
| 5,835,127 | A | 11/1998 | Booth et al. |
| 5,857,869 | A | 1/1999 | Parcel et al. |
| 5,878,345 | A | 3/1999 | Ray et al. |
| 5,884,166 | A | 3/1999 | Ray et al. |
| 5,889,268 | A | 3/1999 | Swartz |
| 5,889,775 | A | 3/1999 | Sawicz et al. |
| 5,929,895 | A | 7/1999 | Berry et al. |
| 5,950,129 | A | 9/1999 | Schmid et al. |
| 5,953,429 | A | 9/1999 | Wakai et al. |
| 5,959,596 | A | 9/1999 | McCarten et al. |
| 5,960,343 | A | 9/1999 | Ray et al. |
| 5,966,442 | A | 10/1999 | Sachdev |
| 5,973,722 | A | 10/1999 | Wakai et al. |
| 5,990,928 | A | 11/1999 | Sklar et al. |
| 6,003,008 | A | 12/1999 | Postrel et al. |
| 6,014,381 | A | 1/2000 | Troxel et al. |
| 6,020,848 | A | 2/2000 | Wallace et al. |
| 6,047,165 | A | 4/2000 | Wright et al. |
| 6,058,288 | A | 5/2000 | Reed et al. |
| 6,078,297 | A | 6/2000 | Kormanyos |
| 6,078,348 | A | 6/2000 | Klosterman et al. |
| 6,108,523 | A | 8/2000 | Wright et al. |
| 6,108,539 | A | 8/2000 | Ray et al. |
| 6,129,274 | A | 10/2000 | Suzuki |
| 6,130,727 | A | 10/2000 | Toyozumi |
| 6,135,549 | A | 10/2000 | Demick et al. |
| 6,137,377 | A | 10/2000 | Wallace et al. |
| 6,151,497 | A | 11/2000 | Yee et al. |
| 6,154,186 | A | 11/2000 | Smith et al. |
| 6,160,998 | A | 12/2000 | Wright et al. |
| 6,163,681 | A | 12/2000 | Wright et al. |
| 6,167,238 | A | 12/2000 | Wright |
| 6,173,159 | B1 | 1/2001 | Wright et al. |
| 6,177,887 | B1 | 1/2001 | Jerome |
| 6,181,990 | B1 | 1/2001 | Grabowsky et al. |
| 6,201,797 | B1 | 3/2001 | Leuca et al. |
| 6,208,307 | B1 | 3/2001 | Frisco et al. |
| 6,216,065 | B1 | 4/2001 | Hall et al. |
| 6,249,913 | B1 | 6/2001 | Galipeau et al. |
| 6,271,728 | B1 | 8/2001 | Wallace et al. |
| 6,278,936 | B1 | 8/2001 | Jones |
| 6,285,878 | B1 | 9/2001 | Lai |
| 6,308,045 | B1 | 10/2001 | Wright et al. |
| 6,321,084 | B1 | 11/2001 | Horrer |
| 6,338,045 | B1 | 1/2002 | Pappas |
| 6,351,247 | B1 | 2/2002 | Linstrom et al. |
| 6,356,239 | B1 | 3/2002 | Carson |
| 6,370,656 | B1 | 4/2002 | Olarig et al. |
| 6,377,802 | B1 | 4/2002 | McKenna et al. |
| 6,390,920 | B1 | 5/2002 | Infiesto et al. |
| 6,392,692 | B1 | 5/2002 | Monroe |
| 6,400,315 | B1 | 6/2002 | Adler et al. |
| 6,408,180 | B1 | 6/2002 | McKenna et al. |
| 6,414,644 | B1 | 7/2002 | Desargant et al. |
| 6,417,803 | B1 | 7/2002 | de La Chapelle et al. |
| 6,424,313 | B1 | 7/2002 | Navarro et al. |
| 6,483,458 | B1 | 11/2002 | Carson |
| 6,484,011 | B1 | 11/2002 | Thompson et al. |
| 6,487,540 | B1 | 11/2002 | Smith et al. |
| 6,499,027 | B1 | 12/2002 | Weinberger |
| 6,507,279 | B2 | 1/2003 | Loof |
| 6,507,952 | B1 | 1/2003 | Miller et al. |
| 6,519,693 | B1 | 2/2003 | Debey |
| 6,522,867 | B1 | 2/2003 | Wright et al. |
| 6,529,706 | B1 | 3/2003 | Mitchell |
| 6,538,656 | B1 | 3/2003 | Cheung et al. |
| 6,542,086 | B2 | 4/2003 | Baumgartner et al. |
| 6,549,754 | B1 | 4/2003 | Miller et al. |
| 6,559,812 | B1 | 5/2003 | McCarten et al. |
| 6,570,881 | B1 | 5/2003 | Wils et al. |
| 6,574,338 | B1 | 6/2003 | Sachdev |
| 6,580,402 | B2 | 6/2003 | Navarro et al. |
| 6,594,471 | B1 | 7/2003 | Crowley et al. |
| 6,598,227 | B1 | 7/2003 | Berry et al. |
| 6,600,418 | B2 | 7/2003 | Francis et al. |
| 6,606,056 | B2 | 8/2003 | Brogden |
| 6,609,103 | B1 | 8/2003 | Kolls |
| 6,611,537 | B1 | 8/2003 | Edens et al. |
| 6,618,580 | B2 | 9/2003 | Parrott et al. |
| 6,622,124 | B1 | 9/2003 | Kolls |
| 6,628,235 | B2 | 9/2003 | Wight |
| 6,637,484 | B1 | 10/2003 | Kraft |
| 6,643,510 | B2 | 11/2003 | Taylor |
| 6,650,898 | B2 | 11/2003 | Jochim et al. |
| 6,658,595 | B1 | 12/2003 | Thamattoor |
| 6,661,353 | B1 | 12/2003 | Gopen |
| 6,674,339 | B2 | 1/2004 | Kormanyos |
| 6,674,398 | B2 | 1/2004 | Murphy |
| 6,693,236 | B1 | 2/2004 | Gould et al. |
| 6,703,974 | B2 | 3/2004 | White et al. |
| 6,707,346 | B2 | 3/2004 | Tillotson et al. |
| 6,708,019 | B2 | 3/2004 | McLain et al. |
| 6,714,163 | B2 | 3/2004 | Navarro et al. |
| 6,725,035 | B2 | 4/2004 | Jochim et al. |
| 6,728,535 | B2 | 4/2004 | Parkman |
| 6,731,909 | B2 | 5/2004 | McLain et al. |
| 6,736,315 | B2 | 5/2004 | Swartz |
| 6,741,141 | B2 | 5/2004 | Kormanyos |

| | | | |
|---|---|---|---|
| 6,741,841 | B1 | 5/2004 | Mitchell |
| 6,745,010 | B2 | 6/2004 | Wright et al. |
| 6,747,960 | B2 | 6/2004 | Tillotson |
| 6,748,597 | B1 | 6/2004 | Frisco et al. |
| 6,757,712 | B1 | 6/2004 | Bastian et al. |
| 6,771,608 | B2 | 8/2004 | Tillotson |
| 6,775,545 | B2 | 8/2004 | Wright et al. |
| 6,778,825 | B2 | 8/2004 | Parkman |
| 6,782,392 | B1 | 8/2004 | Weinberger et al. |
| 6,785,526 | B2 | 8/2004 | McLain et al. |
| 6,788,935 | B1 | 9/2004 | McKenna et al. |
| 6,796,495 | B2 | 9/2004 | Stahl et al. |
| 6,807,148 | B1 | 10/2004 | Eicher |
| 6,807,538 | B1 | 10/2004 | Weinberger et al. |
| 6,810,527 | B1 | 10/2004 | Conrad et al. |
| 6,844,855 | B2 | 1/2005 | Carson |
| 6,847,801 | B2 | 1/2005 | de La Chapelle et al. |
| 6,876,905 | B2 | 4/2005 | Farley et al. |
| 6,885,845 | B1 | 4/2005 | Crowley et al. |
| 6,885,863 | B2 | 4/2005 | Parkman et al. |
| 6,885,864 | B2 | 4/2005 | McKenna et al. |
| 6,889,042 | B2 | 5/2005 | Rousseau et al. |
| 6,892,052 | B2 | 5/2005 | Kotola et al. |
| 6,899,390 | B2 | 5/2005 | Sanfrod et al. |
| 6,937,164 | B2 | 8/2005 | Thomson et al. |
| 6,940,978 | B2 | 9/2005 | Parkman |
| 6,941,111 | B2 | 9/2005 | McLain et al. |
| 6,946,990 | B2 | 9/2005 | Monk |
| 6,947,726 | B2 | 9/2005 | Rockwell |
| 6,947,733 | B2 | 9/2005 | Tillotson |
| 6,959,168 | B2 | 10/2005 | Parkman |
| 6,963,304 | B2 | 11/2005 | Murphy |
| 6,965,851 | B2 | 11/2005 | Tillotson |
| 6,971,608 | B2 | 12/2005 | Harrington et al. |
| 6,973,479 | B2 | 12/2005 | Brady, Jr. et al. |
| 6,975,616 | B2 | 12/2005 | Stephenson et al. |
| 6,983,312 | B1 | 1/2006 | O'Neil |
| 6,985,588 | B1 | 1/2006 | Glick |
| 6,985,942 | B2 | 1/2006 | D'Annunzio et al. |
| 6,990,338 | B2 | 1/2006 | Miller et al. |
| 6,993,288 | B2 | 1/2006 | de La Chapelle et al. |
| 7,003,293 | B2 | 2/2006 | D'Annunzio |
| 7,023,996 | B2 | 4/2006 | Stephenson et al. |
| 7,036,889 | B2 | 5/2006 | Sanfrod et al. |
| 7,054,593 | B2 | 5/2006 | de La Chapelle et al. |
| 7,062,268 | B2 | 6/2006 | McKenna |
| 7,068,615 | B2 | 6/2006 | Niesen |
| 7,072,634 | B2 | 7/2006 | Tillotson |
| 7,085,563 | B2 | 8/2006 | Parkman |
| 7,099,665 | B2 | 8/2006 | Taylor |
| 7,100,187 | B2 | 8/2006 | Pierzga et al. |
| 7,107,062 | B2 | 9/2006 | Cruz et al. |
| 7,113,780 | B2 | 9/2006 | McKenna et al. |
| 7,120,389 | B2 | 10/2006 | de La Chapelle et al. |
| 7,123,199 | B2 | 10/2006 | Rotta |
| 7,124,426 | B1 | 10/2006 | Tsuria et al. |
| 7,136,621 | B2 | 11/2006 | de La Chapelle et al. |
| 7,139,258 | B2 | 11/2006 | Tillotson |
| 7,155,168 | B2 | 12/2006 | McLain et al. |
| 7,161,788 | B2 | 1/2007 | Richie et al. |
| 7,162,235 | B1 | 1/2007 | Gilbert |
| 7,171,197 | B2 | 1/2007 | Miller et al. |
| 7,177,638 | B2 | 2/2007 | Funderburk et al. |
| 7,187,690 | B2 | 3/2007 | Taylor |
| 7,187,927 | B1 | 3/2007 | Mitchell |
| 7,233,958 | B2 | 6/2007 | Weng |
| 7,250,915 | B2 | 7/2007 | Nelson |
| 7,274,336 | B2 | 9/2007 | Carson |
| 7,280,825 | B2 | 10/2007 | Keen et al. |
| 7,286,503 | B1 | 10/2007 | Clarke et al. |
| 7,299,013 | B2 | 11/2007 | Rotta et al. |
| 7,302,226 | B2 | 11/2007 | Stephenson |
| 7,321,383 | B2 | 1/2008 | Monagahn et al. |
| 7,328,012 | B2 | 2/2008 | Ziarno et al. |
| 7,330,151 | B1 | 2/2008 | Monk et al. |
| 7,343,157 | B1 | 3/2008 | Mitchell |
| 7,359,700 | B2 | 4/2008 | Swensen et al. |
| 7,362,262 | B2 | 4/2008 | Murphy |
| 7,382,327 | B2 | 6/2008 | Nelson |
| 7,400,858 | B2 | 7/2008 | Crowley et al. |
| 7,406,309 | B2 | 7/2008 | Usher et al. |
| 7,414,573 | B2 | 8/2008 | Murphy |
| 7,437,125 | B2 | 10/2008 | McLain et al. |
| 7,450,901 | B2 | 11/2008 | Parkman |
| 7,454,202 | B2 | 11/2008 | de La Chapelle |
| 7,454,203 | B2 | 11/2008 | Levitan |
| 7,460,866 | B2 | 12/2008 | Salkini et al. |
| 7,483,696 | B1 | 1/2009 | Mitchell |
| 7,486,927 | B2 | 2/2009 | Kallio et al. |
| 7,496,361 | B1 | 2/2009 | Mitchell et al. |
| 7,508,342 | B2 | 3/2009 | Nelson |
| 2002/0013150 | A1 | 1/2002 | McKenna et al. |
| 2002/0045444 | A1 | 4/2002 | Usher et al. |
| 2002/0046406 | A1 | 4/2002 | Chelehmal et al. |
| 2002/0059363 | A1 | 5/2002 | Katz et al. |
| 2002/0059614 | A1 | 5/2002 | Lipsanen et al. |
| 2002/0065698 | A1 | 5/2002 | Schick |
| 2002/0065711 | A1 | 5/2002 | Fujisawa et al. |
| 2002/0087992 | A1 | 7/2002 | Bengeult et al. |
| 2002/0094829 | A1 | 7/2002 | Ritter |
| 2002/0095680 | A1 | 7/2002 | Davidson |
| 2002/0152470 | A1 | 10/2002 | Hammond |
| 2002/0162113 | A1 | 10/2002 | Hunter |
| 2002/0164960 | A1 | 11/2002 | Slaughter et al. |
| 2002/0170060 | A1 | 11/2002 | Lyman |
| 2002/0178451 | A1 | 11/2002 | Ficco |
| 2002/0184555 | A1 | 12/2002 | Wong |
| 2002/0197990 | A1 | 12/2002 | Jochim et al. |
| 2003/0003899 | A1 | 1/2003 | Tashiro et al. |
| 2003/0008652 | A1 | 1/2003 | Jochim et al. |
| 2003/0043760 | A1 | 3/2003 | Taylor |
| 2003/0047647 | A1 | 3/2003 | Poblete |
| 2003/0055975 | A1 | 3/2003 | Nelson et al. |
| 2003/0060190 | A1 | 3/2003 | Mallart |
| 2003/0069015 | A1 | 4/2003 | Brinkley et al. |
| 2003/0069990 | A1 | 4/2003 | D'Annunzio et al. |
| 2003/0084130 | A1 | 5/2003 | D'Annunzio |
| 2003/0084451 | A1 | 5/2003 | Pierzga et al. |
| 2003/0085818 | A1 | 5/2003 | Renton et al. |
| 2003/0087672 | A1 | 5/2003 | Kattukaran et al. |
| 2003/0093798 | A1 | 5/2003 | Rogerson |
| 2003/0095110 | A1 | 5/2003 | Ukita et al. |
| 2003/0107248 | A1 | 6/2003 | Sanford et al. |
| 2003/0130769 | A1 | 7/2003 | Farley et al. |
| 2003/0148736 | A1 | 8/2003 | Wright et al. |
| 2003/0160710 | A1 | 8/2003 | Baumgartner et al. |
| 2003/0184449 | A1 | 10/2003 | Baumgartner et al. |
| 2003/0217363 | A1 | 11/2003 | Brady, Jr. et al. |
| 2003/0233658 | A1 | 12/2003 | Keen et al. |
| 2004/0001303 | A1 | 1/2004 | Doblar et al. |
| 2004/0077308 | A1 | 4/2004 | Sanford et al. |
| 2004/0078821 | A1 | 4/2004 | Frisco et al. |
| 2004/0098745 | A1 | 5/2004 | Marston et al. |
| 2004/0108963 | A1 | 6/2004 | Clymer et al. |
| 2004/0123322 | A1 | 6/2004 | Erkocevic et al. |
| 2004/0139467 | A1 | 7/2004 | Rogerson et al. |
| 2004/0142658 | A1 | 7/2004 | McKenna et al. |
| 2004/0147243 | A1 | 7/2004 | McKenna |
| 2004/0158863 | A1 | 8/2004 | McLain |
| 2004/0167967 | A1 | 8/2004 | Bastian et al. |
| 2004/0183346 | A1 | 9/2004 | Sanford et al. |
| 2004/0198346 | A1 | 10/2004 | Swensen et al. |
| 2004/0235469 | A1 | 11/2004 | Krug |
| 2004/0252965 | A1 | 12/2004 | Moreno et al. |
| 2004/0252966 | A1 | 12/2004 | Holloway et al. |
| 2004/0253951 | A1 | 12/2004 | Chang et al. |
| 2005/0021602 | A1 | 1/2005 | Noel et al. |
| 2005/0026608 | A1 | 2/2005 | Kallio et al. |
| 2005/0044564 | A1 | 2/2005 | Stopniewicz |
| 2005/0067530 | A1 | 3/2005 | Schafer, Jr. et al. |
| 2005/0114894 | A1 | 5/2005 | Hoerl |
| 2005/0136917 | A1 | 6/2005 | Taylor |
| 2005/0171653 | A1 | 8/2005 | Taylor |
| 2005/0176368 | A1 | 8/2005 | Young et al. |
| 2005/0177763 | A1 | 8/2005 | Stoler |
| 2005/0181723 | A1 | 8/2005 | Miller et al. |
| 2005/0193257 | A1 | 9/2005 | Stoler |
| 2005/0202785 | A1 | 9/2005 | Meyer |

| | | | |
|---|---|---|---|
| 2005/0215249 | A1 | 9/2005 | Little et al. |
| 2005/0216938 | A1 | 9/2005 | Brady et al. |
| 2005/0239261 | A1 | 10/2005 | Tai et al. |
| 2005/0251798 | A1 | 11/2005 | Fraley |
| 2005/0256616 | A1 | 11/2005 | Rhoads |
| 2005/0268319 | A1 | 12/2005 | Brady, Jr. |
| 2005/0270373 | A1 | 12/2005 | Trela |
| 2005/0273823 | A1 | 12/2005 | Brady, Jr. et al. |
| 2005/0278753 | A1 | 12/2005 | Brady, Jr. et al. |
| 2005/0278754 | A1 | 12/2005 | Bleacher et al. |
| 2005/0281223 | A1 | 12/2005 | D'Annunzio |
| 2006/0006287 | A1 | 1/2006 | Ferguson et al. |
| 2006/0010438 | A1 | 1/2006 | Brady, Jr. et al. |
| 2006/0030311 | A1 | 2/2006 | Cruz et al. |
| 2006/0032979 | A1 | 2/2006 | Mitchell et al. |
| 2006/0040612 | A1 | 2/2006 | Min |
| 2006/0040660 | A1 | 2/2006 | Cruz et al. |
| 2006/0048196 | A1 | 3/2006 | Yau |
| 2006/0088001 | A1 | 4/2006 | Reitmann et al. |
| 2006/0107295 | A1 | 5/2006 | Margis et al. |
| 2006/0143662 | A1 | 6/2006 | Easterling et al. |
| 2006/0154601 | A1 | 7/2006 | Tewalt et al. |
| 2006/0174285 | A1 | 8/2006 | Brady et al. |
| 2006/0183450 | A1 | 8/2006 | Cameron |
| 2006/0212909 | A1 | 9/2006 | Girard et al. |
| 2006/0217121 | A1 | 9/2006 | Soliman et al. |
| 2006/0234700 | A1 | 10/2006 | Funderburk et al. |
| 2006/0250947 | A1 | 11/2006 | Allen |
| 2006/0264173 | A1 | 11/2006 | Gilbert |
| 2006/0270373 | A1 | 11/2006 | So |
| 2006/0270470 | A1 | 11/2006 | de La Chapelle et al. |
| 2006/0276127 | A1 | 12/2006 | Cruz et al. |
| 2006/0277589 | A1 | 12/2006 | Margis et al. |
| 2006/0293190 | A1 | 12/2006 | Watson et al. |
| 2007/0021117 | A1 | 1/2007 | McKenna et al. |
| 2007/0022018 | A1 | 1/2007 | Suryanarayana et al. |
| 2007/0025240 | A1 | 2/2007 | Snide |
| 2007/0026795 | A1 | 2/2007 | de La Chapelle |
| 2007/0042772 | A1 | 2/2007 | Salkini et al. |
| 2007/0044126 | A1 | 2/2007 | Mitchell |
| 2007/0060133 | A1 | 3/2007 | Spitzer et al. |
| 2007/0112487 | A1 | 5/2007 | Avery |
| 2007/0155421 | A1 | 7/2007 | Alberth et al. |
| 2007/0202802 | A1 | 8/2007 | Kallio et al. |
| 2007/0213009 | A1 | 9/2007 | Higashida et al. |
| 2007/0258417 | A1 | 11/2007 | Harvey et al. |
| 2007/0298741 | A1 | 12/2007 | Harnist et al. |
| 2008/0004016 | A1 | 1/2008 | Smee et al. |
| 2008/0023600 | A1 | 1/2008 | Perlman |
| 2008/0040756 | A1 | 2/2008 | Perlman |
| 2008/0084882 | A1 | 4/2008 | Eruchimovitch |
| 2008/0085691 | A1 | 4/2008 | Harvey et al. |
| 2008/0090567 | A1 | 4/2008 | Gilbert |
| 2008/0125112 | A1 | 5/2008 | Clarke et al. |
| 2008/0130539 | A1 | 6/2008 | Lauer et al. |
| 2008/0133705 | A1 | 6/2008 | Lemond et al. |
| 2008/0141314 | A1 | 6/2008 | Lemond et al. |
| 2008/0181169 | A1 | 7/2008 | Lauer et al. |
| 2008/0182573 | A1 | 7/2008 | Lauer et al. |
| 2008/0255722 | A1 | 10/2008 | McClellan |
| 2008/0274734 | A1 | 11/2008 | Kostanic et al. |
| 2008/0299965 | A1 | 12/2008 | Lagerman |
| 2008/0305762 | A1 | 12/2008 | Malosh |
| 2009/0010200 | A1 | 1/2009 | Lauer et al. |
| 2009/0094635 | A1 | 4/2009 | Aslin et al. |
| 2009/0157255 | A1* | 6/2009 | Plante ............................ 701/35 |
| 2009/0186611 | A1* | 7/2009 | Stiles et al. .................. 455/431 |

FOREIGN PATENT DOCUMENTS

| | | | |
|---|---|---|---|
| DE | 102007006227 | A1 | 8/2008 |
| DE | 102007018139 | A1 | 10/2008 |
| EP | 0 577 054 | B1 | 1/1994 |
| EP | 0 767 594 | A2 | 9/1997 |
| EP | 0 890 907 | A1 | 1/1999 |
| EP | 0 930 513 | A2 | 7/1999 |
| EP | 1 217 833 | A2 | 6/2002 |
| EP | 1 231 534 | A1 | 8/2002 |
| EP | 1 217 833 | A3 | 4/2004 |
| JP | H06-285259 | A | 10/1994 |
| JP | H09-512401 | A | 11/1995 |
| JP | 2003-534959 | A | 4/2000 |
| JP | 2002-34059 | A | 1/2002 |
| JP | 2002-77084 | A | 3/2002 |
| JP | 2004-343744 | A | 12/2004 |
| JP | 2004-352071 | A | 12/2004 |
| JP | 2005-045490 | A | 2/2005 |
| JP | 2005-508098 | A | 3/2005 |
| JP | 2005-528030 | A | 9/2005 |
| JP | 2006-252422 | A | 9/2006 |
| JP | 2006-527540 | A | 11/2006 |
| WO | WO 95/29552 | A1 | 11/1995 |
| WO | WO 99/31821 | | 6/1999 |
| WO | WO 02/15582 | A1 | 2/2002 |
| WO | WO 02/084971 | A2 | 10/2002 |
| WO | WO 03/032503 | A2 | 4/2003 |
| WO | WO 03/050000 | A1 | 6/2003 |
| WO | WO 2004/003696 | A2 | 1/2004 |
| WO | WO 2004/003696 | A3 | 1/2004 |
| WO | WO 2004/008277 | A2 | 1/2004 |
| WO | 2005/120068 | A3 | 12/2005 |
| WO | WO 2005/120068 | A3 | 12/2005 |
| WO | WO 2006/062641 | A2 | 6/2006 |
| WO | WO 2006/065381 | A2 | 6/2006 |
| WO | WO 2007/035739 | A2 | 3/2007 |

OTHER PUBLICATIONS

WO International Search Report, Apr. 12, 2010.
US, Notice of Allowance, U.S. Appl. No. 08/480,666, Sep. 5, 1996.
US, Office Action, U.S. Appl. No. 08/480,666, Feb. 9, 1996.
US, Office Action, U.S. Appl. No. 08/480,666, Oct. 16, 1996.
US, Office Action, U.S. Appl. No. 08/480,666, Nov. 22, 1996.
US, Office Action, U.S. Appl. No. 10/773,523, Oct. 5, 2006.
US, Office Action, U.S. Appl. No. 10/722,565, Mar. 4, 2009.
US, Office Action, U.S. Appl. No. 10/722,565, Jul. 7, 2010.
US, Office Action, U.S. Appl. No. 10/722,565, Nov. 24, 2009.
PCT, Int'l. Search Report, Appl. No. PCT/US2004/017666, Feb. 4, 2005.
EP, Office Action, Appl. No. 04 754 296.4-1241, Apr. 4, 2007.
AU, Office Action, Appl. No. 2004251677, Sep. 26, 2008.
US, Notice of Allowance, U.S. Appl. No. 11/277,896, Oct. 23, 2009.
US, Office Action, U.S. Appl. No. 11/277,896, Apr. 14, 2009.
EP, Office Action, App. No. 06 740 274.3-2416, Jan. 31, 2008.
EP, Office Action, App. No. 06 740 274.3-2416, Sep. 17, 2008.
EP, Office Action, App. No. 06 740 274.3-2416, Mar. 20, 2009.
PCT, Int'l Search Report, Appl. No. PCT/US2006/012067, Aug. 9, 2006.
PCT, Int'l Prel. Exam. Report, Appl. No. PCT/US2006/012067, Oct. 11, 2007.
US, Office Action, U.S. Appl. No. 11/123,327, Jan. 6, 2010.
US, Office Action, U.S. Appl. No. 11/123,327, Jul. 20, 2010.
US, Office Action, U.S. Appl. No. 11/123,327, Oct. 14, 2009.
US, Office Action, U.S. Appl. No. 11/123,327, Dec. 11, 2008.
PCT, Int'l. Search Report, Appl. No. PCT/US2005/016513, Aug. 9, 2005.
PCT, Int'l. Prel. Exam. Report, Appl. No. PCT/US2005/016513, Nov. 16, 2006.
EP, Office Action, Appl. No. 05 749 692.9-1525, Jun. 7, 2010.
EP, Office Action, Appl. No. 05 749 692.9-1525, Jun. 15, 2007.
EP, Office Action, Appl. No. 05 749 692.9-1525, Oct. 22, 2008.
US, Office Action, U.S. Appl. No. 11/154,749, Jan. 23, 2009.
US, Office Action, U.S. Appl. No. 11/154,749, Aug. 18, 2008.
US, Office Action, U.S. Appl. No. 11/154,749, Jun. 7, 2010.
US, Office Action, U.S. Appl. No. 11/154,749, Oct. 26, 2009.
EP, Office Action, Appl. No. 05 762 201.1-2202, May 18, 2007.
EP, Office Action, Appl. No. 05 762 201.1-2202, Jul. 18, 2008.
PCT, Int'l. Prel. Report, Appl. No. PCT/US2005/021518, Jan. 4, 2007.
PCT, Int'l. Search Report, Appl. No. PCT/US2005/021518, Jan. 3, 2006.
US, Office Action, U.S. Appl. No. 11/269,378, Apr. 28, 2009.
US, Office Action, U.S. Appl. No. 11/269,378, Aug. 20, 2008.
US, Notice of Allowance, U.S. Appl. No. 11/269,378, Jan. 5, 2010.

PCT, Int'l. Prel. Report, Appl. No. PCT/US2005/040380, May 18, 2007.
PCT, Int'l. Search Report, Appl. No. PCT/US2005/040380, Mar. 15, 2006.
PCT, Int'l. Prel. Report, Appl. No. PCT/US2008/076281, Mar. 25, 2010.
PCT, Int'l. Search Report, Appl. No. PCT/US2008/076281, Jan. 13, 2009.
PCT, Int'l. Prel. Report, Appl. No. PCT/US2008/076285, Mar. 25, 2010.
PCT, Int'l. Search Report, Appl. No. PCT/US2008/076285, Dec. 30, 2008.
PCT, Int'l. Search Report, Appl. No. PCT/US2008/076290, Jan. 30, 2009.
PCT, Int'l. Prel. Report, Appl. No. PCT/US2008/076290, Mar. 25, 2010.
PCT, Int'l. Search Report, Appl. No. PCT/US2008/076294, Dec. 29, 2008.
PCT, Int'l. Prel. Report, Appl. No. PCT/US2008/076294, Sep. 14, 2007.
PCT, Int'l. Prel. Report, Appl. No. PCT/US2008/077562, Apr. 1, 2010.
PCT, Int'l. Search Report, Appl. No. PCT/US2008/077562, Jun. 12, 2009.
PCT, Int'l. Prel. Report, Appl. No. PCT/US2008/078838, Apr. 15, 2010.
PCT, Int'l. Search Report, Appl. No. PCT/US2008/078838, Jan. 16, 2009.
PCT, Int'l. Search Report, Appl. No. PCT/US2009/033421, Jun. 16, 2009.
Chen Y. et al., Personalized Multimedia Services Using a Mobile Service Platform, 2002 IEEE, 0/7803/7376/6/02, Mar. 17, 2002, pp. 918/925.
Gratschew, S., et al., A Multimedia Messaging Platform for Content Delivering, 2003 IEEE, 0/7803/7661/7/03, Feb. 23, 2003, pp. 431/435.
A. Ibenthal, et al.,"Multimedia im Fahrzeug: Dienste und Technik", Fernseh und Kino/Technik 54, Jahrgag Nr. 3/20, pp. 100/105.
CN Office Action, Appl. No. 200880107132.7, Jul. 22, 2011.
EP, Office Action, EP Application No. 08 830 787.1, Dec. 9, 2011.
CN, 200880117151.8 Office Action with English translation, Aug. 24, 2012.
JP, 2010-527121 Office Action with English translation, Jul. 12, 2012.
JP, Office Action, JP Application No. 2011-542349, Nov. 27, 2012.
CN, Office Action, CN Application No. 200880115267.8, Dec. 24, 2012.
JP, Office Action, JP Application No. 2010-525047, Dec. 25, 2012.
Office Action, CN Appln No. 200880115267.8, Dec. 24, 2012.
Office Action, JP Appln No. 2010-525045, Mar. 5, 2013.
Office Action, JP Appln No. 2010-525046, Mar. 5, 2013.
Office Action, CN Appln No. 20880107089.4, Mar. 7, 2013.

* cited by examiner

FIG. 6A

1000

1400

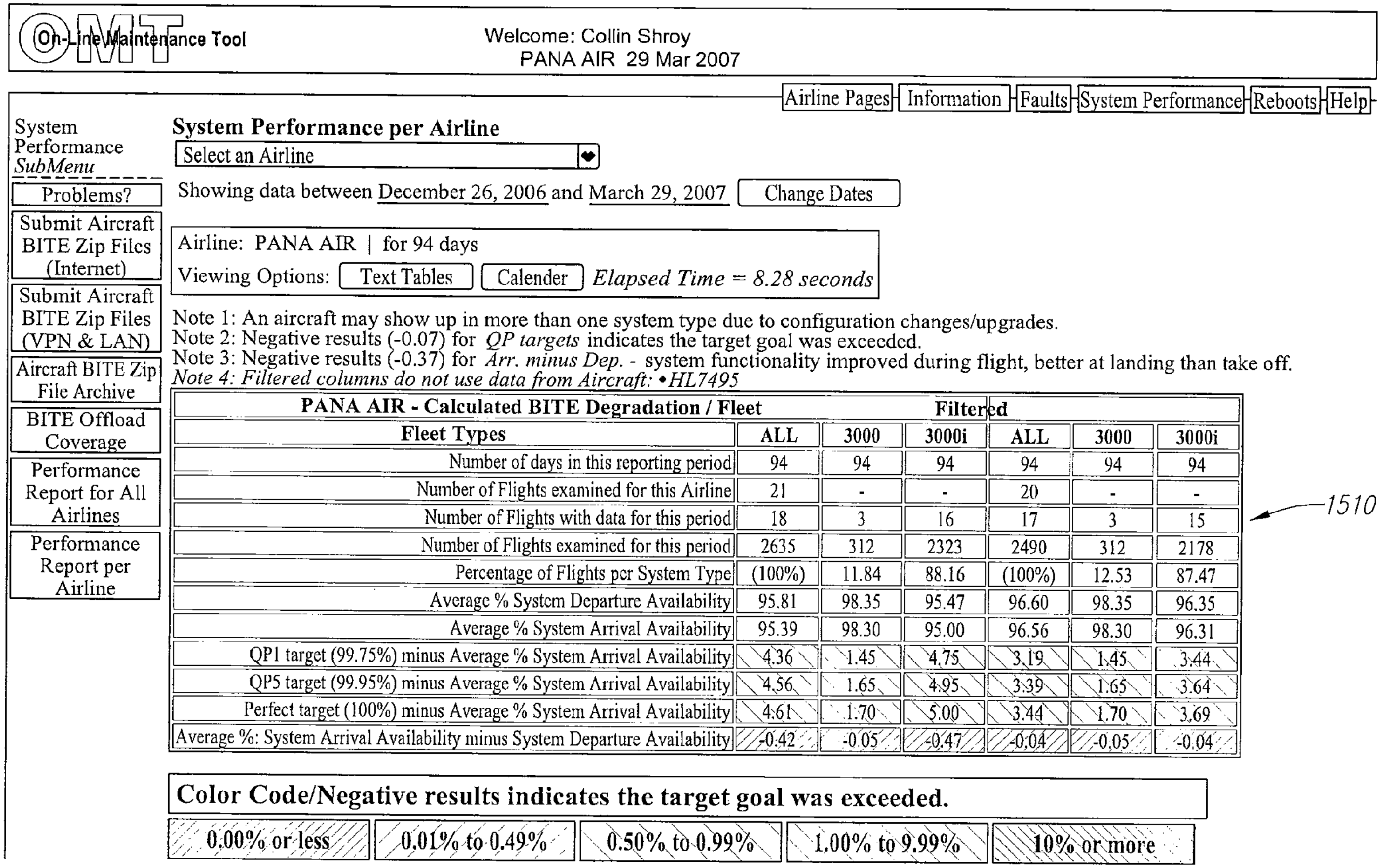

On-Line Maintenance Tool

Welcome: Collin Shroy
PANA AIR 29 Mar 2007

Airline Pages | Information | Faults | System Performance | Reboots | Help

System Performance SubMenu

- Problems?
- Submit Aircraft BITE Zip Files (Internet)
- Submit Aircraft BITE Zip Files (VPN & LAN)
- Aircraft BITE Zip File Archive
- BITE Offload Coverage
- Performance Report for All Airlines
- Performance Report per Airline

System Performance per Airline

Select an Airline

Showing data between December 26, 2006 and March 29, 2007 [Change Dates]

Airline: PANA AIR | for 94 days

Viewing Options: [Text Tables] [Calender] *Elapsed Time = 8.28 seconds*

Note 1: An aircraft may show up in more than one system type due to configuration changes/upgrades.
Note 2: Negative results (-0.07) for *QP targets* indicates the target goal was exceeded.
Note 3: Negative results (-0.37) for *Arr. minus Dep.* - system functionality improved during flight, better at landing than take off.
*Note 4: Filtered columns do not use data from Aircraft: •HL7495*

| PANA AIR - Calculated BITE Degradation / Fleet | | | | Filtered | | |
|---|---|---|---|---|---|---|
| Fleet Types | ALL | 3000 | 3000i | ALL | 3000 | 3000i |
| Number of days in this reporting period | 94 | 94 | 94 | 94 | 94 | 94 |
| Number of Flights examined for this Airline | 21 | - | - | 20 | - | - |
| Number of Flights with data for this period | 18 | 3 | 16 | 17 | 3 | 15 |
| Number of Flights examined for this period | 2635 | 312 | 2323 | 2490 | 312 | 2178 |
| Percentage of Flights per System Type | (100%) | 11.84 | 88.16 | (100%) | 12.53 | 87.47 |
| Average % System Departure Availability | 95.81 | 98.35 | 95.47 | 96.60 | 98.35 | 96.35 |
| Average % System Arrival Availability | 95.39 | 98.30 | 95.00 | 96.56 | 98.30 | 96.31 |
| QP1 target (99.75%) minus Average % System Arrival Availability | 4.36 | 1.45 | 4.75 | 3.19 | 1.45 | 3.44 |
| QP5 target (99.95%) minus Average % System Arrival Availability | 4.56 | 1.65 | 4.95 | 3.39 | 1.65 | 3.64 |
| Perfect target (100%) minus Average % System Arrival Availability | 4.61 | 1.70 | 5.00 | 3.44 | 1.70 | 3.69 |
| Average %: System Arrival Availability minus System Departure Availability | -0.42 | -0.05 | -0.47 | -0.04 | -0.05 | -0.04 |

1510

Color Code/Negative results indicates the target goal was exceeded.

| 0.00% or less | 0.01% to 0.49% | 0.50% to 0.99% | 1.00% to 9.99% | 10% or more |
|---|---|---|---|---|

1000

1400

| Color Code/Negative results indicates the target goal was exceeded. | | | | |
|---|---|---|---|---|
| 0.00% or less | 0.01% to 0.49% | 0.50% to 0.99% | 1.00% to 9.99% | 10% or more |

PANA AIR - Calculated BITE Degradation / Individual Aircraft

| F/R | Aircraft Tailsign | System Type | Fleet Type | Number of Flights | Avg.% Seat Departure Availability | Avg.% Seat Arrival Availability | QP1 99.75% minus Avg.% Seat Arr. Avail. | QP5 99.95% minus Avg.% Seat Arr. Avail. | 100% minus Avg.% Seat Arr. Availability | Avg.% Seat Degradation Arr. minus Dep. |
|---|---|---|---|---|---|---|---|---|---|---|
| | PAC1 | N/A | N/A | N/A | N/A | N/A | N/A | N/A | N/A | N/A |
| | PAC1 | N/A | N/A | N/A | N/A | N/A | N/A | N/A | N/A | N/A |
| ☐ | PAC1 | 3000i | B747-400 | 142 | 96.76 | 96.68 | 3.07 | 3.27 | 3.32 | 0.08 |
| ☐ | PAC1 | 3000i | B747-400 | 131 | 97.07 | 97.03 | 2.72 | 2.92 | 2.97 | 0.04 |
| ☐ | PAC1 | 3000i | B747-400 | 104 | 96.71 | 96.69 | 3.06 | 3.26 | 3.31 | 0.02 |
| ☐ | PAC1 | 3000i | B747-400 | 162 | 95.48 | 95.51 | 4.24 | 4.44 | 4.49 | -0.03 |
| ☐ | PAC1 | 3000i | B747-400 | 135 | 96.21 | 96.32 | 3.43 | 3.63 | 3.68 | -0.11 |
| ☐ | PAC1 | 3000i | B747-400 | 129 | 95.61 | 95.48 | 4.27 | 4.47 | 4.52 | 0.13 |
| ☐ | PAC1 | 3000i | B747-400 | 120 | 95.26 | 95.19 | 4.56 | 4.76 | 4.81 | 0.07 |
| ☐ | PAC1 | 3000i | B747-400 | 139 | 95.88 | 96.16 | 3.59 | 3.79 | 3.84 | -0.27 |
| ☐ | PAC1 | 3000i | B747-400 | 145 | 96.56 | 96.44 | 3.31 | 3.51 | 3.56 | 0.13 |
| ☐ | PAC1 | 3000i | B747-400 | 152 | 96.12 | 96.09 | 3.66 | 3.86 | 3.91 | 0.04 |
| ☐ | PAC1 | 3000i | B747-400 | 131 | 99.36 | 99.24 | 0.51 | 0.71 | 0.76 | 0.12 |
| ☐ | PAC1 | 3000i | B747-400 | 139 | 96.24 | 96.16 | 3.59 | 3.79 | 3.84 | 0.08 |
| ☑ | PAC1 | 3000i | B747-400 | 145 | 82.25 | 75.39 | 24.36 | 24.56 | 24.61 | 6.86 |
| ☐ | PAC1 | 3000i | B747-400 | 148 | 96.51 | 96.39 | 3.36 | 3.56 | 3.61 | 0.12 |
| | PAC1 | N/A | N/A | N/A | N/A | N/A | N/A | N/A | N/A | N/A |
| ☐ | PAC1 | 3000i | B777-200 | 161 | 99.94 | 99.95 | -0.20 | -0.00 | 0.05 | -0.01 |
| ☐ | PAC1 | 3000i | B777-200 | 175 | 97.33 | 97.36 | 2.39 | 2.59 | 2.64 | -0.02 |
| ☐ | PAC1 | 3000i | B777-200 | 202 | 95.60 | 95.33 | 4.42 | 4.62 | 4.67 | 0.27 |

1510

*FIG. 6B*

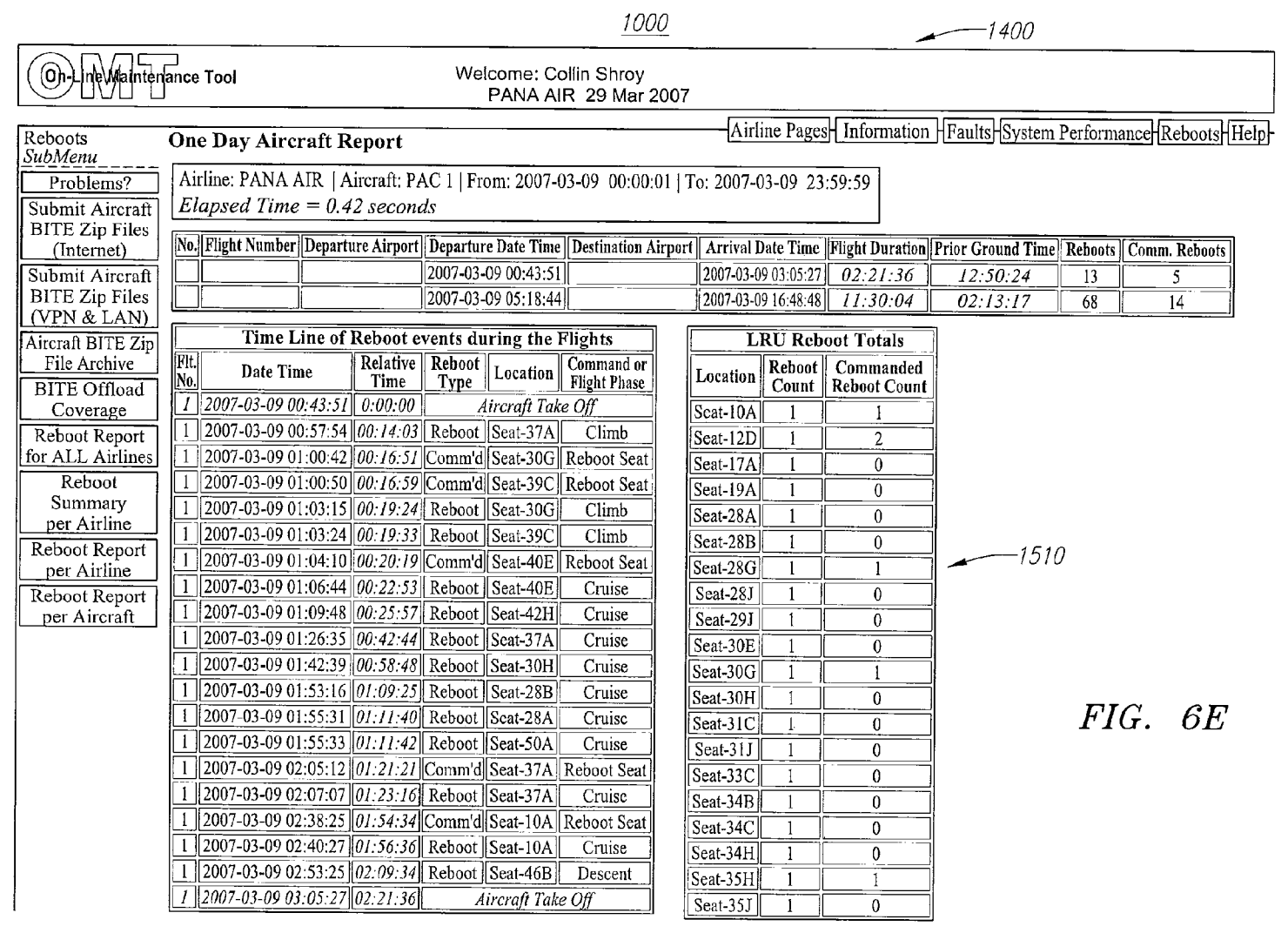

1000

1400

OMT On-Line Maintenance Tool

Welcome: Collin Shroy
PANA AIR 29 Mar 2007

Airline Pages | Information | Faults | System Performance | Reboots | Help

Reboots
*SubMenu*

- Problems?
- Submit Aircraft BITE Zip Files (Internet)
- Submit Aircraft BITE Zip Files (VPN & LAN)
- Aircraft BITE Zip File Archive
- BITE Offload Coverage
- Reboot Report for ALL Airlines
- Reboot Summary per Airline
- Reboot Report per Airline
- Reboot Report per Aircraft

One Day Aircraft Report

Airline: PANA AIR | Aircraft: PAC 1 | From: 2007-03-09 00:00:01 | To: 2007-03-09 23:59:59
*Elapsed Time = 0.42 seconds*

| No. | Flight Number | Departure Airport | Departure Date Time | Destination Airport | Arrival Date Time | Flight Duration | Prior Ground Time | Reboots | Comm. Reboots |
|---|---|---|---|---|---|---|---|---|---|
| | | | 2007-03-09 00:43:51 | | 2007-03-09 03:05:27 | *02:21:36* | *12:50:24* | 13 | 5 |
| | | | 2007-03-09 05:18:44 | | 2007-03-09 16:48:48 | *11:30:04* | *02:13:17* | 68 | 14 |

Time Line of Reboot events during the Flights

| Flt. No. | Date Time | Relative Time | Reboot Type | Location | Command or Flight Phase |
|---|---|---|---|---|---|
| *1* | *2007-03-09 00:43:51* | *0:00:00* | *Aircraft Take Off* | | |
| 1 | 2007-03-09 00:57:54 | *00:14:03* | Reboot | Seat-37A | Climb |
| 1 | 2007-03-09 01:00:42 | *00:16:51* | Comm'd | Seat-30G | Reboot Seat |
| 1 | 2007-03-09 01:00:50 | *00:16:59* | Comm'd | Seat-39C | Reboot Seat |
| 1 | 2007-03-09 01:03:15 | *00:19:24* | Reboot | Seat-30G | Climb |
| 1 | 2007-03-09 01:03:24 | *00:19:33* | Reboot | Seat-39C | Climb |
| 1 | 2007-03-09 01:04:10 | *00:20:19* | Comm'd | Seat-40E | Reboot Seat |
| 1 | 2007-03-09 01:06:44 | *00:22:53* | Reboot | Seat-40E | Cruise |
| 1 | 2007-03-09 01:09:48 | *00:25:57* | Reboot | Seat-42H | Cruise |
| 1 | 2007-03-09 01:26:35 | *00:42:44* | Reboot | Seat-37A | Cruise |
| 1 | 2007-03-09 01:42:39 | *00:58:48* | Reboot | Seat-30H | Cruise |
| 1 | 2007-03-09 01:53:16 | *01:09:25* | Reboot | Seat-28B | Cruise |
| 1 | 2007-03-09 01:55:31 | *01:11:40* | Reboot | Seat-28A | Cruise |
| 1 | 2007-03-09 01:55:33 | *01:11:42* | Reboot | Seat-50A | Cruise |
| 1 | 2007-03-09 02:05:12 | *01:21:21* | Comm'd | Seat-37A | Reboot Seat |
| 1 | 2007-03-09 02:07:07 | *01:23:16* | Reboot | Seat-37A | Cruise |
| 1 | 2007-03-09 02:38:25 | *01:54:34* | Comm'd | Seat-10A | Reboot Seat |
| 1 | 2007-03-09 02:40:27 | *01:56:36* | Reboot | Seat-10A | Cruise |
| 1 | 2007-03-09 02:53:25 | *02:09:34* | Reboot | Seat-46B | Descent |
| *1* | *2007-03-09 03:05:27* | *02:21:36* | *Aircraft Take Off* | | |

LRU Reboot Totals

| Location | Reboot Count | Commanded Reboot Count |
|---|---|---|
| Seat-10A | 1 | 1 |
| Seat-12D | 1 | 2 |
| Seat-17A | 1 | 0 |
| Seat-19A | 1 | 0 |
| Seat-28A | 1 | 0 |
| Seat-28B | 1 | 0 |
| Seat-28G | 1 | 1 |
| Seat-28J | 1 | 0 |
| Seat-29J | 1 | 0 |
| Seat-30E | 1 | 0 |
| Seat-30G | 1 | 1 |
| Seat-30H | 1 | 0 |
| Seat-31C | 1 | 0 |
| Seat-31J | 1 | 0 |
| Seat-33C | 1 | 0 |
| Seat-34B | 1 | 0 |
| Seat-34C | 1 | 0 |
| Seat-34H | 1 | 0 |
| Seat-35H | 1 | 1 |
| Seat-35J | 1 | 0 |

1510

FIG. 6E

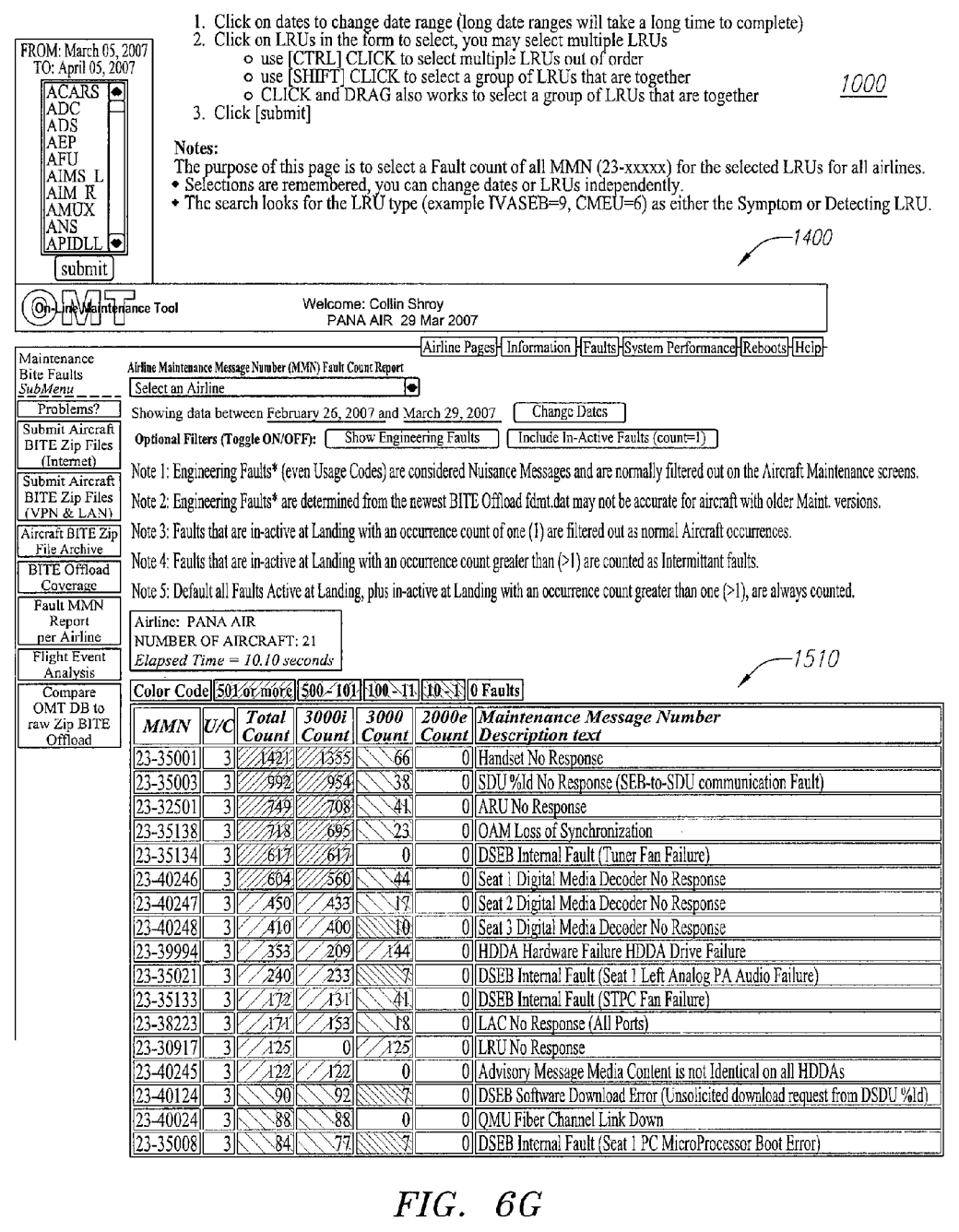

1000

FROM: March 05, 2007
TO: April 05, 2007

ACARS
ADC
ADS
AEP
AFU
AIMS_L
AIM_R
AMUX
ANS
APIDLL submit

1. Click on dates to change date range (long date ranges will take a long time to complete)
2. Click on LRUs in the form to select, you may select multiple LRUs
   - use [CTRL] CLICK to select multiple LRUs out of order
   - use [SHIFT] CLICK to select a group of LRUs that are together
   - CLICK and DRAG also works to select a group of LRUs that are together
3. Click [submit]

Notes:
The purpose of this page is to select a Fault count of all MMN (23-xxxxx) for the selected LRUs for all airlines.
- Selections are remembered, you can change dates or LRUs independently.
- The search looks for the LRU type (example IVASEB=9, CMEU=6) as either the Symptom or Detecting LRU.

1400

OMT On-Line Maintenance Tool — Welcome: Collin Shroy — PANA AIR 29 Mar 2007

Airline Pages | Information | Faults | System Performance | Reboots | Help

Maintenance Bite Faults *SubMenu*
- Problems?
- Submit Aircraft BITE Zip Files (Internet)
- Submit Aircraft BITE Zip Files (VPN & LAN)
- Aircraft BITE Zip File Archive
- BITE Offload Coverage
- Fault MMN Report per Airline
- Flight Event Analysis
- Compare OMT DB to raw Zip BITE Offload

Airline Maintenance Message Number (MMN) Fault Count Report

Select an Airline

Showing data between February 26, 2007 and March 29, 2007 [Change Dates]

Optional Filters (Toggle ON/OFF): [Show Engineering Faults] [Include In-Active Faults (count=1)]

Note 1: Engineering Faults* (even Usage Codes) are considered Nuisance Messages and are normally filtered out on the Aircraft Maintenance screens.

Note 2: Engineering Faults* are determined from the newest BITE Offload fdmt.dat may not be accurate for aircraft with older Maint. versions.

Note 3: Faults that are in-active at Landing with an occurrence count of one (1) are filtered out as normal Aircraft occurrences.

Note 4: Faults that are in-active at Landing with an occurrence count greater than (>1) are counted as Intermittant faults.

Note 5: Default all Faults Active at Landing, plus in-active at Landing with an occurrence count greater than one (>1), are always counted.

Airline: PANA AIR
NUMBER OF AIRCRAFT: 21
*Elapsed Time = 10.10 seconds*

1510

Color Code | 501 or more | 500-101 | 100-11 | 10-1 | 0 Faults

| *MMN* | *U/C* | *Total Count* | *3000i Count* | *3000 Count* | *2000e Count* | *Maintenance Message Number Description text* |
|---|---|---|---|---|---|---|
| 23-35001 | 3 | 1421 | 1355 | 66 | 0 | Handset No Response |
| 23-35003 | 3 | 992 | 954 | 38 | 0 | SDU %ld No Response (SEB-to-SDU communication Fault) |
| 23-32501 | 3 | 749 | 708 | 41 | 0 | ARU No Response |
| 23-35138 | 3 | 718 | 695 | 23 | 0 | OAM Loss of Synchronization |
| 23-35134 | 3 | 617 | 617 | 0 | 0 | DSEB Internal Fault (Tuner Fan Failure) |
| 23-40246 | 3 | 604 | 560 | 44 | 0 | Seat 1 Digital Media Decoder No Response |
| 23-40247 | 3 | 450 | 433 | 17 | 0 | Seat 2 Digital Media Decoder No Response |
| 23-40248 | 3 | 410 | 400 | 10 | 0 | Seat 3 Digital Media Decoder No Response |
| 23-39994 | 3 | 353 | 209 | 144 | 0 | HDDA Hardware Failure HDDA Drive Failure |
| 23-35021 | 3 | 240 | 233 | 7 | 0 | DSEB Internal Fault (Seat 1 Left Analog PA Audio Failure) |
| 23-35133 | 3 | 172 | 131 | 41 | 0 | DSEB Internal Fault (STPC Fan Failure) |
| 23-38223 | 3 | 171 | 153 | 18 | 0 | LAC No Response (All Ports) |
| 23-30917 | 3 | 125 | 0 | 125 | 0 | LRU No Response |
| 23-40245 | 3 | 122 | 122 | 0 | 0 | Advisory Message Media Content is not Identical on all HDDAs |
| 23-40124 | 3 | 90 | 92 | 7 | 0 | DSEB Software Download Error (Unsolicited download request from DSDU %ld) |
| 23-40024 | 3 | 88 | 88 | 0 | 0 | QMU Fiber Channel Link Down |
| 23-35008 | 3 | 84 | 77 | 7 | 0 | DSEB Internal Fault (Seat 1 PC MicroProcessor Boot Error) |

*FIG. 6G*

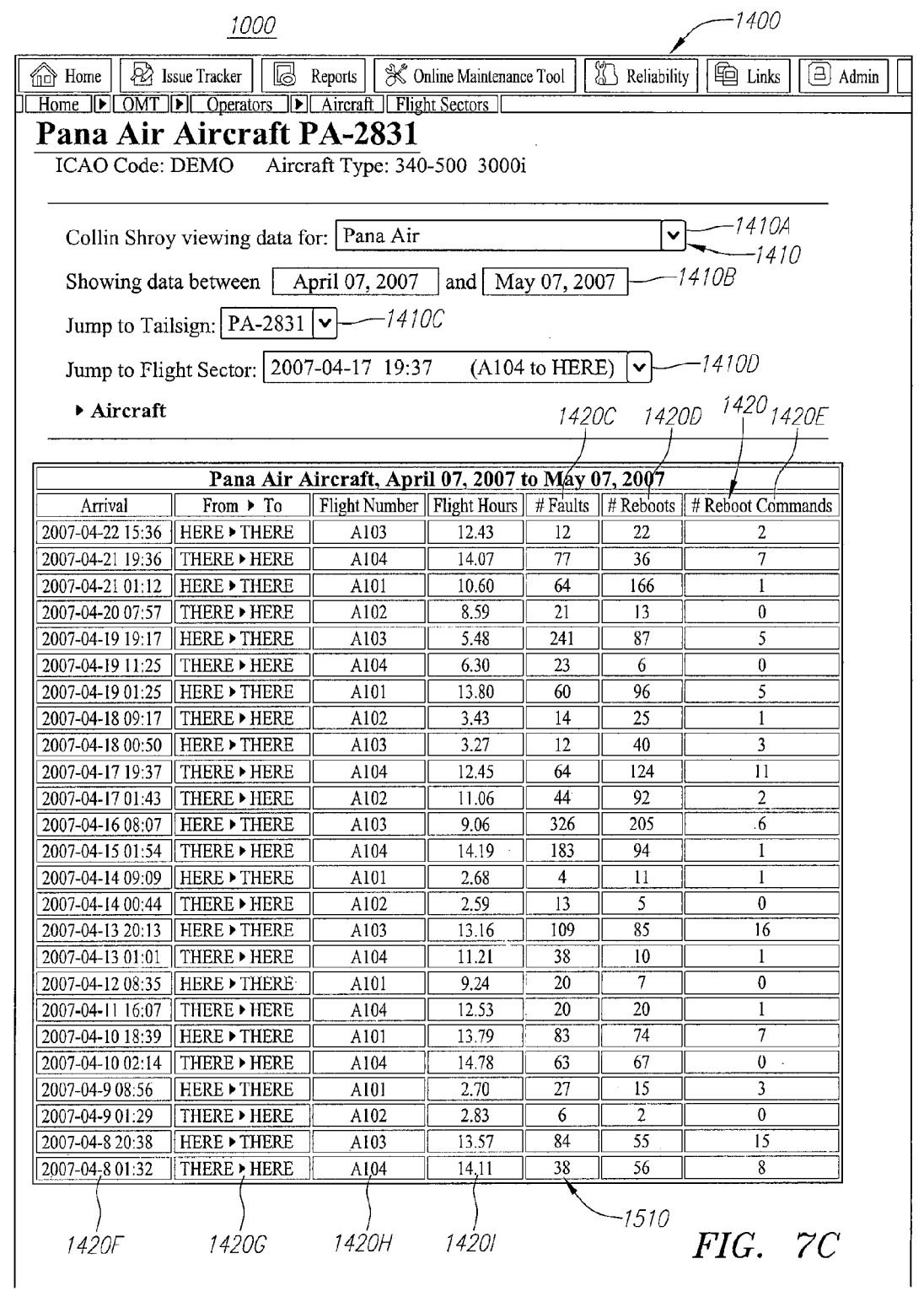

1000

1400

Home | Issue Tracker | Reports | Online Maintenance Tool | Reliability | Links | Admin Home ▸ OMT ▸ Operators ▸ Aircraft | Flight Sectors

Pana Air Aircraft PA-2831

ICAO Code: DEMO Aircraft Type: 340-500 3000i

Collin Shroy viewing data for: Pana Air — 1410A, 1410

Showing data between April 07, 2007 and May 07, 2007 — 1410B

Jump to Tailsign: PA-2831 — 1410C

Jump to Flight Sector: 2007-04-17 19:37 (A104 to HERE) — 1410D

▸ Aircraft

1420C 1420D 1420 1420E

| Pana Air Aircraft, April 07, 2007 to May 07, 2007 | | | | | | |
|---|---|---|---|---|---|---|
| Arrival | From ▸ To | Flight Number | Flight Hours | # Faults | # Reboots | # Reboot Commands |
| 2007-04-22 15:36 | HERE ▸ THERE | A103 | 12.43 | 12 | 22 | 2 |
| 2007-04-21 19:36 | THERE ▸ HERE | A104 | 14.07 | 77 | 36 | 7 |
| 2007-04-21 01:12 | HERE ▸ THERE | A101 | 10.60 | 64 | 166 | 1 |
| 2007-04-20 07:57 | THERE ▸ HERE | A102 | 8.59 | 21 | 13 | 0 |
| 2007-04-19 19:17 | HERE ▸ THERE | A103 | 5.48 | 241 | 87 | 5 |
| 2007-04-19 11:25 | THERE ▸ HERE | A104 | 6.30 | 23 | 6 | 0 |
| 2007-04-19 01:25 | HERE ▸ THERE | A101 | 13.80 | 60 | 96 | 5 |
| 2007-04-18 09:17 | THERE ▸ HERE | A102 | 3.43 | 14 | 25 | 1 |
| 2007-04-18 00:50 | HERE ▸ THERE | A103 | 3.27 | 12 | 40 | 3 |
| 2007-04-17 19:37 | THERE ▸ HERE | A104 | 12.45 | 64 | 124 | 11 |
| 2007-04-17 01:43 | THERE ▸ HERE | A102 | 11.06 | 44 | 92 | 2 |
| 2007-04-16 08:07 | HERE ▸ THERE | A103 | 9.06 | 326 | 205 | 6 |
| 2007-04-15 01:54 | THERE ▸ HERE | A104 | 14.19 | 183 | 94 | 1 |
| 2007-04-14 09:09 | HERE ▸ THERE | A101 | 2.68 | 4 | 11 | 1 |
| 2007-04-14 00:44 | THERE ▸ HERE | A102 | 2.59 | 13 | 5 | 0 |
| 2007-04-13 20:13 | HERE ▸ THERE | A103 | 13.16 | 109 | 85 | 16 |
| 2007-04-13 01:01 | THERE ▸ HERE | A104 | 11.21 | 38 | 10 | 1 |
| 2007-04-12 08:35 | HERE ▸ THERE | A101 | 9.24 | 20 | 7 | 0 |
| 2007-04-11 16:07 | THERE ▸ HERE | A104 | 12.53 | 20 | 20 | 1 |
| 2007-04-10 18:39 | HERE ▸ THERE | A101 | 13.79 | 83 | 74 | 7 |
| 2007-04-10 02:14 | THERE ▸ HERE | A104 | 14.78 | 63 | 67 | 0 |
| 2007-04-9 08:56 | HERE ▸ THERE | A101 | 2.70 | 27 | 15 | 3 |
| 2007-04-9 01:29 | THERE ▸ HERE | A102 | 2.83 | 6 | 2 | 0 |
| 2007-04-8 20:38 | HERE ▸ THERE | A103 | 13.57 | 84 | 55 | 15 |
| 2007-04-8 01:32 | THERE ▸ HERE | A104 | 14.11 | 38 | 56 | 8 |

1420F 1420G 1420H 1420I 1510

*FIG. 7C*

1000

1400

| Configuration Summary for Pana Air - PA-2831<br>Flight Sector Arrival Date: April 22, 2007 15:36:28 | | | | | | |
|---|---|---|---|---|---|---|
| No. | Acronym | Count | Hardware Part Number | Software Part Number | Software Version | Configuration Part Number |
| 1 | AGIS_Base | 2 | N/A | RD-AK1254001 | 01.02.0 | 530682-215 |
| 2 | BITE_Data | 2 | BFD | RD-AK1148064 | 07.20.0 | N/A |
| 3 | CMEU | 2 | RD-AA8234-D1 | RD-AK1167123 | 16.16.0 | 12/42/204j |
| 4 | CMEUPASSAPP | 2 | N/A | RD-AK1232009 | 50.05.0 | N/A |
| 5 | CMT | 1 | RD-AA8046-22 | RD-AK01PA231 | 01.31 | 12/42/204j |
| 6 | CTU | 1 | RD-AT1004-13 | NULL | 078a 4/5/2000 | 12/42/204j |
| 7 | DATABASE | 2 | N/A | RD-AK21PA119 | 19 | 12/42/204j |
| 8 | DPP | 2 | N/A | RD-AK1144058 | 06.21.0 | N/A |
| 9 | DSDU | 2 | N/A | RD-AK1180216 | 06.08.0 | N/A |
| 10 | DSEB | 2 | RD-AA3403-06 | RD-AK1145106 | 07.36.0 | 12/42/204j ← 1420 |
| 11 | DSEB | 130 | RD-AA3622-05 | RD-AK1145106 | 07.36.0 | 12/42/204j |
| 12 | DSEB | 7 | RD-AA3623-05 | RD-AK1145106 | 07.36.0 | 12/42/204j |
| 13 | DSEBi_PC | 2 | N/A | RD-AK1189127 | 03.17.0 | N/A |
| 14 | DSEBMDC | 2 | N/A | RD-AK1150020 | 01.15.0 | N/A |
| 15 | DTIGAMES | 2 | N/A | RD-AK20PA109 | 01.15 | N/A |
| 16 | DTI_MP-SERVER | 2 | N/A | RD-AK3411104 | 01.03 | N/A |
| 17 | EADB | 6 | RD-AK1163027 | RD-AK1163027 | 06.20.0 | 12/42/204j |
| 18 | EPESC | 1 | RD-AA1008-01 | RD-AK1154056 | 06.46.0 | 12/42/204j ← 1510 |
| 19 | ETEST | 2 | N/A | RD-AK38PA001 | 01.00.0 | N/A |
| 20 | EVSCU | 1 | RD-AA5007-13 | RD-AK1159068 | 08.42.0 | 12/42/204j |
| 21 | FCH | 1 | RD-AA8210-01 | RD-AK1132006 | 01.02.0 | NULL |
| 22 | FLT_SCRIPT | 2 | N/A | RD-AK26PA102 | 01.01 | N/A |
| 23 | HDDA | 3 | RD-AA8341-02 | RD-AK1181002 | 02.01.0 | PA0407Tv4.0 |
| 24 | IFCOMM | 2 | N/A | RD-AK26PA005 | 01.06.0 | N/A |
| 25 | IntEngine2 | 2 | N/A | RD-AK1143192 | 02.69.0 | N/A |
| 26 | PAXNET | 2 | N/A | RD-AK1216016 | 01.10.0 | N/A |
| 27 | PVIS | 1 | Q21006 | R | NULL | 5168-3-S |
| 28 | QMCU | 2 | RD-AA3601-02 | RD-AK1155005 | 01.03.0 | NULL |
| 29 | QMU | 3 | RD-AA3501-02 | RD-AK1140068 | 04.04.0 | 12/42/204j |
| 30 | QMUX | 12 | RD-AA3501-02 | NULL | 04.05.0 | NULL |
| 31 | QVP | 6 | RD-AA3501-02 | RD-AK1154114 | 04.02.0 | 12/42/204j |
| 32 | Seatapp | 2 | N/A | RD-AK04PA446 | 01.97 | N/A |
| 33 | STAFF_LIST | 2 | N/A | PAAK27SL019 | 11MAR07 | N/A |
| 34 | stappbse | 2 | N/A | RD-AK10PA1149 | 01.58 | N/A |
| 35 | ZTC | 1 | RD-AA1008-01 | RD-AK1110053 | 05.27.0 | 12/42/204j |

*FIG. 7D*

1000

1400

| Configuration Summary for Pana Air - PA-2831<br>Flight Sector Arrival Date: April 22, 2007 15:36:28 | | | | | | | | |
|---|---|---|---|---|---|---|---|---|
| No. | Acronym | Location (Location Description) | Address | Hardware Part Number | Serial No. | Software Part Number | Software Version | Configuration Part Number |
| 1 | PVIS | PVIS 1 (ee bAY) | 0.0.0.0.0 | 921006 | | R | NULL | 5168-3-S |
| 2 | PVIS | PVIS 1 (ee bAY) | 0.0.0.0.0 | 921006 | | R | NULL | 5168-3-S |
| 3 | EPESC | epesc 1 (E-Bay Rack 1 FWD) | 0.0.0.0.0 | RD-AA1008-01 | C701581 | RD-AK1164056 | 06.46.0:03.03M | 12/42/204j |
| 4 | EPESC | epesc 1 (E-Bay Rack 1 FWD) | 0.0.0.0.0 | RD-AA1008-01 | C701581 | RD-AK1164056 | 06.46.0:03.03M | 12/42/204j |
| 5 | ZTC | ztc 1 (EE BAY R1) | 0.0.0.0.0 | RD-AA1008-01 | NULL | RD-AK1110053 | 05.27.0:02.00M | 12/42/204j |
| 6 | ZTC | ztc 1 (EE BAY R1) | 0.0.0.0.0 | RD-AA1008-01 | NULL | RD-AK1163027 | 05.27.0:02.00M | 12/42/204j |
| 7 | EADB | eadb 1 (In floor behind seat 3F) | 0.0.0.0.0 | RD-AA2016-04 | c566589 | RD-AK1163027 | 06.20.0:03.03M | 12/42/204j — 1420 |
| 8 | EADB | eadb 1 (In floor behind seat 3F) | 0.0.0.0.0 | RD-AA2016-04 | c566589 | RD-AK1163027 | 06.20.0:03.03M | 12/42/204j |
| 9 | EADB | eadb 1 (In floor behind seat 3F) | 0.0.0.0.0 | RD-AA2016-04 | c566589 | RD-AK1163027 | 06.20.0:03.03M | 12/42/204j |
| 10 | EADB | eadb 2 (In floor behind seat 6F) | 1.0.0.0.0 | RD-AA2016-04 | c566582 | RD-AK1163027 | 06.20.0:03.03M | 12/42/204j |
| 11 | EADB | eadb 2 (In floor behind seat 6F) | 1.0.0.0.0 | RD-AA2016-04 | c566582 | RD-AK1163027 | 06.20.0:03.03M | 12/42/204j |
| 12 | EADB | eadb 2 (In floor behind seat 6F) | 1.0.0.0.0 | RD-AA2016-04 | c566582 | RD-AK1163027 | 06.20.0:03.03M | 12/42/204j — 1510 |
| 13 | EADB | eadb 3 (In floor behind seat 9F) | 2.0.0.0.0 | RD-AA2016-04 | c566588 | RD-AK1163027 | 06.20.0:03.03M | 12/42/204j |
| 14 | EADB | eadb 3 (In floor behind seat 9F) | 2.0.0.0.0 | RD-AA2016-04 | c566588 | RD-AK1163027 | 06.20.0:03.03M | 12/42/204j |
| 15 | EADB | eadb 3 (In floor behind seat 9F) | 2.0.0.0.0 | RD-AA2016-04 | c566588 | RD-AK1163027 | 06.20.0:03.03M | 12/42/204j |
| 16 | EADB | eadb 4 (In floor behind seat 19F) | 3.0.0.0.0 | RD-AA2016-04 | c566556 | RD-AK1163027 | 06.20.0:03.03M | 12/42/204j |
| 17 | EADB | eadb 4 (In floor behind seat 19F) | 3.0.0.0.0 | RD-AA2016-04 | c566556 | RD-AK1163027 | 06.20.0:03.03M | 12/42/204j |
| 18 | EADB | eadb 4 (In floor behind seat 19F) | 3.0.0.0.0 | RD-AA2016-04 | c566556 | RD-AK1163027 | 06.20.0:03.03M | 12/42/204j |
| 19 | EADB | eadb 5 (In floor behind seat 29F) | 4.0.0.0.0 | RD-AA2016-04 | c566584 | RD-AK1163027 | 06.20.0:03.03M | 12/42/204j |
| 20 | EADB | eadb 5 (In floor behind seat 29F) | 4.0.0.0.0 | RD-AA2016-04 | c566584 | RD-AK1163027 | 06.20.0:03.03M | 12/42/204j |
| 21 | EADB | eadb 5 (In floor behind seat 29F) | 4.0.0.0.0 | RD-AA2016-04 | c566584 | RD-AK1163027 | 06.20.0:03.03M | 12/42/204j |
| 22 | EADB | eadb 6 (In floor behind seat 36F) | 5.0.0.0.0 | RD-AA2016-04 | c566559 | RD-AK1163027 | 06.20.0:03.03M | 12/42/204j |
| 23 | EADB | eadb 6 (In floor behind seat 36F) | 5.0.0.0.0 | RD-AA2016-04 | c566559 | RD-AK1163027 | 06.20.0:03.03M | 12/42/204j |
| 24 | EADB | eadb 6 (In floor behind seat 36F) | 5.0.0.0.0 | RD-AA2016-04 | c566559 | RD-AK1163027 | 06.20.0:03.03M | 12/42/204j |
| 25 | DSEB | DSEB 1 on EADB 1, Port 7(jb/cmt), no FDB (MIPS PREVIEW) | 128.1.40.1.0 | RD-AA3403-05 | C565683 | RD-AK1145106 | 07.36.0:01.03m | 12/42/204j |

*FIG. 7E*

1000 1400

FIG. 7H

| Part Number | Serial Number | Incident Date | Close Date | Res. Code | Problem Description | Resolution Description |
|---|---|---|---|---|---|---|
| RD-AA3602-05 | C774355 | 2007/04/24 | 2007/05/07 | NFF | SEAT 1A VERY SLOW RESPONSE & SCREEN HANGUP AFTER CURSOR IS MOVED CARRY OUT REPAIR, MOD AS APPLICABLE, TEST & RECERTIFY IN ACCORDANCE WITH THE LATEST CMM REVISION. | TESTED - NFF. UNABLE TO DUPLICATE REPORTED FAULT. TRH: 12392 HRS. UNIT FUNCTIONAL TESTED AND SOAK TESTED FOUND SATISFACTORY ON TEST MOD 12 EMBODIED IAW SB RDAA3602-05-44-12 REV. 1 DATED APRIL 2006. |
| RD-AA3602-05 | C893417 | 2007/04/23 | 2007/05/07 | CH | HIGH REBOOT/NO INTERACTIVE CARRY OUT REPAIR MOD AS APPLICABLE, TEST & RECERTIFY IN ACCORDANCE WITH THE LATEST CMM REVISION | TESTED - CONFIRMED REPORTED FAULT. TRH: 7701 HRS. DEFECTIVE ISGA BOARD. REPLACED ISGA BOARD WITH P/N: RBUAAA3402ZC AND S/N A0610 0411 (OFF: R8UAA3402ZC. A0509 0830). UNIT REPAIRED, CHECKED AND I |
| RD-AA3602-05 | C982731 | 2007/04/23 | 2007/05/07 | NFF | BAD QAM.NIL MOVIES AVAILABLE. CARRY OUT REPAIR, MOD AS APPLICABLE, TEST & RECERTIFY IN ACCORDANCE WITH THE LATEST CMM REVISION. | TESTED - NFF. TRH: 1503 HRS. UNABLE TO DUPLICATE REPORTED FAULT. UNIT FUNCTIONAL TESTED AND SOAK TESTED FOUND SATISFACTORY ON TEST UNIT CHECKED AND INSPECTED IAW CMM 44-20-07 REV. 22 DATED DEC. 2 |
| RD-AA3602-05 | C982715 | 2007/04/21 | 2007/05/07 | NFF | SEAT #1 NO AVOD. CARRY OUT REPAIR. MOD AS APPLICABLE, TEST & RECERTIFY IN ACCORDANCE WITH THE LATEST CMM REVISION. | TESTED - NFF. TRH: 934 HRS. UNIT SOAK TESTED ON (P8T) FOR 4 HRS WITH QAM VIDEO & PERFORMED SEVERAL TIMES OF TEST ON (SAT) WHICH IS SATISFACTORY. UNIT CHECKED AND INSPECTED IAW CMM 44-20-07 REV. 2 |
| RD-AA3602-05 | C566361 | 2007/04/16 | 2007/05/01 | NFF | NO AVOD. CARRY OUT REPAIR. MOD AS APPLICABLE, TEST & RECERTIFY IN ACCORDANCE WITH THE LATEST CMM REVISION. | TESTED - NFF. TRH: 12665 HRS. PERFORMED SEVERAL TIMES OF TEST ON STAND ALONE TESTER (SAT) & SOAK TESTED ON PORTABLE SEAT TESTER (PST) FOR 4 HRS. WITH QAM VIDEO WHICH IS SATISFACTORY. UNIT CHECKED A |
| RD-AA3602-05 | D052748 | 2007/04/16 | 2007/05/01 | NFF | NO INTERACTIVE. CARRY OUT REPAIR. MOD AS APPLICABLE, TEST & RECERTIFY IN ACCORDANCE WITH THE LATEST CMM REVISION. 1510 | TESTED - NFF. TRH: 4541 HRS. UNIT SOAK TESTED ON PORTABLE SEAT TESTER (PST) FOR 4 HRS. WITH QAM VIDEO & PERFORMED SEVERAL TIMES OF TEST ON STAND ALONE TESTER (SAT) WHICH IS SATISFACTORY UNIT CHECK |

★ These reports not limited to the following:

- MTFB / MTBUR
  - By LRU
  - By Component
  - By Mod
- System Airline Performance
  - GMTBF vs. Actual MTBF
  - GMTBUT vs. Actual MTBUR
  - System Global Performance
  - Predicted MTBF vs. Actual MTBF
  - Predicted MTBUR vs. Actual MTBUR
- LRU
  - LRU Repair vs. LRU Shipped
  - By Time Period
- Part Usage
  - By LRU
  - By Customer

1000

SYSTEM AND METHOD FOR PERFORMING REAL-TIME DATA ANALYSIS

CROSS-REFERENCE TO RELATED APPLICATIONS

This application claims priority to U.S. provisional patent application, Ser. No. 61/122,661, filed on Dec. 15, 2008. Priority to the provisional patent application is expressly claimed, and the disclosure of the provisional application is hereby incorporated herein by reference in its entirety and for all purposes.

FIELD

The disclosed embodiments relate generally to data analysis systems and more particularly, but not exclusively, to real-time performance data monitoring and analysis systems suitable for use with vehicle information systems installed aboard passenger vehicles.

BACKGROUND

Vehicles, such as automobiles and aircraft, often provide entertainment systems to satisfy passenger demand for entertainment during travel.

Conventional vehicle information systems (or passenger entertainment systems) include overhead cabin viewing systems and/or seatback viewing systems with individual controls for selecting viewing content. The viewing content typically includes entertainment content, such as audio and/or video materials, and can be derived from a variety of content sources. For instance, prerecorded viewing content, such as motion pictures and music, can be provided by internal content sources, such as audio and video systems, that are installed within the vehicle. External content sources likewise can transmit viewing content, including satellite television programming or satellite radio programming, to the vehicle via wireless communication systems, such as cellular and/or satellite communication systems.

Although vehicle information systems support compilation of system performance data during travel, currently-available data analysis systems do not support real-time monitoring and analysis of system performance. The system performance data accumulated during travel, instead, must be downloaded from the vehicle information systems and analyzed only after travel is complete. In other words, testing and, if necessary, repair of vehicle information systems currently can be initiated only after the passenger vehicle has arrived at its travel destination. As a result, the vehicle information systems may be unavailable for an indeterminate period of time if suitable replacement components are not readily available, and subsequent travel may be delayed.

In view of the foregoing, a need exists for an improved system and method for monitoring and analyzing system performance data for vehicle information systems that overcomes the aforementioned obstacles and deficiencies associated with currently-available data analysis systems.

BRIEF DESCRIPTION OF THE DRAWINGS

FIG. 6A is an exemplary detail drawing illustrating an embodiment of the performance data monitoring and analysis system of FIG. 1, wherein the performance data monitoring and analysis system includes an interactive user interface system for presenting download data that includes Built In Test Equipment (BITE) seat performance data.

FIG. 6B is an exemplary detail drawing illustrating an alternative embodiment of the performance data monitoring and analysis system of FIG. 6A, wherein the user interface system can present BITE seat availability data.

FIG. 6E is an exemplary detail drawing illustrating still another alternative embodiment of the performance data monitoring and analysis system of FIG. 6A, wherein the user interface system can present a flight event analysis.

FIG. 6G is an exemplary detail drawing illustrating still another alternative embodiment of the performance data monitoring and analysis system of FIG. 6A, wherein the performance data monitoring and analysis system includes internal tools for performing global searches by line replaceable unit and/or MMN.

FIG. 7C is an exemplary detail drawing illustrating still another alternative embodiment of the performance data monitoring and analysis system of FIG. 7A, wherein the user interface system can present a flight table for providing an overview on event counts during a predetermined time interval.

FIG. 7D is an exemplary detail drawing illustrating still another alternative embodiment of the performance data monitoring and analysis system of FIG. 7A, wherein the user interface system can present a configuration summary for a predetermined time interval.

FIG. 7E is an exemplary detail drawing illustrating still another alternative embodiment of the performance data monitoring and analysis system of FIG. 7A, wherein the user interface system can present a single-flight table.

FIG. 7H is an exemplary detail drawing illustrating still another alternative embodiment of the performance data monitoring and analysis system of FIG. 7A, wherein the user interface system can present a repair shop history for a selected system component.

Figure 1:
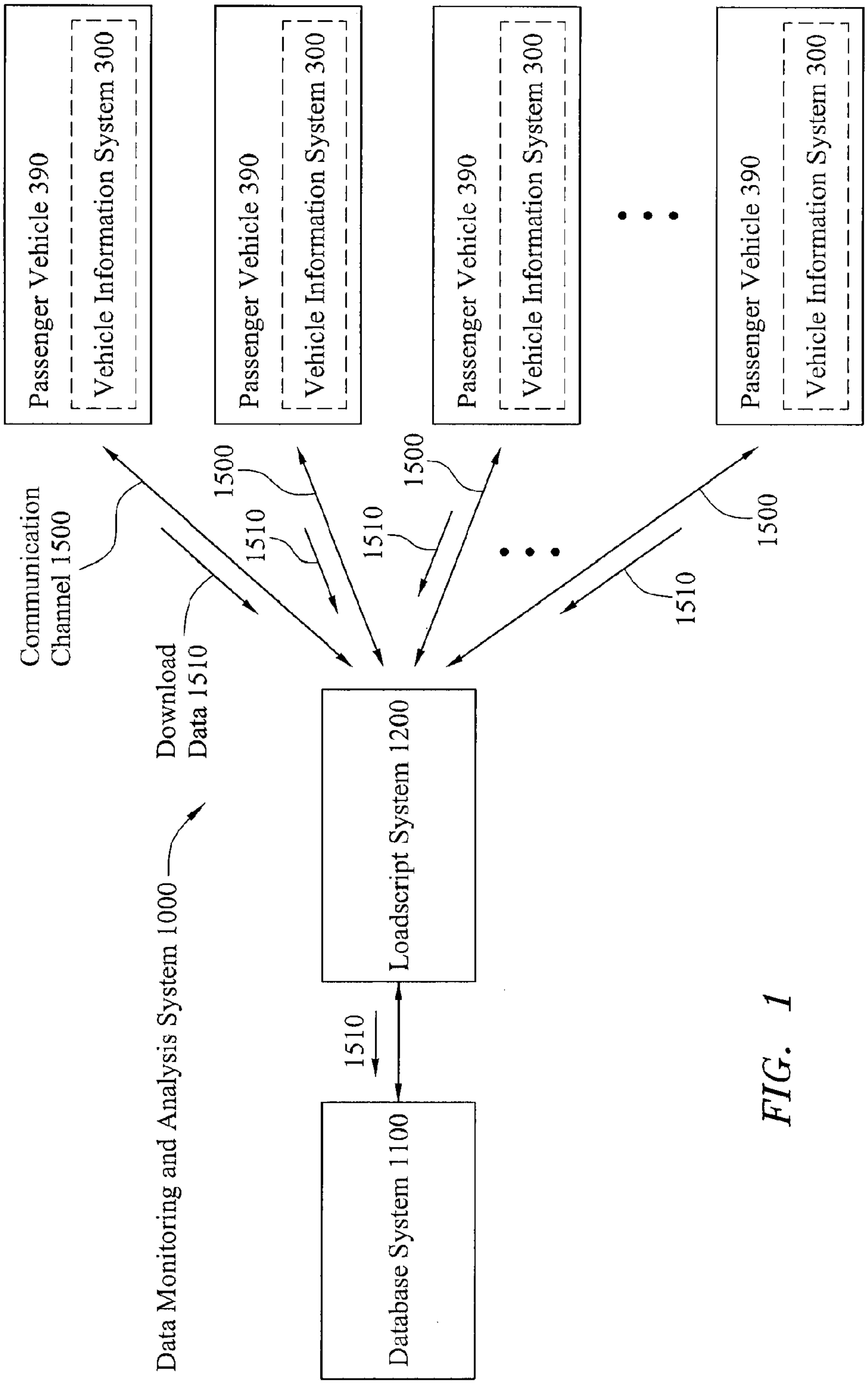
FIG. 1 is an exemplary top-level drawing illustrating an embodiment of a performance data monitoring and analysis system suitable for use with vehicle information systems installed aboard passenger vehicles.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Since conventional data analysis systems download and analyze system performance data accumulated by vehicle information systems only after travel is complete and thereby delay testing of the vehicle information systems, initiating any necessary repairs, and departing for subsequent travel, a performance data monitoring and analysis system that overcomes the aforementioned obstacles and deficiencies of currently-available data analysis systems can prove desirable and provide a basis for a wide range of system applications, such as passenger entertainment systems for installation and use aboard automobiles, aircraft, and other types of passenger vehicles during travel. This result can be achieved, according to one embodiment disclosed herein, by a data monitoring and analysis system 1000 for communicating with one or more vehicle information systems 300 installed aboard respective passenger vehicles 390 as illustrated in FIG. 1.

Turning to FIG. 1, the data monitoring and analysis system 1000 can comprise a comprehensive data analysis reliability tracking system that provides a web-based online maintenance tool (OMT) for receiving download data 1510 from the vehicle information systems 300, that can generate at least one performance report based upon the received download data 1510, that can track reliability for the vehicle information systems 300, and/or that can track in-service issue performance. The download data 1510 can include passenger usage information, aggregate performance information for the vehicle information systems 300, and/or performance information for one or more selected system components of the vehicle information systems 300. The data monitoring and analysis system 1000 thereby can generate performance reports and/or can track reliability for the vehicle information systems 300, in whole or in part. In other words, the data monitoring and analysis system 1000 can generate performance reports and/or can track reliability for the vehicle information systems 300 in their entireties and/or for selected system components of the vehicle information systems 300.

The data monitoring and analysis system 1000 is illustrated in FIG. 1 as including a database system 1100 and a loadscript system 1200. The loadscript system 1200 can be provided via one or more hardware components and/or software components and, in one embodiment, can comprise an application executed by a processing system. The loadscript system 1200 can establish at least one communication channel (or data pipe) 1500 for communicating with each vehicle information system 300 and can utilize the communication channel 1500 to receive download data 1510 accumulated by the vehicle information systems 300. The download data 1510 can be provided to the loadscript system 1200 in any conventional data format and preferably is provided in a preselected data format that is the same as, and/or that is compatible with, the data format in which the download data 1510 as stored by the vehicle information system 300.

The loadscript system 1200 can validate the received download data 1510 for each communication channel 1500. The validated download data 1510 can be parsed and provided to the database system 1100 for further analysis. The database system 1100 can store the download data 1510 in any conventional manner and, in one preferred embodiment, can support one or more other applications in addition to the data monitoring and analysis system 1000. Preferably comprising a conventional database system, the database system likewise 1100 likewise can be provided via one or more hardware components and/or software components, such as an application executed by a processing system, and, as desired, can be at least partially integrated with the loadscript system 1200. The processing system can be provided as a cluster of one or more computer-based server systems. In one embodiment, for example, the database system 1100 can comprise an Aircraft Ground Information System (AGIS) code database system.

The loadscript system 1200 preferably receives, validates, and/or parses the download data 1510 in an automated manner such as automatically upon establishing the communication channel 1500 with a preselected vehicle information system 300. As desired, the data monitoring and analysis system 1000 can include an interactive user interface system 1400 (shown in FIGS. 6A-G). The user interface system 1400, for example, can present at least one system status (or failure) message for the data monitoring and analysis system 1000 and, as appropriate, can provide an operator (not shown) with an opportunity to respond to the system status message. Illustrative system status messages can include a message for indicating that selected download data 1510 has been identified as being invalid and/or a message for indicating that the download data 1510 has not been successfully received (and/or stored) by the database system 1100.

In one embodiment, the invalid download data 1510, despite being identified as being invalid, can be provided to the database system 1100 for storage. The database system 1100 advantageously can identify the invalid download data 1510 as being invalid data. Thereby, the invalid download data 1510 can subsequently be retrieved from the database system 1100 and manually corrected to form valid download data 1510. The corrected download data 1510 then can be provided to the database system 1100 for storage. The database system 1100 can identify the corrected download data 1510 as comprising valid data. Optionally, the invalid download data 1510 can be deleted from the database system 1000 when the valid download data 1510 is provided. As desired, the invalid download data 1510 can be further analyzed in an effort to improve the manner by which the download data 1510 is transferred to the data monitoring and analysis system 1000 from the vehicle information systems 300.

Figure 2A:
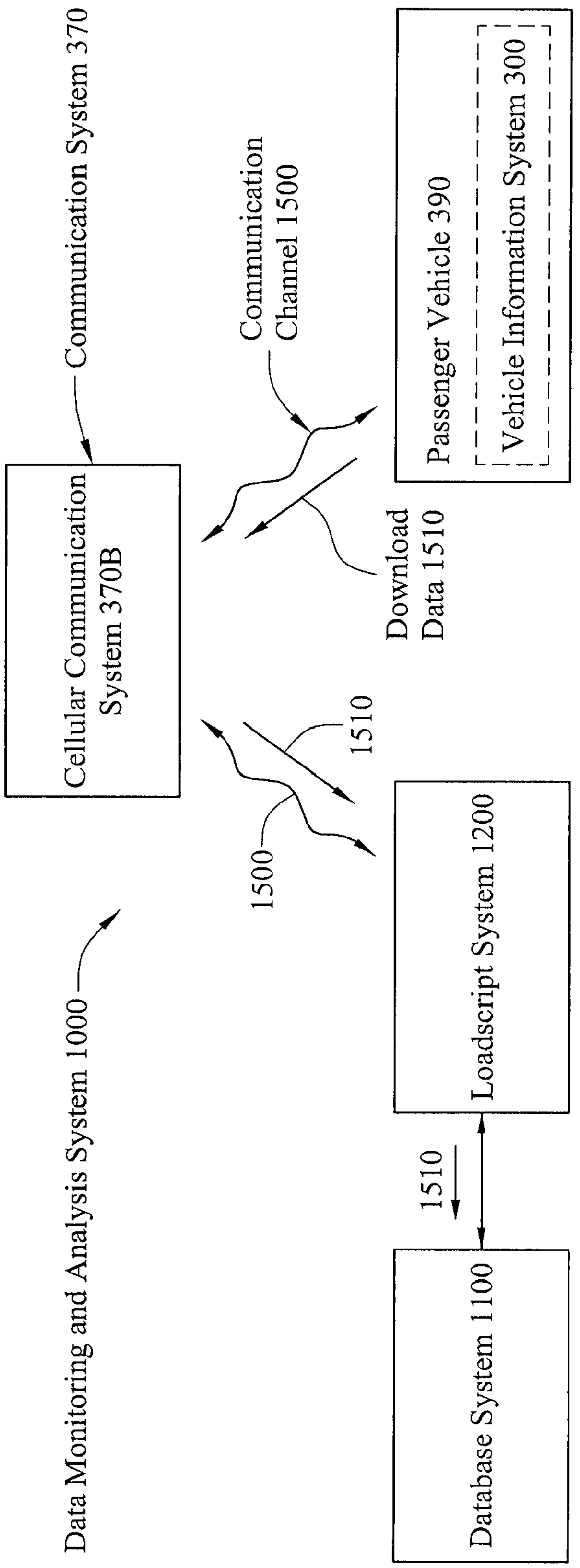
FIG. 2A is an exemplary top-level drawing illustrating an embodiment of the performance data monitoring and analysis system of FIG. 1, wherein the performance data monitoring and analysis system can communicate with a selected vehicle information system disposed at a predetermined geographical location.
Figure 2B:
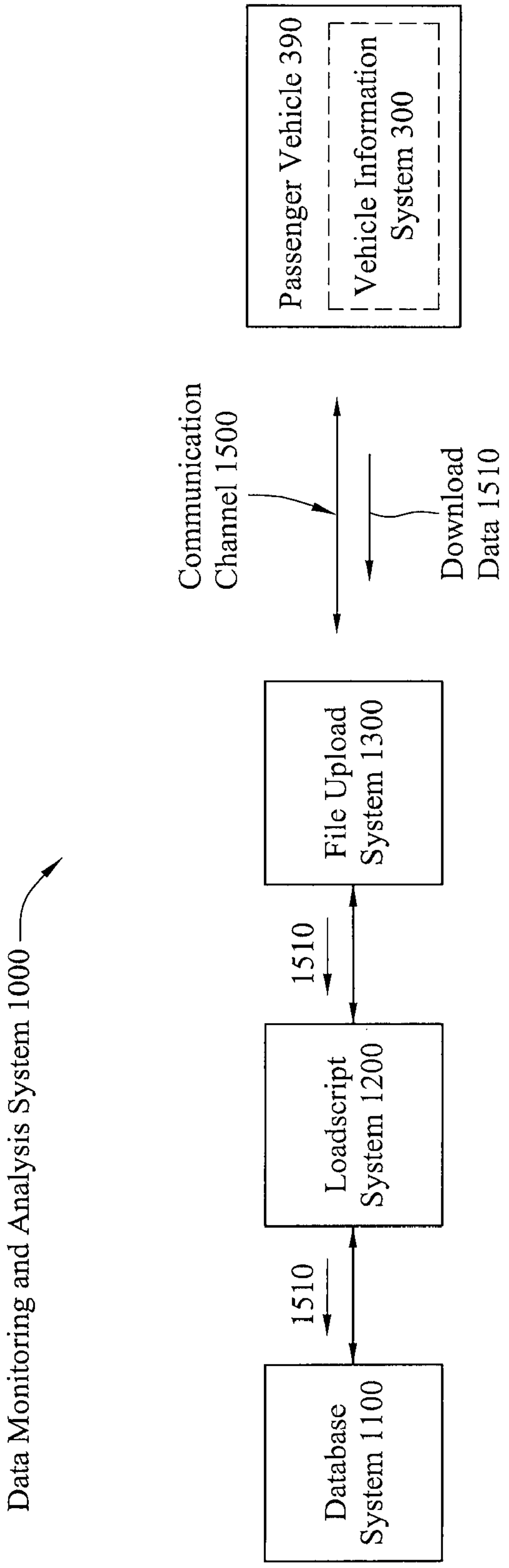
FIG. 2B is an exemplary top-level drawing illustrating an alternative embodiment of the performance data monitoring and analysis system of FIG. 2A, wherein the performance data monitoring and analysis system includes a file upload system for receiving download data that has been manually offloaded from the selected vehicle information system.

Advantageously, the data monitoring and analysis system 1000 and the vehicle information systems 300 can communicate in any conventional manner such that the data monitoring and analysis system 1000 can receive the download data 1510 virtually in real-time regardless of the geographic location and/or travel status of the respective vehicle information systems 300. Turning to FIGS. 2A-B, for example, a vehicle information system 300 is shown as being installed aboard a selected passenger vehicle 390 that is disposed at a predetermined geographical location. The predetermined geographical location can include any geographical location that is suitable for accommodating the selected passenger vehicle 390. If the selected passenger vehicle 390 comprises an automobile 390A (shown in FIG. 3A), for instance, the predetermined geographical location can comprise an automobile parking facility, such as a parking lot and/or a parking structure. Similarly, the predetermined geographical location can be a passenger transit terminal if the selected passenger vehicle 390 comprises a mass-transit passenger vehicle 390, such as an aircraft 390B (shown in FIG. 3B), a bus, a passenger train, a cruise ship, etc. The predetermined geographical location typically comprises, but is not limited to, a travel origin, a travel destination, and/or an intermediate travel stopover (or other location) for the selected passenger vehicle 390.

While the selected passenger vehicle 390 is disposed at the predetermined geographical location, the associated vehicle information system 300 can communicate, preferably in real time, with the data monitoring and analysis system 1000 in any conventional manner, including via wired and/or wireless communications. As illustrated in FIG. 2A, the vehicle information system 300 can wirelessly communicate with the data monitoring and analysis system 1000 via an intermediate communication system (or pipe handler system) 370. The communication system 370 can comprise any conventional type of wireless communication system, such as a broadband (and/or data 3) satellite communication system 370A, a cellular communication system 370B, and/or an Aircraft Ground Information System (AGIS) communication system, without limitation. In a preferred embodiment, the data monitoring and analysis system 1000 and the vehicle information systems 300 can communicate by way of an ARINC Communications Addressing & Reporting System (ACARS) provided by ARINC Incorporated of Annapolis, Md.

The loadscript system 1200 preferably can establish the communication channel 1500 for communicating with the vehicle information system 300 automatically when the selected passenger vehicle 390 approaches (and/or arrives at) the predetermined geographical location and thereby can receive the download data 1510 in the manner set forth above with reference to FIG. 1. Transfer of the download data 1510 likewise can be initiated manually and/or automatically when the communication channel 1500 is established. As desired, the loadscript system 1200 can maintain the communication channel 1500 while the selected passenger vehicle 390 remains disposed at the predetermined geographical location, terminating the communication channel 1500 upon departure from the predetermined geographical location. Alternatively, and/or additionally, the loadscript system 1200 can terminate the communication channel 1500 even though the selected passenger vehicle 390 remains disposed at the predetermined geographical location. For instance, the communication channel 1500 can be terminated once the transfer of the download data 1510 is complete. The received download data 1510 can be processed by the loadscript system 1200 and provided to the database system 1100 in the manner set forth in more detail above.

If wired communications are desired, a communication cable assembly (not shown) can be disposed between, and couple, the data monitoring and analysis system 1000 and the vehicle information system 300. The communication cable assembly can be provided in any conventional manner, and the loadscript system 1200 can establish the communication channel 1500 for communicating with the vehicle information system 300 automatically when the loadscript system 1200 and the vehicle information system 300 are coupled. Transfer of the download data 1510 likewise can be initiated manually and/or automatically when the communication channel 1500 is established. The loadscript system 1200 thereby can receive the download data 1510, preferably in real time, via the communication cable assembly in the manner set forth above. The received download data 1510 can be processed by the loadscript system 1200 and provided to the database system 1100 in the manner set forth in more detail above.

Alternatively, and/or additionally, the download data 1510 can be manually downloaded from the vehicle information system 300. In other words, the vehicle information system 300 can store the download data 1510 on removable media (not shown), such as a conventional hard disk, floppy disk, optical disk, compact disk, and/or FLASH media, without limitation. The removable media can be removed from the vehicle information system 300 by a technician after travel is complete and can be physically (or manually) delivered to the data monitoring and analysis system 1000. The communication channel 1500 thereby can include the physical (or manual) delivery of the removable media. Preferably, the technician installs another removable media for permitting the vehicle information system 300 to accumulate additional download data 1510 during subsequent travel.

Turning to FIG. 2B, the data monitoring and analysis system 1000 is shown as further including a file upload system 1300 for facilitating receipt of the download data 1510 via the physical delivery of the removable media. The file upload system 1300 is shown as being disposed between the loadscript system 1200 and the vehicle information system 300 and can enable a system operator (not shown) to move the manually-offloaded download data 1510 to the database system 1100. When communicating with the removable media, the file upload system 1300 can receive the download data 1510 from the removable media and can provide the received download data 1510 to the loadscript system 1200. The loadscript system 1200 thereby can receive the download data 1510 in the manner set forth in more detail above with reference to FIG. 1. Advantageously, the file upload system 1300 can provide the download data 1510, in selected part and/or in its entirety, to the loadscript system 1200. The received download data 1510 can be processed by the loadscript system 1200 and provided to the database system 1100 in the manner discussed above.

In one embodiment of the data monitoring and analysis system 1000, the file upload system 1300 likewise can provide an interactive user interface system 1400 (shown in FIGS. 6A-G) for assisting the system operator with the transfer of the download data 1510 from the removable media. For example, the user interface system 1400 can enable the system operator to select one or more files of the download data 1510 for transfer from the removable media. As desired, the user interface system 1400 also can present a suitable message to the system operator if an error occurs during the transfer and/or storage of the download data 1510 within the data monitoring and analysis system 1000. In other words, the file uploader system 1300 can provide error feedback to the system operator regarding the download data 1510, provide error feedback passed from the loadscript system 1200 through the file uploader system 1300 about database populations in the database system 1100, and/or rack support for Acceptance Test Procedure (ATP) and other systems. The system operator thereby can readily attempt to remedy the error.

Figure 2C:
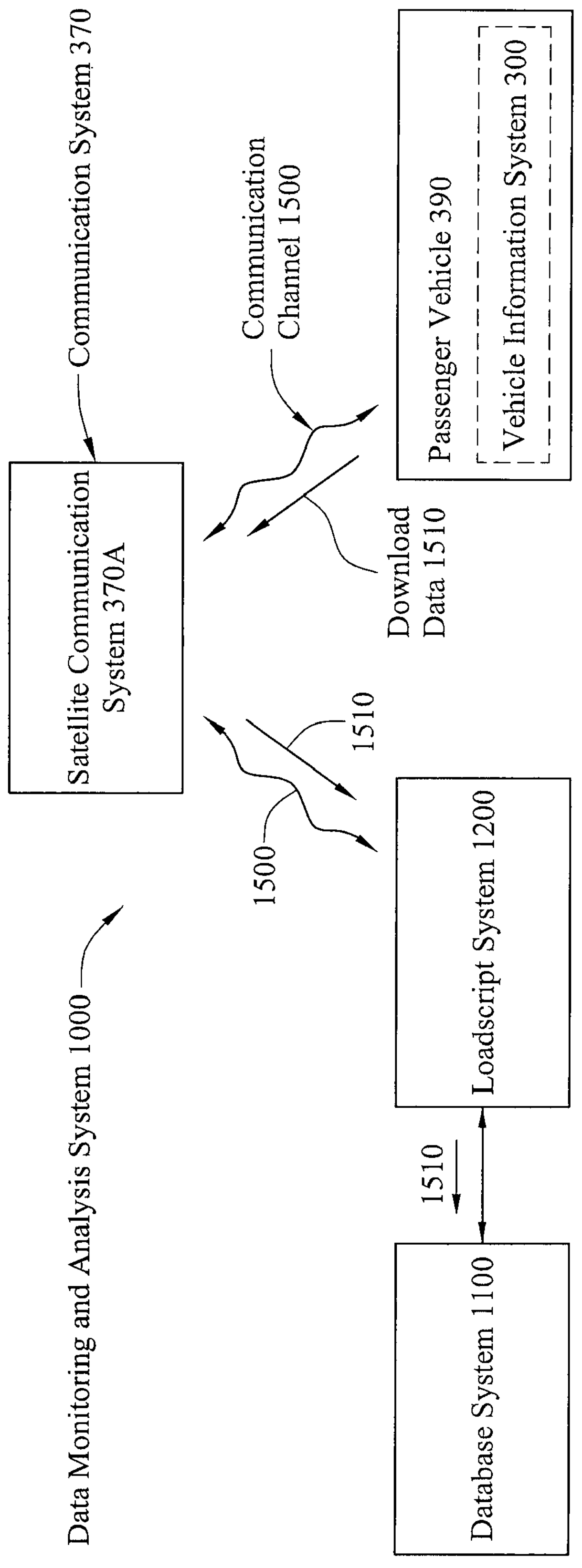
FIG. 2C is an exemplary top-level drawing illustrating an alternative embodiment of the performance data monitoring and analysis system of FIG. 1, wherein the performance data monitoring and analysis system can communicate with a selected vehicle information system during travel.

Turning to FIG. 2C, the data monitoring and analysis system 1000 is shown as being alternatively and/or additionally configured to support communications with a selected vehicle information system 300 during travel. The loadscript system 1200 can communicate with the selected vehicle information system 300 in any conventional manner, including directly and/or, as illustrated in FIG. 2C, indirectly via an intermediate communication system 370. Although illustrated as being a satellite communication system 370A for purposes of illustration, the communication system 370 can be provided in the manner set forth in more detail above with reference to the communication system 370 (shown in FIG. 2A) and can support conventional wireless communications between the loadscript system 1200 and the selected vehicle information system 300. The loadscript system 1200 thereby can establish the communication channel 1500 for communicating with the vehicle information system 300 and can receive the download data 1510 in the manner set forth in more detail above with reference to FIG. 1. The received download data 1510 can be processed by the loadscript system 1200 and provided to the database system 1100 in the manner discussed above.

Preferably, the communication system 370 enables the loadscript system 1200 to maintain the communication channel 1500 with the vehicle information system 300 continuously throughout travel such that the download data 1510 can be provided to the data monitoring and analysis system 1000 in real time. The communication channel 1500 however can be intermittently established, as desired, in accordance with a predetermined criteria. For example, the loadscript system 1200 can establish the communication channel 1500 periodically at preselected time intervals, and/or the vehicle information system 300 can initiate the communication channel 1500 if a preselected condition, such as a system component failure of the vehicle information system 300, arises aboard the passenger vehicle 390. The vehicle information system 300 thereby can provide the download data 1510 to the loadscript system 1200 during travel.

The data monitoring and analysis system 1000 thereby can advantageously provide a solution for enabling an owner and/or operator of the passenger vehicles 390 to perform real-time monitoring of the performance of the vehicle information systems 300 at any time, including before, during, and/or after travel. The passenger vehicles 390, for example, can comprise a fleet of passenger vehicles 390. Illustrative fleets of passenger vehicles 390 can include a fleet of automobiles 390A (shown in FIG. 3A) operated by a taxi company or car rental company, a fleet of busses operated by a bus company, a fleet of aircraft 390B (shown in FIG. 3B) operated by an airline, and/or a fleet of passenger ships operated by a cruise line company, without limitation. Since the data monitoring and analysis system 1000 can receive the download data 1510 accumulated by the vehicle information systems 300, the loadscript system 1200 can validate and/or parse the received download data 1510 in real time and provide the resultant download data 1510 to the normalized database system 1100. The large volume of download data 1510 thereby can be presented in a meaningful manner, such as by way of high content resolution graphs presented on one or more display systems, for rapid human intervention, as needed.

As applied to fleets of aircraft 390B operated by an airline, for instance, each fleet can be defined as a function of a selected airframe type, a predetermined seating configuration within the selected airframe type, a selected vehicle information system type, and/or a software version (or build) for the selected vehicle information system type. It is understood that the airline can operate one or more fleets of aircraft 390B. The online maintenance tool of the data monitoring and analysis system 1000 thereby can be configured to accommodate maintenance controllers, to accommodate maintenance engineers, and/or to review the download data 1510 from the vehicle information systems 300 installed aboard the aircraft 390B over time. The review the download data 1510 preferably is not limited to aircraft Built In Test Equipment (BITE) data usage where little trending typically can be done due to short turn arounds. In one embodiment, for example, all airlines, fleets, and/or aircraft 390B can be compared using at least one standardized metric.

Rather than being limited to analyzing contractual performance wherein the terms of a specific contact can influence the analysis download data 1510, the online maintenance tool likewise can be configured to utilize BITE data to make one or more comparisons. For example, the online maintenance tool can compare aircraft 390B within a selected fleet of an airline to each other, compare fleets within the selected airline to each other, and/or compare fleets of two or more airlines to each other. The online maintenance tool likewise can compare the performance of at least one selected line replaceable unit (or LRU) within the selected airline and/or the performance of the selected line replaceable unit on a global basis. BITE messages from the selected line replaceable unit and/or the MMN likewise can be compared. Alternatively, and/or additionally, the online maintenance tool can provide BITE coverage by tail number of the aircraft 390B.

Use of the data monitoring and analysis system 1000 therefore can result in a reduced cost of ownership for operating the fleet of passenger vehicles 390. The data monitoring and analysis system 1000, for example, can help vehicle operators prevent problems, identify and rectify problems sooner, and better manage technical resources. The data monitoring and analysis system 1000 likewise can facilitate use of the download data 1510 to proactively identify subtle performance trends ahead of customer impact, can improve BITE data accuracy, improve overall system reliability, and/or improve system component reliability. For instance, BITE data accuracy can be improved by improving BITE data quality, reviewing message counts, categorizing faults appropriately as maintenance (or engineering) messages, and driving LRU-level BITE design higher; whereas, reliability can be improved by monitoring system performance live and responding to trends. Thereby, the data monitoring and analysis system 1000 can comprise a tool whereby airlines and other vehicle operators can transparently measure performance of the vehicle information systems 300 in a plurality of categories.

The data monitoring and analysis system 1000 advantageously can answer many types of questions regarding vehicle information system operation for a wide range of audiences.

The data monitoring and analysis system 1000, for instance, can provide reports on fleet seat availability, fleet seat degradation rates, vehicle information system health across a fleet of passenger vehicles 390, performance comparisons across different passenger vehicle platforms, and/or any correlation between fleet performance and passenger satisfaction. These reports can be provided to a maintenance crew for identifying and repairing problems with a selected vehicle information system 300; whereas, management can use the reports to analyze system performance trends. Executives can review the reports in an effort to determine the status of the fleet health, and vehicle information systems manufacturers can utilize the reports to maintain oversight of vehicle information system performance.

Figure 3A:
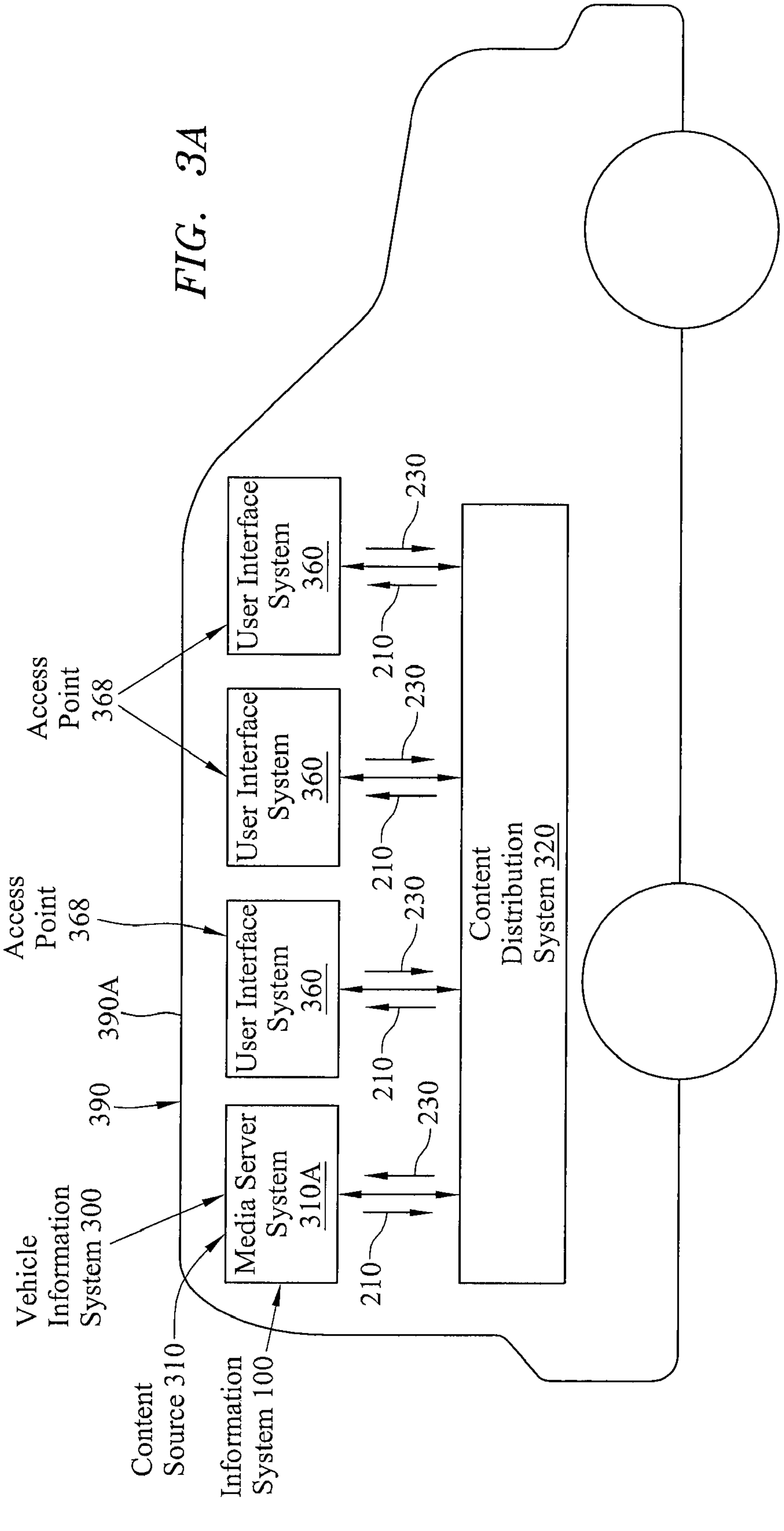
FIG. 3A is an exemplary top-level drawing illustrating an embodiment of the vehicle information systems of FIG. 1, wherein a selected vehicle information system is installed aboard an automobile.
Figure 3B:
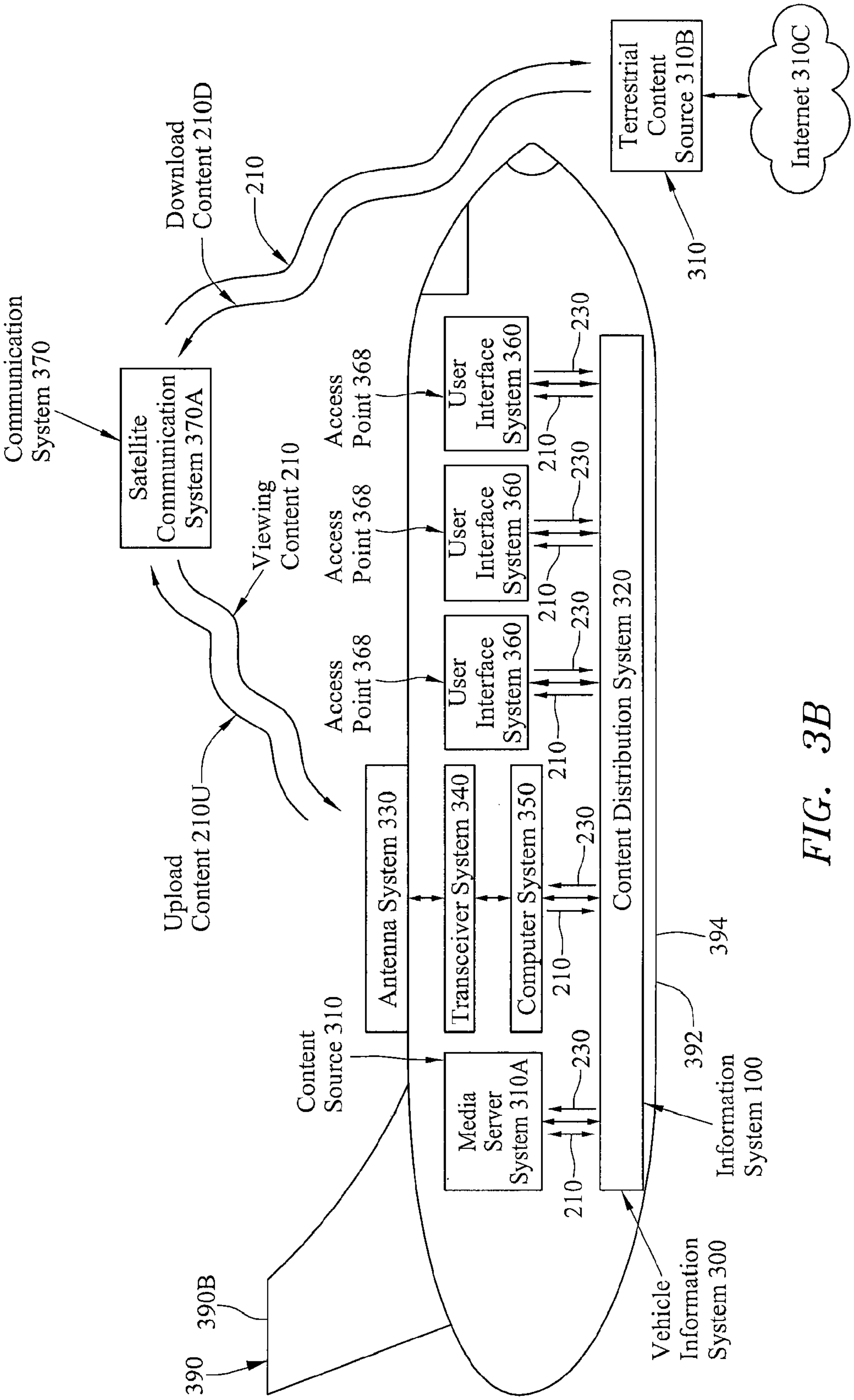
FIG. 3B is an exemplary top-level drawing illustrating an alternative embodiment of the vehicle information systems of FIG. 1, wherein a selected vehicle information system is installed aboard an aircraft.

Although suitable for supporting real-time monitoring of the performance of information systems that are disposed in fixed locations, such as a building, the data monitoring and analysis system 1000 preferably is applied in portable system applications. Turning to FIGS. 3A-B, for example, one embodiment of a vehicle information system 300 suitable for installation aboard a wide variety of passenger vehicles 390 is shown. Exemplary types of passenger vehicles can include an automobile 390A (shown in FIG. 3A), an aircraft 390B (shown in FIG. 3B), a bus, a recreational vehicle, a boat, a train, and/or any other type of passenger vehicle without limitation. If installed on an aircraft 390B as illustrated in FIG. 3B, for example, the vehicle information system 300 can comprise a conventional aircraft passenger in-flight entertainment system, such as the Series 2000, 3000, eFX, and/or eX2 in-flight entertainment system as manufactured by Panasonic Avionics Corporation (formerly known as Matsushita Avionics Systems Corporation) of Lake Forest, Calif. Although primarily shown and described with reference to use with vehicle information systems 300 that are installed aboard aircraft 390B for purposes of illustration only, the data monitoring and analysis system 1000 disclosed herein can be equally applicable to any conventional type of passenger vehicle 390 without limitation.

The vehicle information 300 can be provided in the manner set forth in the co-pending United States patent applications, entitled "SYSTEM AND METHOD FOR DOWNLOADING FILES," application Ser. No. 10/772,565, filed on Feb. 4, 2004; entitled "SYSTEM AND METHOD FOR MANAGING CONTENT ON MOBILE PLATFORMS," application Ser. No. 11/123,327, filed on May 6, 2005; entitled "PORTABLE MEDIA DEVICE AND METHOD FOR PRESENTING VIEWING CONTENT DURING TRAVEL," application Ser. No. 11/154,749, filed on Jun. 15, 2005; entitled "SYSTEM AND METHOD FOR RECEIVING BROADCAST CONTENT ON A MOBILE PLATFORM DURING INTERNATIONAL TRAVEL," application Ser. No. 11/269,378, filed on Nov. 7, 2005; entitled "SYSTEM AND METHOD FOR INTERFACING A PORTABLE MEDIA DEVICE WITH A VEHICLE INFORMATION SYSTEM," Application Serial No. 12/210,624, filed on Sep. 15, 2008; entitled "MEDIA DEVICE INTERFACE SYSTEM AND METHOD FOR VEHICLE INFORMATION SYSTEMS," application Ser. No. 12/210,636, filed on Sep. 15, 2008; entitled "MEDIA DEVICE INTERFACE SYSTEM AND METHOD FOR VEHICLE INFORMATION SYSTEMS," application Ser. No. 12/210,652, filed on Sep. 15, 2008; entitled "PORTABLE USER CONTROL DEVICE AND METHOD FOR VEHICLE INFORMATION SYSTEMS," Application Serial No. 12/210,689, filed on Sep. 15, 2008; entitled "SYSTEM AND METHOD FOR RECEIVING BROADCAST CONTENT ON A MOBILE PLATFORM DURING TRAVEL," application Ser. No. 12/237,253, filed on Sep. 24, 2008; and entitled "SYSTEM AND METHOD FOR PRESENTING ADVERTISEMENT CONTENT ON A MOBILE PLATFORM DURING TRAVEL," application Ser. No. 12/245,521, filed on Oct. 3, 2008, which are assigned to the assignee of the present application and the respective disclosures of which are hereby incorporated herein by reference in their entireties.

As shown in FIGS. 3A-B, the vehicle information system 300 comprises at least one conventional content source 310 and one or more user (or passenger) interface systems 360 that communicate via a real-time content distribution system 320. The content sources 310 can include one or more internal content sources, such as a media (or content) server system 310A, that are installed aboard the passenger vehicle 390 and/or at least one remote (or terrestrial) content source 310B that can be external from the passenger vehicle 390. The media server system 310A can comprise an information system controller for providing overall system control functions for the vehicle information system 300 and/or can store viewing content 210, such as preprogrammed viewing content and/or downloaded viewing content 210D, for selection, distribution, and presentation. The viewing content 210 can include any conventional type of audio and/or video viewing content, such as stored (or time-delayed) viewing content and/or live (or real-time) viewing content, without limitation. As desired, the media server system 310A likewise can support decoding and/or digital rights management (DRM) functions for the vehicle information system 300.

Being configured to distribute and/or present the viewing content 210 provided by one or more selected content sources 310, the vehicle information system 300 can communicate with the content sources 310 in real time and in any conventional manner, including via wired and/or wireless communications. The vehicle information system 300 and the terrestrial content source 310B, for example, can communicate in any conventional wireless manner, including directly and/or indirectly via an intermediate communication system 370 in the manner set forth in more detail above with reference to the communication system 370 (shown in FIGS. 2A, 2C). The vehicle information system 300 thereby can receive download viewing content 210D from a selected terrestrial content source 310B and/or transmit upload viewing content 210U to the terrestrial content source 310B. As desired, the terrestrial content source 310B can be configured to communicate with other terrestrial content sources (not shown). The terrestrial content source 310B is shown in FIG. 3B as providing access to the Internet 310C.

To facilitate communications with the terrestrial content sources 310B, the vehicle information system 300 can include an antenna system 330 and a transceiver system 340 for receiving the viewing content 210 from the remote (or terrestrial) content sources 310B as shown in FIG. 3B. The antenna system 330 preferably is disposed outside the passenger vehicle 390, such as any suitable exterior surface 394 of a fuselage 392 of the aircraft 390B. The antenna system 330 can receive viewing content 210 from the terrestrial content source 310B and provide the received viewing content 210, as processed by the transceiver system 340, to a computer system 350 of the vehicle information system 300. The computer system 350 can provide the received viewing content 210 to the media server system 310A and/or to one or more of the user interfaces 360, as desired. Although shown and described as being separate systems for purposes of illustration only, the computer system 350 and the media server system 310A can be at least partially integrated, as desired.

Figure 4:
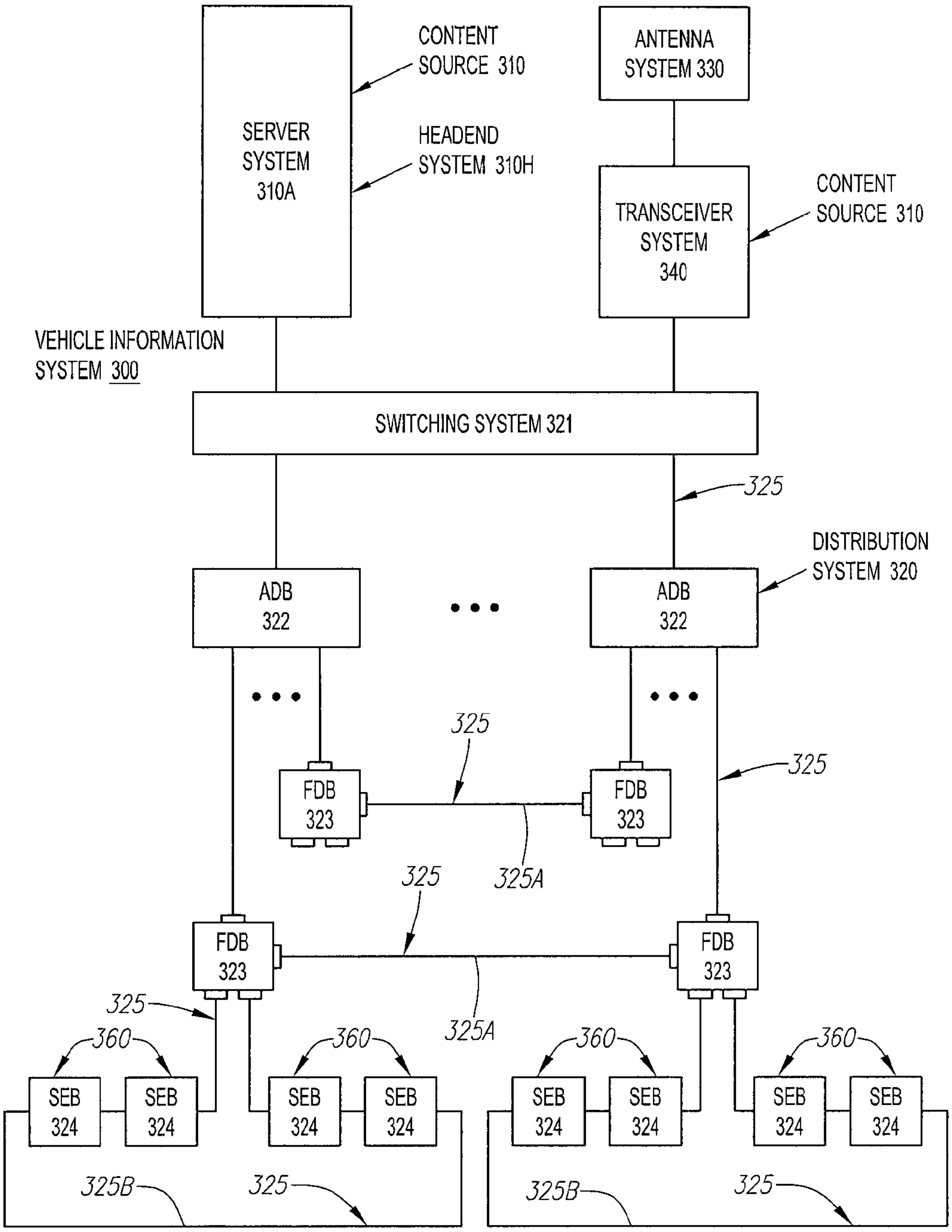
FIG. 4 is an exemplary detail drawing illustrating a preferred embodiment of a distribution system for the vehicle information systems of FIGS. 3A-B.

FIG. 4 illustrates an exemplary content distribution system 320 for the vehicle information system 300. The content distribution system 320 of FIG. 4 couples, and supports communication between a headend system 310H, which includes the content sources 310, and the plurality of user interface systems 360. Stated somewhat differently, the components, including the content sources 310 and the user interface systems 360, of the vehicle information system 300 are shown as communicating via the content distribution system 320. The distribution system 320 of FIG. 4 is provided in the manner set forth co-pending United States patent application, entitled "SYSTEM AND METHOD FOR ROUTING COMMUNICATION SIGNALS VIA A DATA DISTRIBUTION NETWORK," application Ser. No. 11/277,896, filed on Mar. 29, 2006, and in U.S. Pat. Nos. 5,596,647, 5,617,331, and 5,953,429, each entitled "INTEGRATED VIDEO AND AUDIO SIGNAL DISTRIBUTION SYSTEM AND METHOD FOR USE ON COMMERCIAL AIRCRAFT AND OTHER VEHICLES," which are assigned to the assignee of the present application and the respective disclosures of which are hereby incorporated herein by reference in their entireties and for all purposes.

Alternatively, and/or additionally, the distribution system 320 can be provided in the manner set forth in the co-pending United States patent application, entitled "OPTICAL COMMUNICATION SYSTEM AND METHOD FOR DISTRIBUTING CONTENT ABOARD A MOBILE PLATFORM DURING TRAVEL," application Ser. No. 12/367,406, filed Feb. 6, 2009, which is assigned to the assignee of the present application and the disclosure of which is hereby incorporated herein by reference in its entirety and for all purposes. As desired, the distribution system 320 likewise can include a network management system (not shown) provided in the manner set forth in co-pending United States patent applications, entitled "SYSTEM AND METHOD FOR IMPROV- ING NETWORK RELIABILITY," application Ser. No. 10/773,523, filed on Feb. 6, 2004, and entitled "SYSTEM AND METHOD FOR IMPROVING NETWORK RELIABILITY," application Ser. No. 11/086,510, filed on Mar. 21, 2005, which are assigned to the assignee of the present application and the respective disclosures of which are hereby incorporated herein by reference in their entireties.

As illustrated in FIG. 4, the distribution system 320 can be provided as a plurality of area distribution boxes (or ADBs) 322, a plurality of floor disconnect boxes (or FDBs) 323, and a plurality of seat electronics boxes (or SEBs) (and/or video seat electronics boxes (or VSEBs) and/or premium seat electronics boxes (or PSEBs)) 324 being configured to communicate in real time via a plurality of wired and/or wireless communication connections 325. The distribution system 320 likewise can include a switching system 321 for providing an interface between the distribution system 320 and the headend system 310H. The switching system 321 can comprise a conventional switching system, such as an Ethernet switching system, and is configured to couple the headend system 310H with the area distribution boxes 322. Each of the area distribution boxes 322 is coupled with, and communicates with, the switching system 321.

Each of the area distribution boxes 322, in turn, is coupled with, and communicates with, at least one floor disconnect box 323. Although the area distribution boxes 322 and the associated floor disconnect boxes 323 can be coupled in any conventional configuration, the associated floor disconnect boxes 323 preferably are disposed in a star network topology about a central area distribution box 322 as illustrated in FIG. 4. Each floor disconnect box 323 is coupled with, and services, a plurality of daisy-chains of seat electronics boxes 324. The seat electronics boxes 324, in turn, are configured to communicate with the user interface systems 360. Each seat electronics box 324 can support one or more of the user interface systems 360.

The switching systems 321, the area distribution boxes 322, the floor disconnect boxes 323, the seat electronics boxes 324, the antenna system 330, the transceiver system 340, the content source 310, the media server system 310A, the headend system 310H, the video interface systems 362 (shown in FIGS. 5A-B), the audio interface systems 364 (shown in FIGS. 5A-B), the user input systems 366 (shown in FIGS. 5A-B), and other resources (and/or components) of the vehicle information system 300 preferably are provided as line replaceable units (or LRUs) 326. The use of line replaceable units 326 facilitate maintenance of the vehicle information system 300 because a defective line replaceable unit 326 can simply be removed from the vehicle information system 300 and replaced with a new (or different) line replaceable unit 326. The defective line replaceable unit 326 thereafter can be repaired for subsequent installation. Advantageously, the use of line replaceable units 326 can promote flexibility in configuring the content distribution system 320 by permitting ready modification of the number, arrangement, and/or configuration of the system resources of the content distribution system 320. The content distribution system 320 likewise can be readily upgraded by replacing any obsolete line replaceable units 326 with new line replaceable units 326.

As desired, the floor disconnect boxes 323 advantageously can be provided as routing systems and/or interconnected in the manner set forth in the above-referenced co-pending United States patent application, entitled "SYSTEM AND METHOD FOR ROUTING COMMUNICATION SIGNALS VIA A DATA DISTRIBUTION NETWORK," application Ser. No. 11/277,896, filed on Mar. 29, 2006. The distribution system 320 can include at least one FDB internal port bypass connection 325A and/or at least one SEB loopback connection 325B. Each FDB internal port bypass connection 325A is a communication connection 325 that permits floor disconnect boxes 323 associated with different area distribution boxes 322 to directly communicate. Each SEB loopback connection 325B is a communication connection 325 that directly couples the last seat electronics box 324 in each daisy-chain of seat electronics boxes 324 for a selected floor disconnect box 323 as shown in FIG. 4. Each SEB loopback connection 325B therefore forms a loopback path among the daisy-chained seat electronics boxes 324 coupled with the relevant floor disconnect box 323.

Figure 5A:
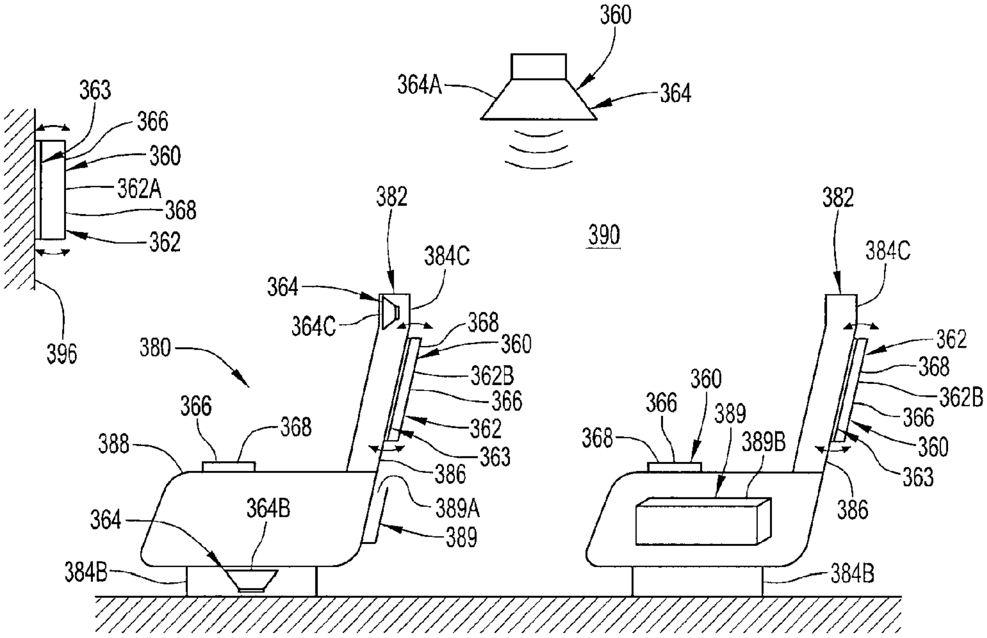
FIG. 5A is an exemplary top-level drawing illustrating an embodiment of a passenger cabin of the passenger vehicles of FIG. 1, wherein the vehicle information system of FIGS. 3A-B has been installed.

FIG. 5A provides a view of an exemplary passenger cabin 380 of a passenger vehicle 390, such as the automobile 390A (shown in FIG. 3A) and/or the aircraft 390B (shown in FIG. 3B), aboard which the vehicle information system 300 has been installed. The passenger cabin 380 is illustrated as including a plurality of passenger seats 382, and each passenger seat 382 is associated with a selected user interface system 360. Each user interface system 360 can include a video interface system 362 and/or an audio interface system 364. Exemplary video interface systems 362 can include overhead cabin display systems 362A with centralized controls, seatback display systems 362B or armrest display systems (not shown) each with individualized controls, crew display panels, and/or handheld video presentation systems.

The audio interface systems 364 of the user interface systems 360 can be provided in any conventional manner and can include an overhead speaker system 364A, the handheld audio presentation systems, and/or headphones coupled with an audio jack provided, for example, at an armrest 388 of the passenger seat 382. One or more speaker systems likewise can be associated with the passenger seat 382, such as a speaker system 364B disposed within a base 384B of the passenger seat 382 and/or a speaker system 364C disposed within a headrest 384C of the passenger seat 382. In a preferred embodiment, the audio interface system 364 can include an optional noise-cancellation system for further improving sound quality produced by the audio interface system 364.

Figure 11A:
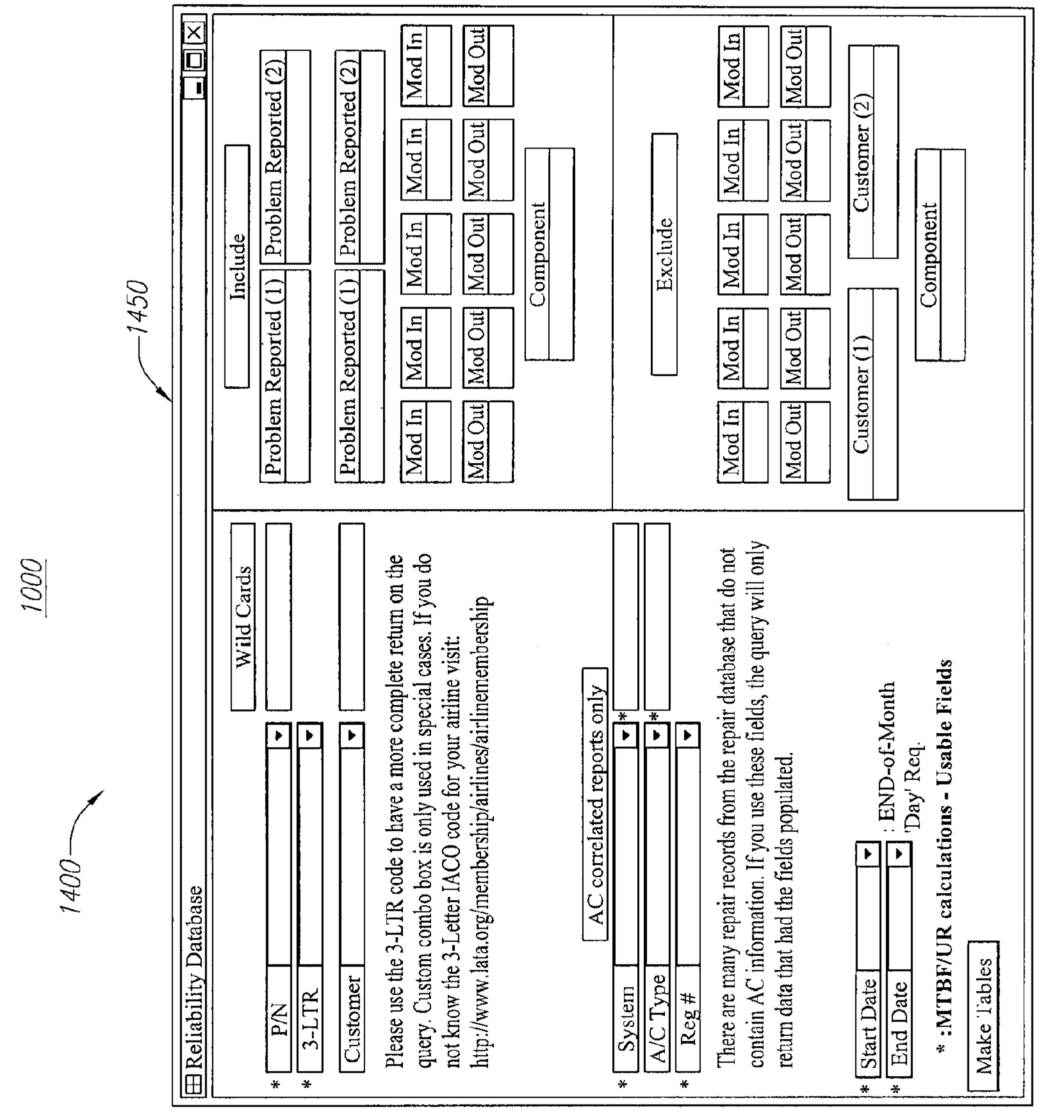
FIG. 11A is an exemplary detail drawing illustrating still another alternative embodiment of the performance data monitoring and analysis system of FIG. 1, wherein the user interface system provides a reliability calculation system for generating further system reports.
Figure 11B:
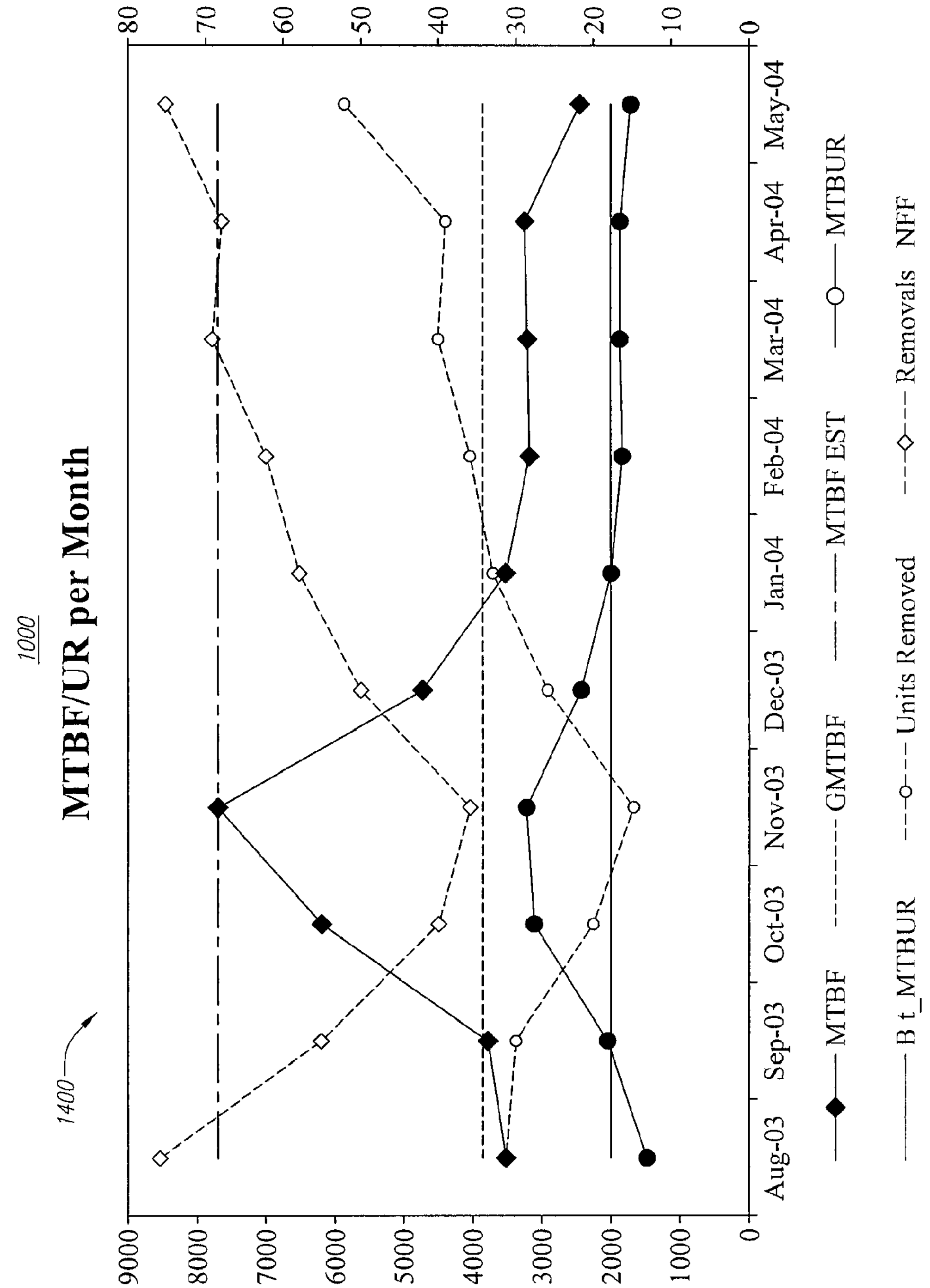
FIGS. 11B-E is are exemplary detail drawings illustrating alternative embodiments of selected system reports that can be provided by the reliability calculation system of FIG. 11A.
Figure 11C:
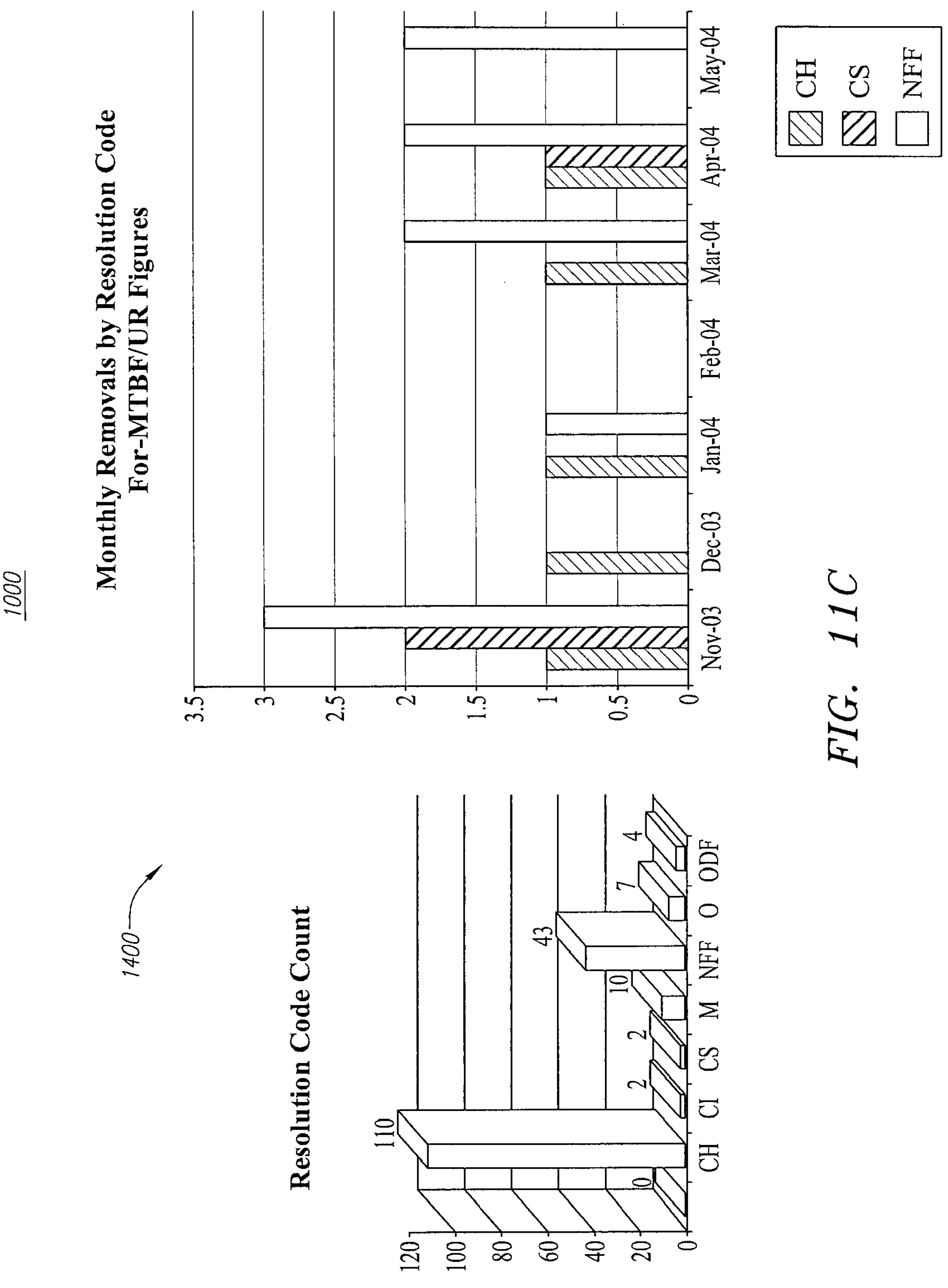
Figure 11D:
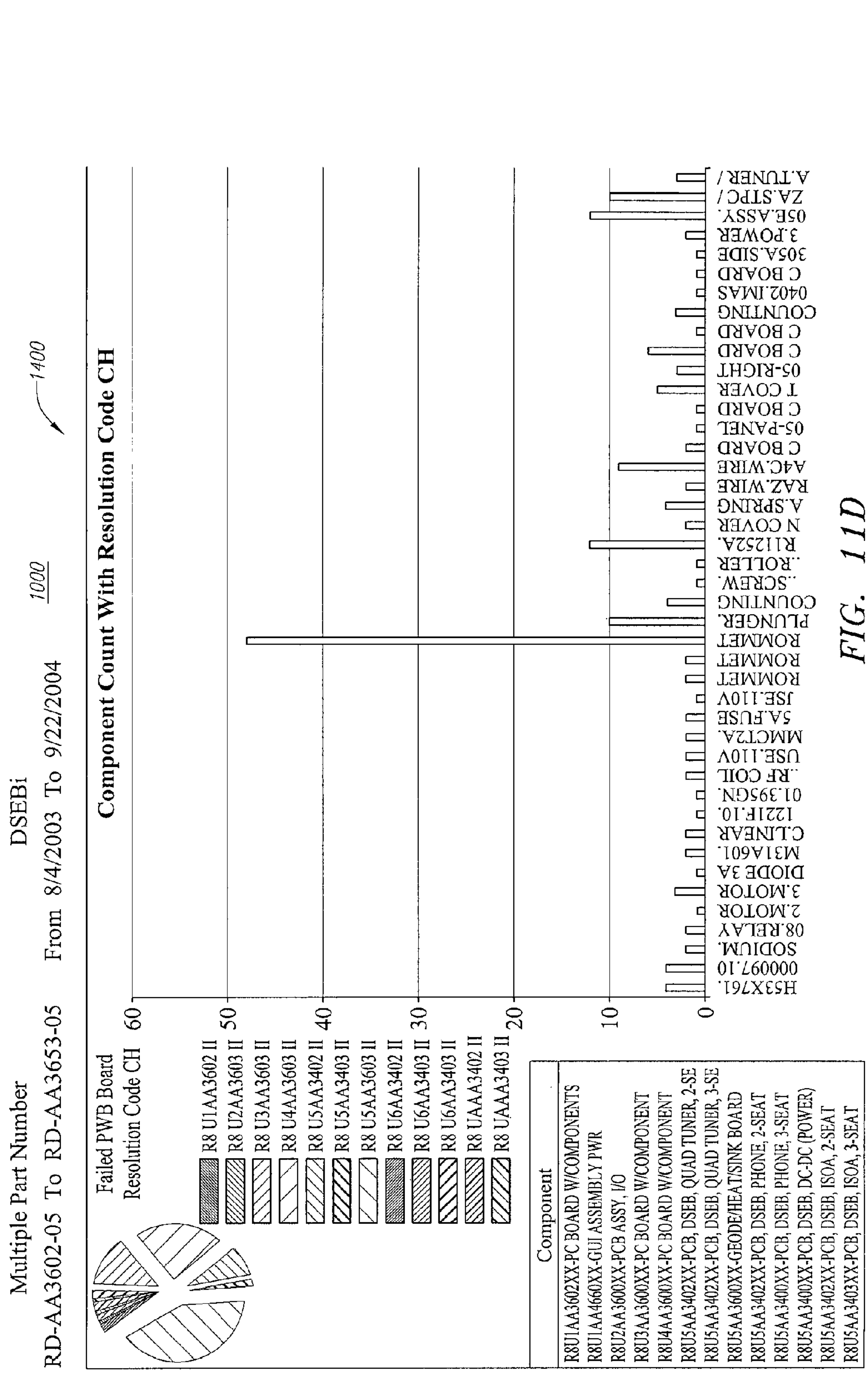
Figure 11E:
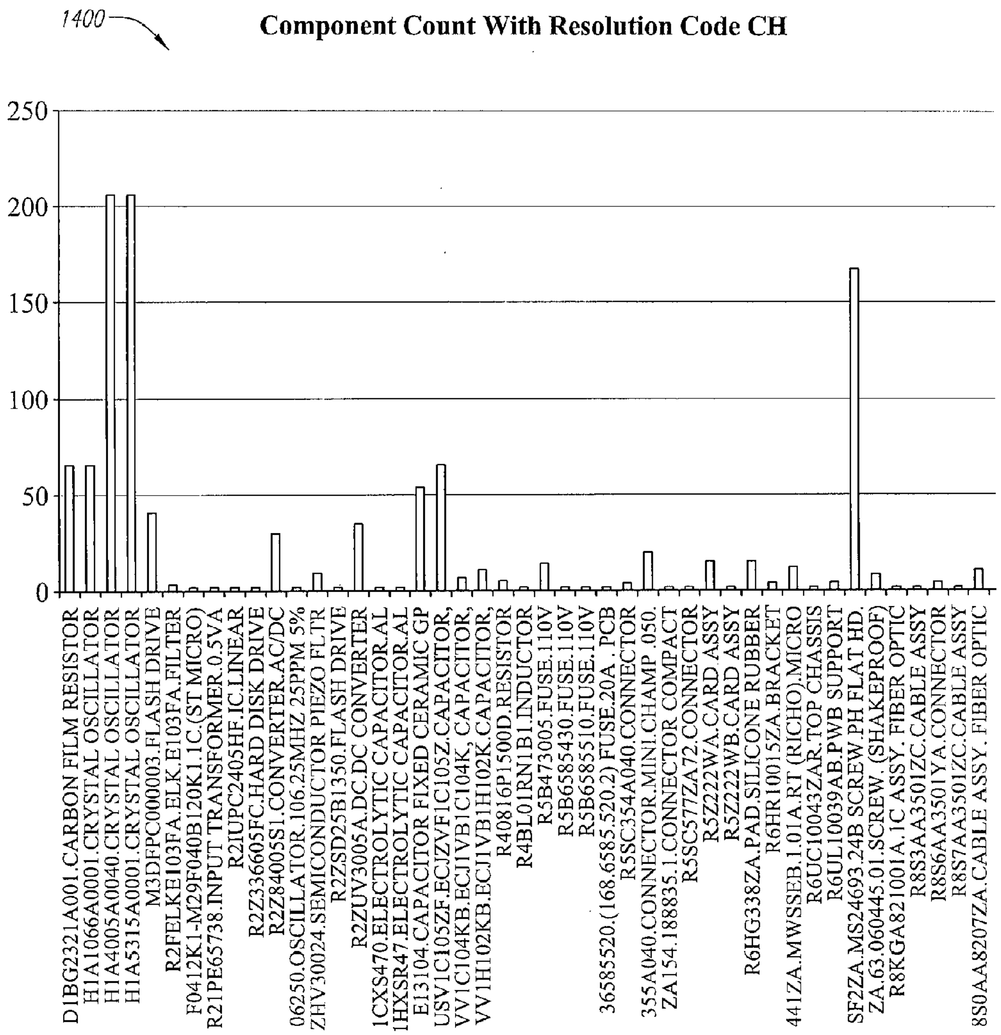

As shown in FIG. 5A, the user interface system 360 likewise can include an input system 366 for permitting a user (or passenger) to communicate with the vehicle information system 300. The input system 366 can be provided in any conventional manner and typically includes one or more switches (or pushbuttons), such as a keyboard or a keypad, and/or a pointing device, such as a mouse, trackball, and/or stylus. As desired, the input system 366 can be at least partially integrated with, and/or separable from, the associated video interface system 362 and/or audio interface system 364. For example, the video interface system 362 and the input system 366 can be provided as a touchscreen display system. The input system 366 likewise can include one or more peripheral communication connectors 366P (or ports) (shown in FIG. 11B) for coupling a peripheral input device (not shown), such as a full-size computer keyboard, an external mouse, and/or a game pad, with the vehicle information system 300.

Preferably, at least one of the user interface systems 360 includes a wired and/or wireless access point 368, such as a conventional communication port (or connector), for coupling a personal electronic (or media) device 200 (shown in FIG. 5B) with the vehicle information system 300. Passengers (not shown) who are traveling aboard the passenger vehicle 390 thereby can enjoy personally-selected viewing content during travel. The access point 368 is located proximally to an associated passenger seat 382 and can be provided at any suitable cabin surface, such as a seatback 386, wall 396, ceiling, and/or bulkhead.

Figure 5B:
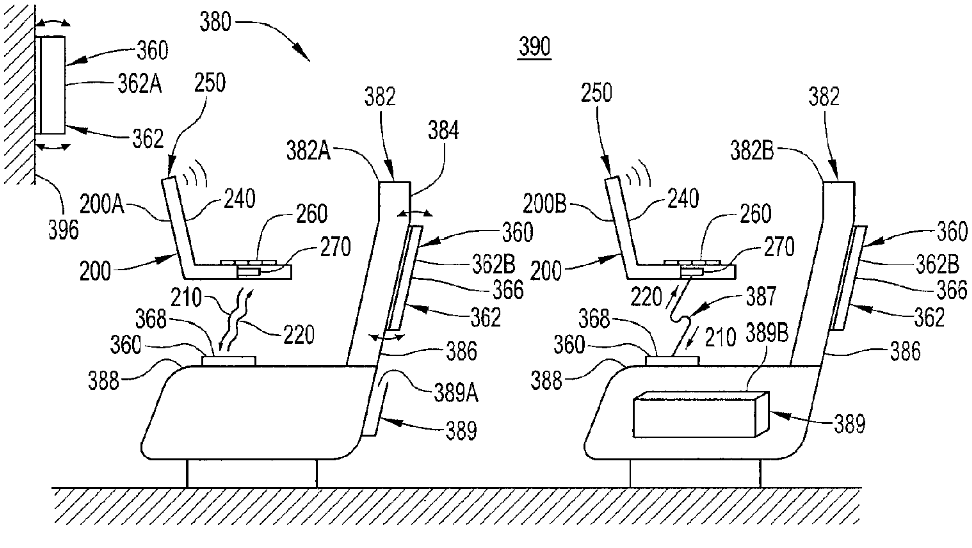
FIG. 5B is an exemplary top-level drawing illustrating an alternative embodiment of the passenger cabin of FIG. 5A, wherein the vehicle information system supports communications with personal media devices.

Turning to FIG. 5B, the vehicle information system 300 is shown as communicating with one or more personal electronic devices 200. Each personal electronic device 200 can store the audio and/or video viewing content 210 and can be provided as a handheld device, such as a laptop computer, a palmtop computer, a personal digital assistant (PDA), cellular telephone, an iPod® digital electronic media device, an iPhone® digital electronic media device, and/or a MPEG Audio Layer 3 (MP3) device. Illustrative personal electronic devices 200 are shown and described in the above-referenced co-pending United States patent applications, entitled "SYSTEM AND METHOD FOR DOWNLOADING FILES," application Ser. No. 10/772,565, filed on Feb. 4, 2004; entitled "PORTABLE MEDIA DEVICE AND METHOD FOR PRESENTING VIEWING CONTENT DURING TRAVEL," application Ser. No. 11/154,749, filed on Jun. 15, 2005; and entitled "SYSTEM AND METHOD FOR RECEIVING BROADCAST CONTENT ON A MOBILE PLATFORM DURING INTERNATIONAL TRAVEL," application Ser. No. 11/269,378, filed on Nov. 7, 2005; entitled "SYSTEM AND METHOD FOR INTERFACING A PORTABLE MEDIA DEVICE WITH A VEHICLE INFORMATION SYSTEM," application Ser. No. 12/210,624, filed on Sep. 15, 2008; entitled "MEDIA DEVICE INTERFACE SYSTEM AND METHOD FOR VEHICLE INFORMATION SYSTEMS," application Ser. No. 12/210,636, filed on Sep. 15, 2008; entitled "MEDIA DEVICE INTERFACE SYSTEM AND METHOD FOR VEHICLE INFORMATION SYSTEMS," application Ser. No. 12/210,652, filed on Sep. 15, 2008; and entitled "PORTABLE USER CONTROL DEVICE AND METHOD FOR VEHICLE INFORMATION SYSTEMS," application Ser. No. 12/210,689, filed on Sep. 15, 2008.

The personal electronic devices 200 as illustrated in FIG. 5B include a video display system 240 for visually presenting the viewing content 210 and/or an audio presentation system 250 for audibly presenting the viewing content 210. Each personal electronic device 200 likewise can include a user control system 260, which can be provided in any conventional manner and typically includes one or more switches (or pushbuttons), such as a keyboard or a keypad, and/or a pointing device, such as a mouse, trackball, or stylus. The personal electronic devices 200 thereby can select desired viewing content 210 and control the manner in which the selected viewing content 210 is received and/or presented.

Each of the personal electronic devices 200 likewise can include at least one communication port (or connector) 270. The communication ports 270 enable the personal electronic devices 200 to communicate with the vehicle information system 300 via the access points 368 of the respective user interface systems 360. As illustrated with personal electronic device 200A, for example, a selected communication port 270 and access point 368 can support wireless communications; whereas, a communication cable assembly 387 provides support for wired communications between another selected communication port 270 and access point 368 associated with personal electronic device 200B. The wired communications between the access point 368 and the communication port 270 for the personal electronic device 200B preferably include providing operating power 220 to the personal electronic device 200B.

In other words, each personal electronic device 200 can include a device power connector (or port) 270P that can be coupled with a system power connector (or port) 368P, such as a conventional electrical power outlet, provided by the relevant access point 368. The system power connector 368P can be disposed adjacent to the relevant passenger seat 382 and, when coupled with the device power connector 270P via the communication cable assembly 387, can provide the operating power 220 from the vehicle information system 300 to the personal electronic device 200. As desired, the viewing content 210 and the operating power 220 can be provided to the personal electronic device 200 via separate communication cable assemblies 387. When the communication port 270 and the access points 368 are in communication, the vehicle information system 300 supports a simple manner for permitting the associated personal electronic device 200 to be integrated with the vehicle information system 300 using a user-friendly communication interface.

When no longer in use and/or direct physical contact with the personal electronic device 200 is not otherwise required, the personal electronic device 200 can be disconnected from the system power connector 368P and stored at the passenger seat 382. The passenger seat 382 can include a storage compartment 389 for providing storage of the personal electronic device 200. As illustrated with passenger seat 382B, the personal electronic device 200 can be placed in a storage pocket 389B formed in the armrest 388 of the passenger seat 382B. The storage compartment 389 likewise can be provided on the seatback 386 and/or the headrest 384 of the passenger seat 382. As desired, the storage compartment 389 can comprise an overhead storage compartment, a door storage compartment, a storage compartment provided underneath the passenger seat 382, or any other type of conventional storage compartment, such as a glove compartment, trunk, or closet, available in the passenger vehicle 390.

Returning to FIG. 1, if the passenger vehicles 390 include aircraft 390B (shown in FIG. 3B), for example, the data monitoring and analysis system 1000 can comprise a comprehensive data analysis reliability tracking system that provides an online maintenance tool for receiving system performance data from the vehicle information systems 300, that can generate at least one performance report, that can track reliability for the vehicle information systems 300, and/or that can track in-service issue performance in the manner set forth in more detail above. The online maintenance tool can be provided in the manner set forth above with reference to the data monitoring and analysis system 1000 (shown in FIG. 1), wherein the download data 1510 can include the system performance data from the vehicle information systems 300. The system performance data can include conventional types of performance data, such as aircraft Built In Test Equipment (BITE) data, repair shop data, and/or original equipment manufacturer (OEM) flight hours, without limitation. As desired, the system performance data likewise can comprise other types of performance data, including observed system faults and rectifications and/or flight information provided by one or more external websites.

The data monitoring and analysis system 1000 can track the reliability of the vehicle information system 300, monitoring and analyzing data relevant to Mean Time Between Failures (MTBF) and/or Mean Time Between Unscheduled Removals (MTBUR). The data monitoring and analysis system 1000 likewise can include an in-service issue performance tracker and/or can generate performance reports that set forth the results of the system monitoring and analysis. Exemplary performance reports can include system BITE availability reports, system BITE degradation reports, reboot reports, command reports, email usage reports, short message service (SMS) reports, seat availability reports, and/or seat degradation metric reports, without limitation. The seat availability reports and/or seat degradation reports optionally can comprise reports based upon observed faults (or failures). As desired, the data monitoring and analysis system 1000 can provide an electronic cabin log book (or file) 1600 (shown in FIGS. 12A-E) for the associated performance data. The electronic cabin log book 1600 can capture observed fault (or failure) data, which can be correlated with the downloaded BITE data to provide a variety of proactive performance indication reports that can be provided to the appropriate airline owner (or operator).

The data monitoring and analysis system 1000 thereby can advantageously provide a solution for enabling the owner and/or operator of the aircraft 390B to perform real-time monitoring of the performance of the vehicle information systems 300 at any time, including before, during, and/or after travel, for every flight. The loadscript system 1200 thereby can offload the download data 1510, including BITE data and other performance data, generated by the vehicle information systems 300 in the manner set forth above with reference to FIGS. 2A-C. As discussed above, the loadscript system 1200 can validate and parse the offloaded download data 1510 and provide the resultant download data 1510 to the normalized database system 1100. The large volume of download data 1510 thereby can be presented in a meaningful manner, such as by way of high content resolution graphs presented on one or more display systems, for rapid human intervention, as needed.

The data monitoring and analysis system 1000 advantageously can increase BITE accuracy through automated analysis of BITE data by MMN, line replaceable unit (LRU) type, and configuration. By incorporating a proactive maintenance and engineering approach and identifying trends ahead of user (or passenger) impact, the data monitoring and analysis system 1000 can improve total system performance of the vehicle information systems 300, individually and/or in the aggregate, as well as performance of selected system elements, such as the line replaceable units (LRUs), of the vehicle information systems 300. The data monitoring and analysis system 1000 likewise can provide vehicle operators with performance data from overview to the lowest level of detail desired. In other words, an airline can utilize the data monitoring and analysis system 1000 to view consolidations of BITE data for a fleet of aircraft 390B, to stratify the BITE data by one or more variables, and/or to drill down into the BITE data sub-sets in an effort to understand root causes of vehicle information system performance.

The data monitoring and analysis system 1000 can present selected download data 1510, such as the aircraft Built In Test Equipment (BITE) data, in a wide variety of formats. The data monitoring and analysis system 1000, for example, can present aircraft platform data, configuration data for a flight leg, fault data for a flight leg, and/or reboot data for a flight leg.

The download data 1510 likewise can be presented graphically. Illustrative graphical representations of the download data 1510 can include a BITE fleet performance graph, a reboot command graph, and/or an electronic cabin log book fleet performance BITE system performance (and/or degradation) graph. As desired, the data monitoring and analysis system 1000 alternatively, and/or additionally, can present reports, including a BITE coverage calendar report, a fault count report, a reboot commands per set per hour report, and/or a fleet performance comparison report.

Figure 6C:
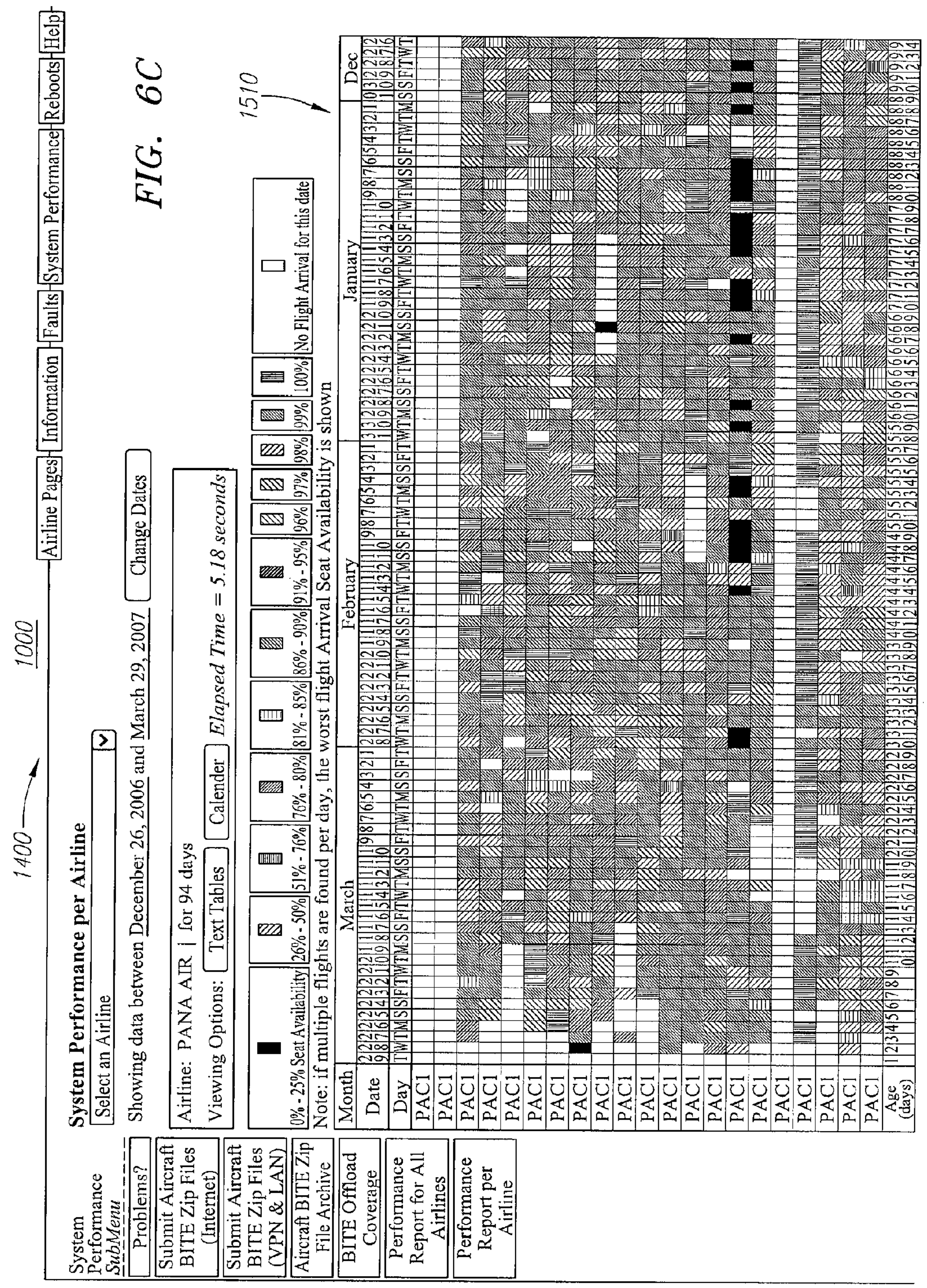
FIG. 6C is an exemplary detail drawing illustrating another alternative embodiment of the performance data monitoring and analysis system of FIG. 6A, wherein the user interface system can present the download data in a tabular format.
Figure 6D:
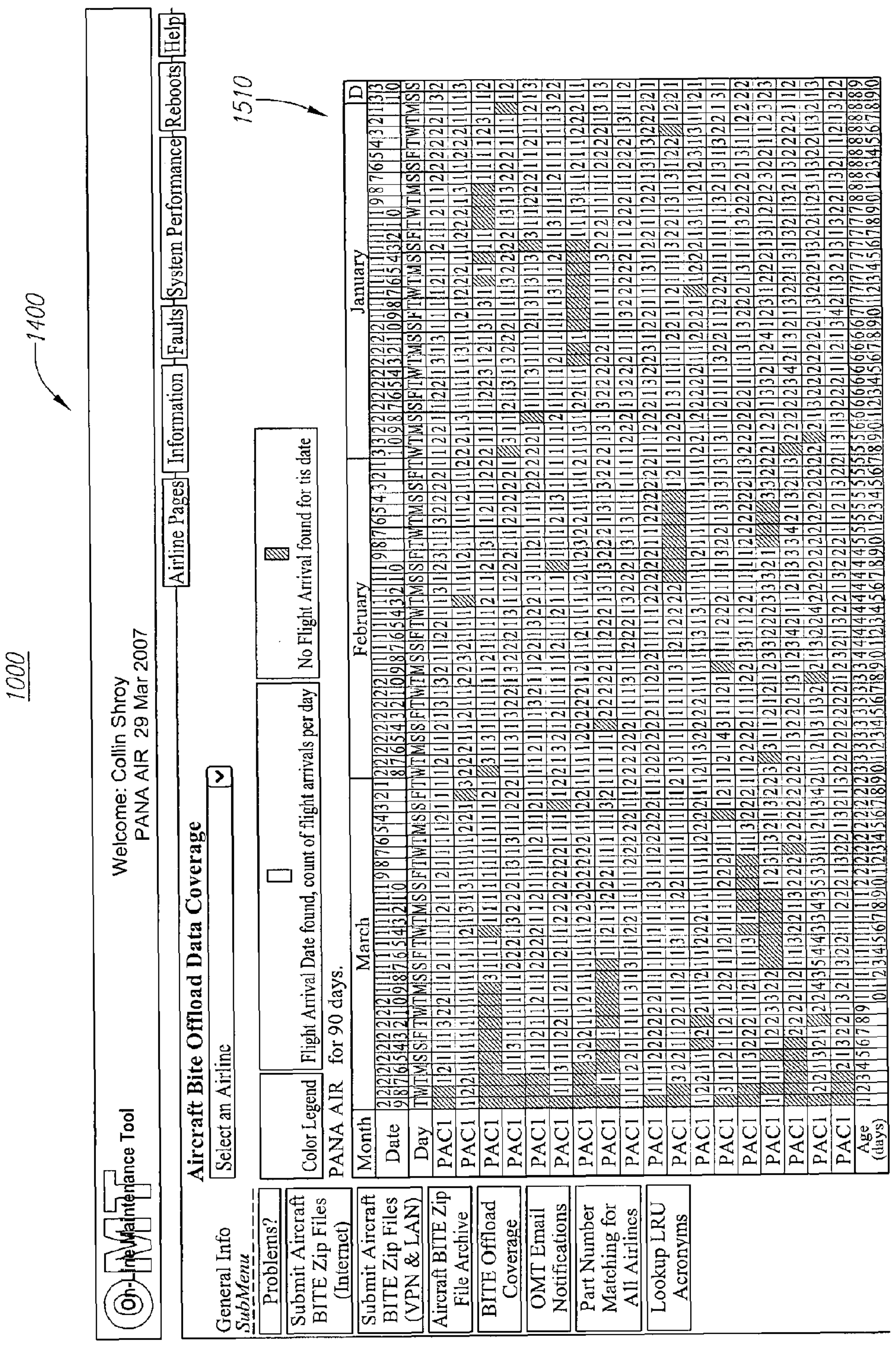
FIG. 6D is an exemplary detail drawing illustrating still another alternative embodiment of the performance data monitoring and analysis system of FIG. 6A, wherein the user interface system can present a BITE coverage calendar.
Figure 6F:
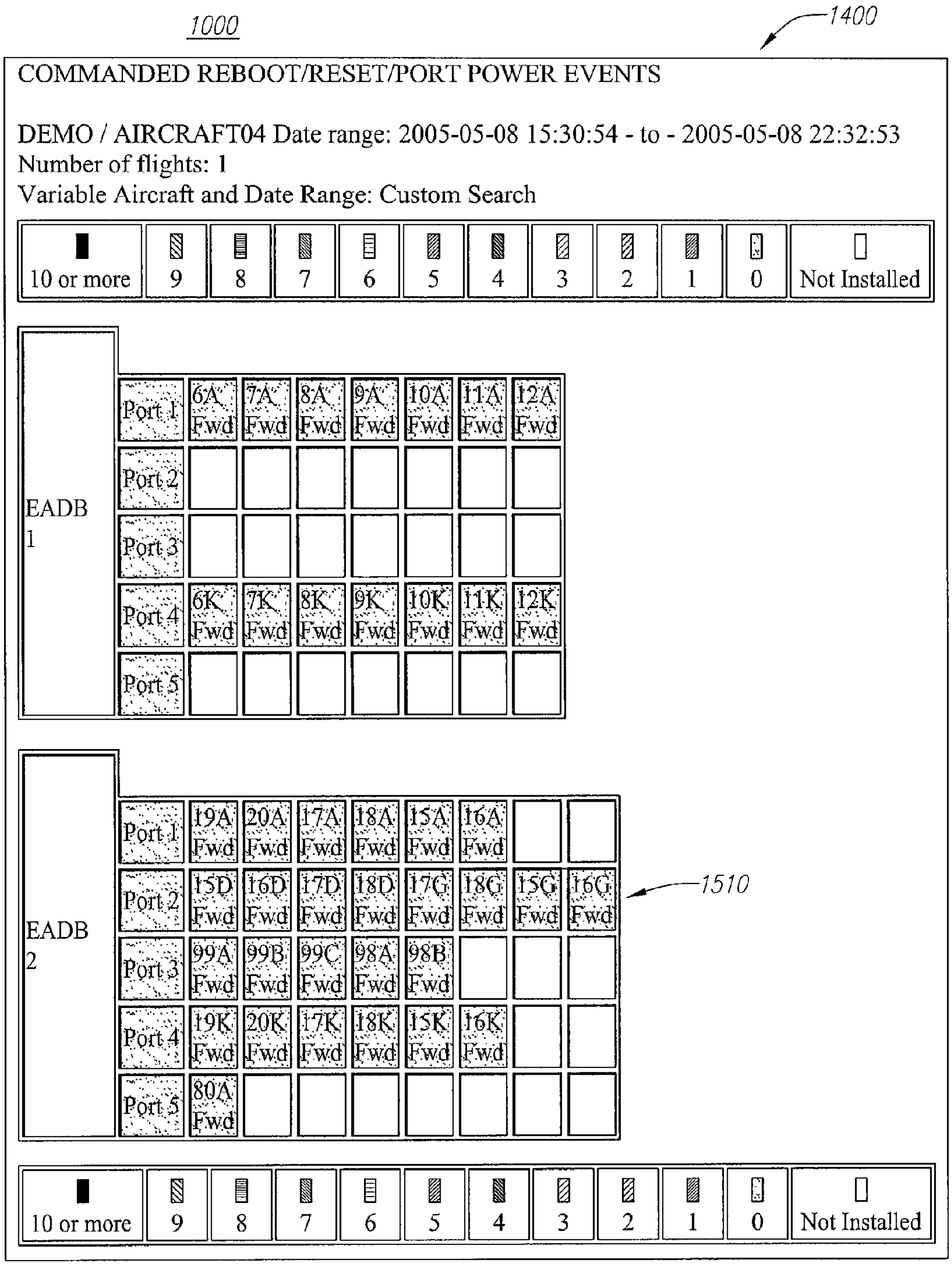
FIG. 6F is an exemplary detail drawing illustrating still another alternative embodiment of the performance data monitoring and analysis system of FIG. 6A, wherein the user interface system can present a flight overlay graphic.

Turning to FIGS. 6A-G, the data monitoring and analysis system 1000 is shown as including an interactive user interface system 1400. The data monitoring and analysis system 1000 can present the user interface system 1400 in any conventional manner, including via a video display system (not shown). As illustrated in FIGS. 6A and 6C, the user interface system 1400 can present the BITE seat performance data in a tabular format. The user interface system 1400 likewise can support column sorting and/or color for analyzing the BITE seat performance data. BITE seat availability data, for example, can be analyzed to identify a maintenance target aircraft 390B within a fleet of aircraft 390B as shown in FIG. 6B. FIG. 6D illustrates the user interface system 1400 as including a BITE coverage calendar for showing a number of flights for which BITE data was available for a selected number of flights during one or more days, and an exemplary flight event analysis for presenting selected vehicle information system events, such as system reboots, in a chronological order is shown in FIG. 6E. The user interface system 1400 likewise can enable a system operator to utilize other internal tools that support selected searches of the BITE data, such as global searches of the BITE data based upon line replaceable unit information and/or MMN information, without limitation.

Figure 7A:
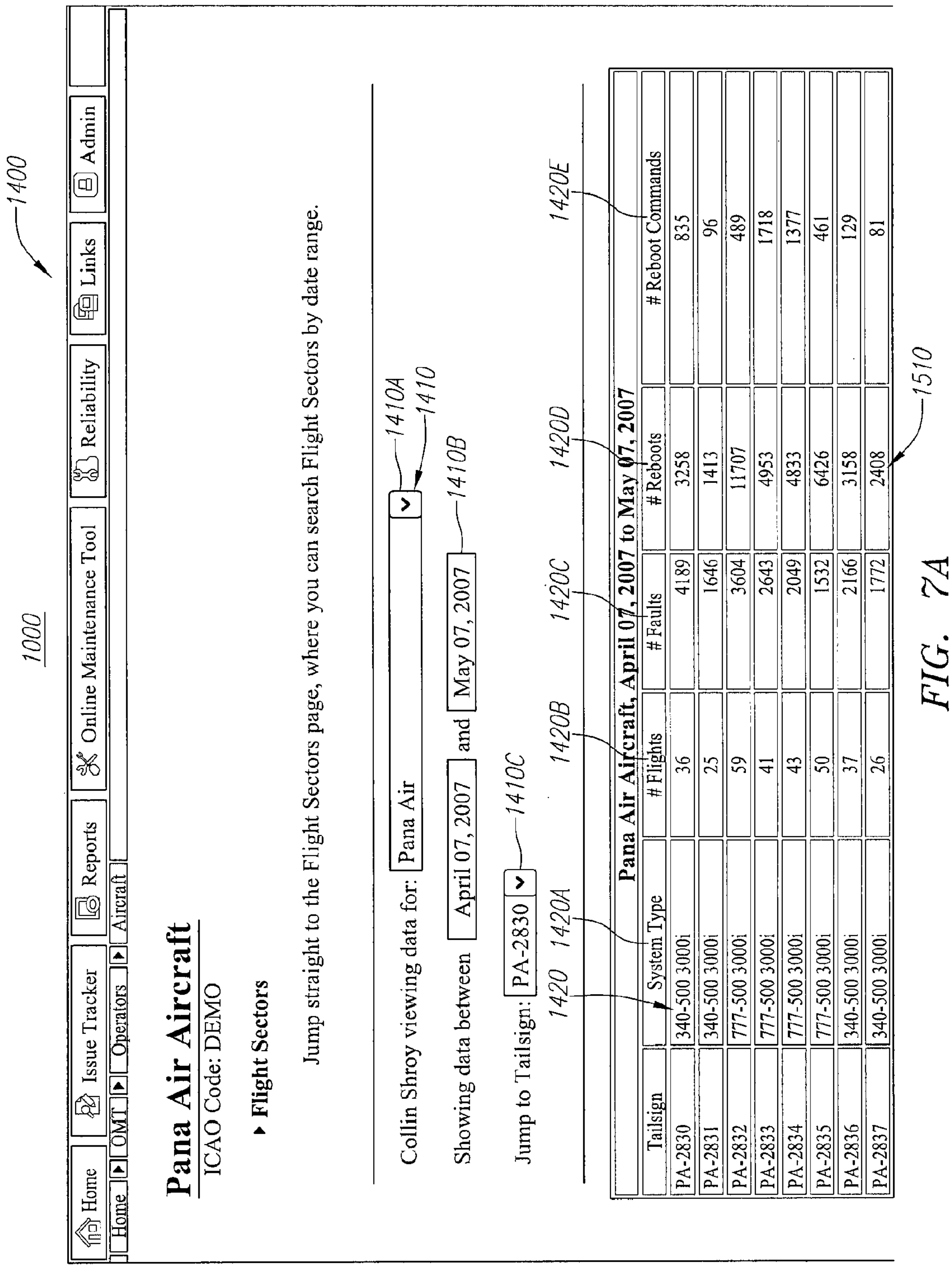
FIG. 7A is an exemplary detail drawing illustrating an alternative embodiment of the performance data monitoring and analysis system of FIGS. 6A-G, wherein the user interface system can present detailed information based upon the download data.

Advantageously, the user interface system 1400 of the data monitoring and analysis system 1000 can present the download data 1510 with any predetermined level of detail. In other words, the user interface system 1400 can present an overview of the download data 1510 and/or selected additional details within the download data 1510. The user interface system 1400 can present the download data 1510 in any suitable format, including in a tabular format and/or a graphical display format, as desired. Turning to FIG. 7A, the user interface system 1400 is shown as comprising a graphical user interface with one or more selection indicia 1410 for selecting predetermined download data 1510 for presentation. As illustrated in FIG. 7A, the selection indicia 1410 can include a name of an airline operator 1410A, a date (or range of dates) 1410B, and/or at least one tailsign 1410C for a particular aircraft 390B (shown in FIG. 3B) within a fleet of the airline operator 1410A.

The download data 1510 identified via the selection indicia 1410 is illustrated as being presented in a tabular format in FIG. 7A. For each selected tailsign 1410C, the user interface system 1400 can present detailed performance information 1420 that is based upon the download data 1510 accumulated within the selected range of dates 1410B by the aircraft 390B identified by the tailsign 1410C. Exemplary download data 1510 that can be presented via the user interface system 1400 can include a vehicle information system type 1420A for the aircraft 390B, a number of flights 1420B made by the aircraft 390B during the range of dates 1410B, a number of system faults 1420C experienced by the vehicle information system 300 (shown in FIG. 1) installed aboard the aircraft 390B, a number of reboots 1420D experienced by the vehicle information system 300, and/or a number of reboot commands 1420E executed by the vehicle information system 300.

Figure 7B:
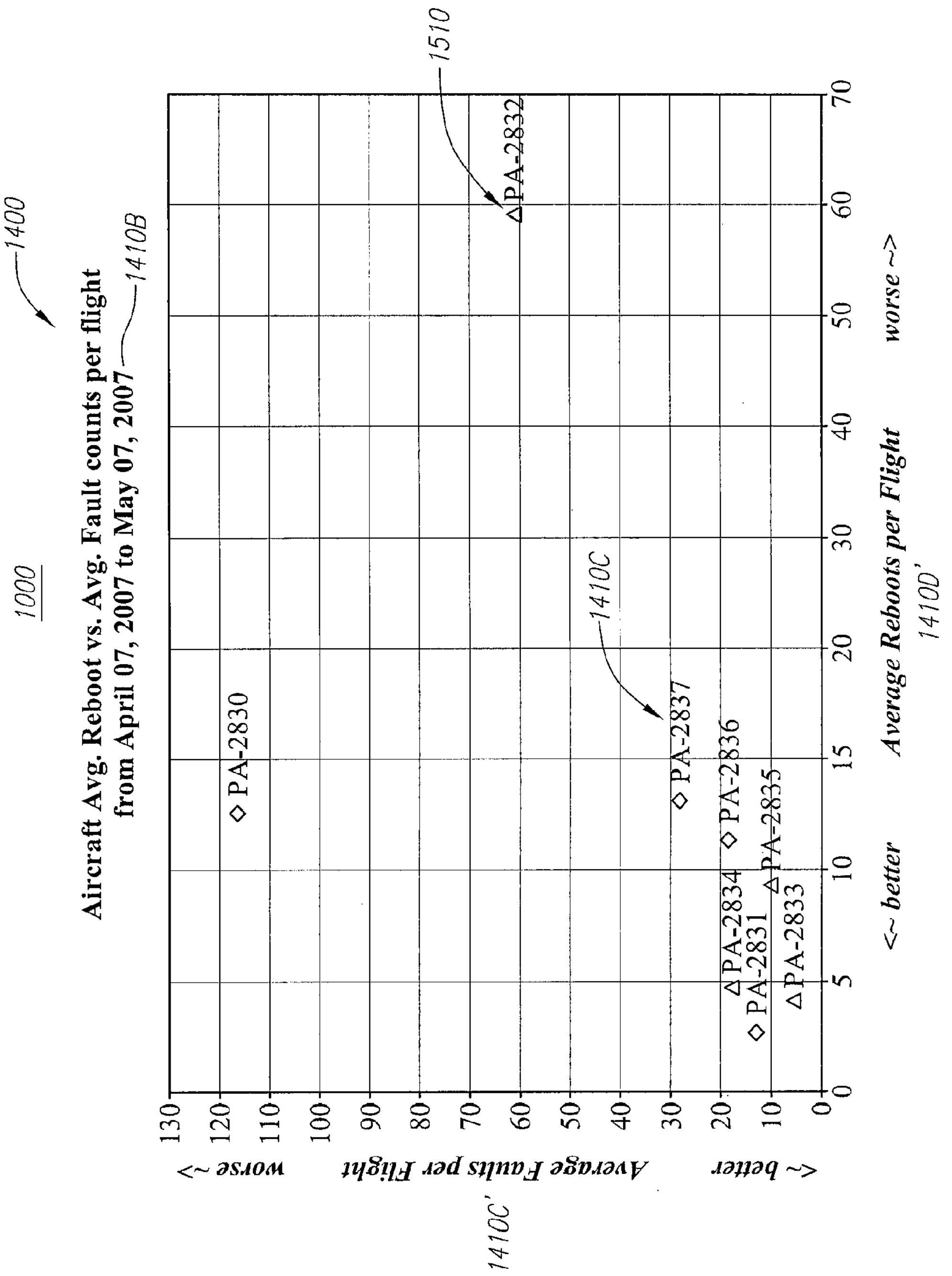
FIG. 7B is an exemplary detail drawing illustrating another alternative embodiment of the performance data monitoring and analysis system of FIG. 7A, wherein the user interface system can present a scatter graph for depicting aircraft performance.

As desired, the user interface system 1400 can present the detailed performance information 1420 in any suitable graphical format. FIG. 7B, for example, shows a scatter graph, wherein average number of faults per flight 1420C' is plotted against an average number of reboots per flight 1420D' within the selected range of dates 1410B. For each tailsign 1410C, the data monitoring and analysis system 1000 can determine the average number of faults per flight 1420C' by dividing the number of system faults 1420C (shown in FIG. 7A) by the number of flights 1420B made by the aircraft 390B (shown in FIG. 7A); whereas, the average number of reboots per flight 1420D' can be determined by dividing number of reboots 1420D (shown in FIG. 7A) by the number of flights 1420B. The resultant quotients for each tailsign 1410C can be plotted on the scatter graph and analyzed for any performance trends.

Turning to FIG. 7C, the user interface system 1400 is shown as presenting a flight table for providing an overview on event counts during a predetermined time interval, such as a preselected number of consecutive calendar days. The selection indicia 1410 for selecting predetermined download data 1510 for presentation can include a jump to a selected flight sector option 1410D, and the detailed performance information 1420 can include detailed performance information 1420C-I associated with the selected flight sector. For each flight associated with the selected flight sector, the detailed performance information 1420 can include arrival data 1420F, travel origin and/or destination information 1420G, a flight number 1420H, and/or a number of flight hours 14201. The detailed performance information 1420 likewise can include a number of system faults 1420C experienced by a vehicle information system 300 (shown in FIG. 1) installed aboard a selected aircraft 390B (shown in FIG. 3B), a number of reboots 1420D experienced by the vehicle information system 300, and/or a number of reboot commands 1420E executed by the vehicle information system 300 in the manner set forth in more detail above with reference to FIG. 7A.

Figure 7F:
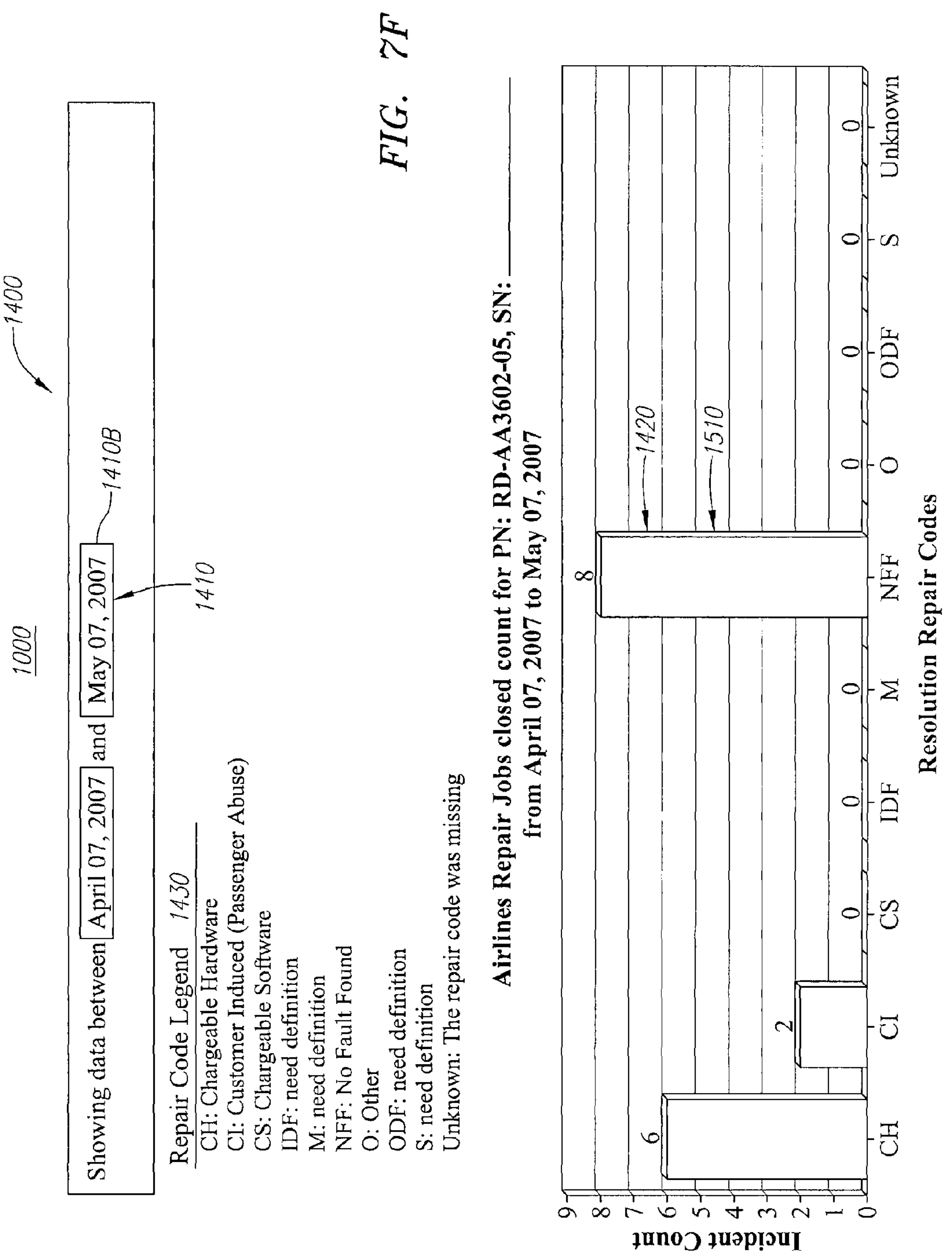
FIG. 7F is an exemplary detail drawing illustrating still another alternative embodiment of the performance data monitoring and analysis system of FIG. 7A, wherein the user interface system can present an analysis of a selected system component sorted by resolution repair code.
Figure 7G:
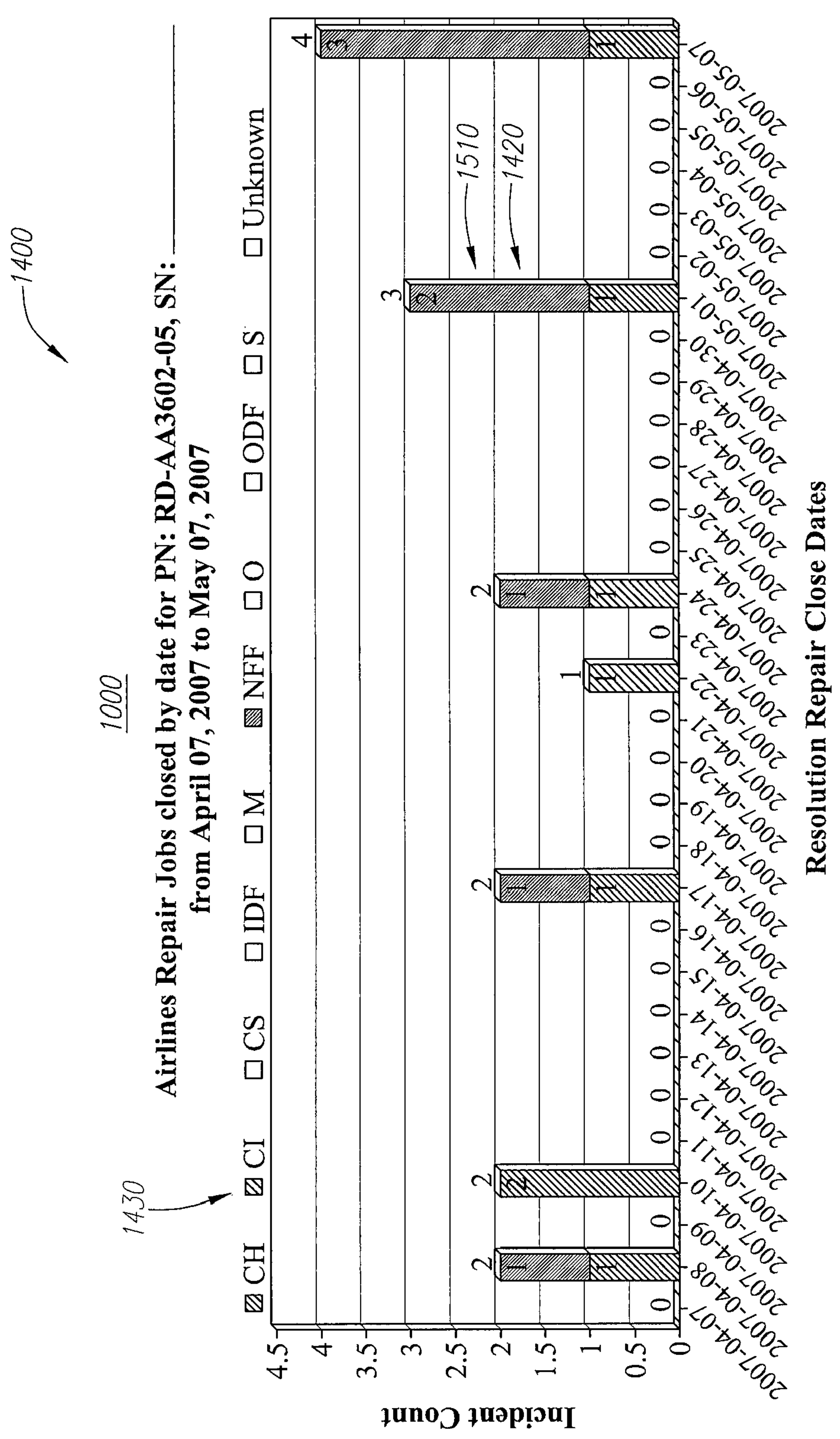
FIG. 7G is an exemplary detail drawing illustrating an alternative embodiment of the user interface system of FIG. 7F, wherein the analysis of the selected system component is presented as a timeline of resolution repair close dates.

The user interface system 1400 of FIG. 7D can present a configuration summary for one or more selected aircraft 390B (shown in FIG. 3B) and/or flight sectors during a predetermined time interval; whereas, FIG. 7E shows the user interface system 1400 as being adapted to present a single-flight table for a selected aircraft 390B (shown in FIG. 3B) and/or flight sector during a predetermined time interval. In FIGS. 7F-G, the user interface systems 1400 are shown as presenting an analysis of an airlines report jobs closed count for a selected system component. The selected system component, for example, can be associated with a particular vehicle information system 300 (shown in FIG. 1) and/or with a particular type of vehicle information system 300. The user interface system 1400 of FIG. 7F includes a repair code legend 1430, which identifies a predetermined repair code as being associated with a relevant type of component repair.

As illustrated in FIG. 7F, for example, the repair code CH can be associated with a chargeable hardware repair; whereas, the repair code CHS can be associated with a chargeable software repair. The repair code CI is shown as being associated with a customer-induced repair that can be attributed to passenger abuse of the selected system component. Other exemplary repair codes are illustrated in FIG. 7F. The repair code legend 1430 can include a repair code for any type of repair that is suitable for the selected system component. The user interface system 1400 can present the analysis of the selected system component in any appropriate manner. For example, the user interface system 1400 of FIG. 7F presents the analysis in a graphical display format, wherein the detailed performance information 1420 is sorted by resolution repair code; whereas, FIG. 7G shows the detailed performance information 1420 as being provided as a timeline of resolution repair close dates. In FIG. 7H, the user interface system 1400 can present a repair shop history for a selected system component.

Figure 8:
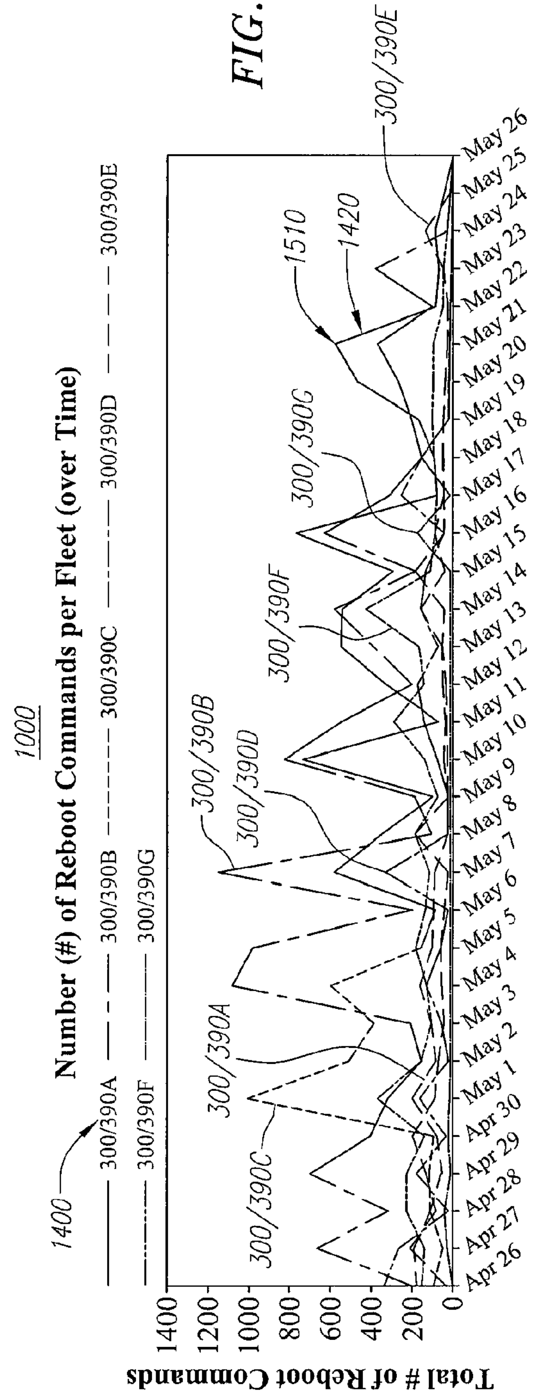
FIG. 8 is an exemplary detail drawing illustrating an alternative embodiment of the performance data monitoring and analysis system of FIGS. 7A-H, wherein the user interface system can present a number of reboot commands per fleet over time in a graphical display format.

A typical application of the data monitoring and analysis system 1000 is illustrated in FIG. 8. To maintain the highest seat availability possible, rebooting the vehicle information systems 300 (shown in FIG. 1) may become necessary. These reboots can occur individually at the passenger seat 382 (shown in FIGS. 5A-B), and/or all of the passenger seats 382 on the aircraft 390B (shown in FIG. 3B) can be rebooted simultaneously. Reboots can be initiated automatically and/or manually by cabin crew via a passenger (or crew) interface system 360 (shown in FIGS. 5A-B) of the vehicle information systems 300.

In a hypothetical scenario, airline management could hear rumors that the number of system reboots recently has experienced a sharp increase. Airline management thereby can turn to the data monitoring and analysis system 1000 for a factual look at what is actually happening in the airline fleet. The data monitoring and analysis system 1000, upon receiving download data 1510 from the vehicle information systems 300 in the manner discussed above, can present the exemplary graph shown in FIG. 8. The graph below shows detailed performance information 1420 regarding the number of commanded (manually initiated) reboots for an entire fleet of aircraft with varying aircraft platforms 300/390. In other words, a airline fleet generally includes more than one type of aircraft 390B and more than one type of vehicle information system 300. The various combinations of aircraft 390B and vehicle information systems are represented by the respective aircraft platforms 300/390A-G in FIG. 8.

As illustrated in FIG. 8, the number of commanded reboots initiated aboard some aircraft platforms 300/390, such as aircraft platform 300/390A, remain relatively stable over time; whereas, the number of commanded reboots initiated aboard other aircraft platforms 300/390, such as aircraft platform 300/390B and aircraft platform 300/390C, experience marked deviations. The information presented by the graph of FIG. 8 can provide upper management with further insights regarding the location and cause of the numerous reboots. Potential initial theories can include a larger technical problem with a particular airframe type and/or a cabin crew training issue. By presenting the large volume of download data 1510 in a meaningful manner, the data monitoring and analysis system 1000 can help upper management confirm whether an issue actually exists and, if so, can assist in identifying at least one potential solution for rapidly resolving the issue.

Figure 9A:
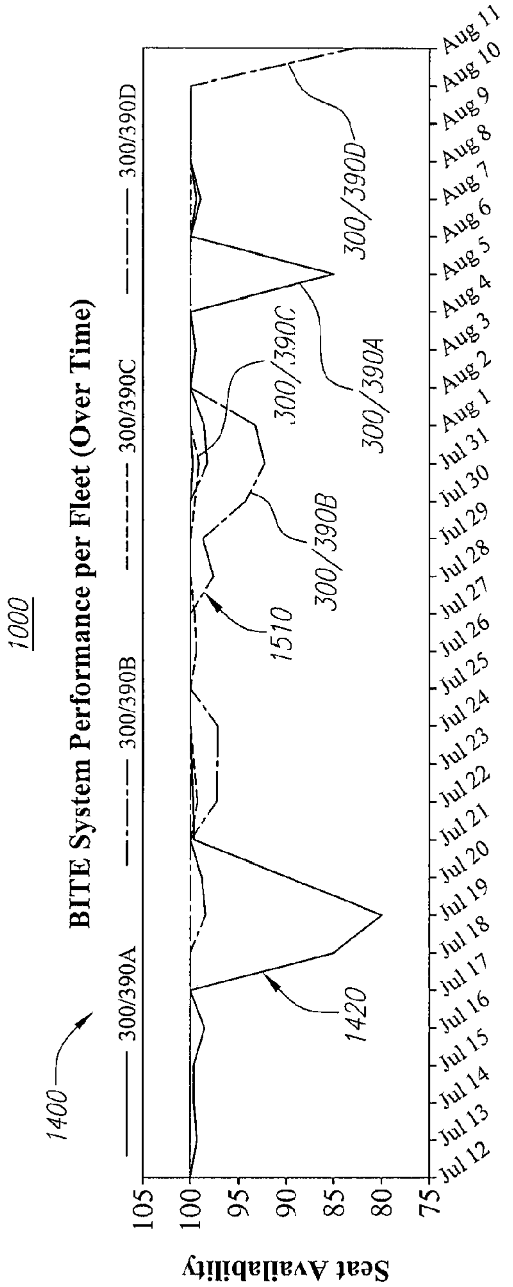
FIG. 9A is an exemplary detail drawing illustrating another alternative embodiment of the performance data monitoring and analysis system of FIGS. 7A-H, wherein the user interface system can present BITE system performance per fleet over time in a graphical display format.
Figure 9B:
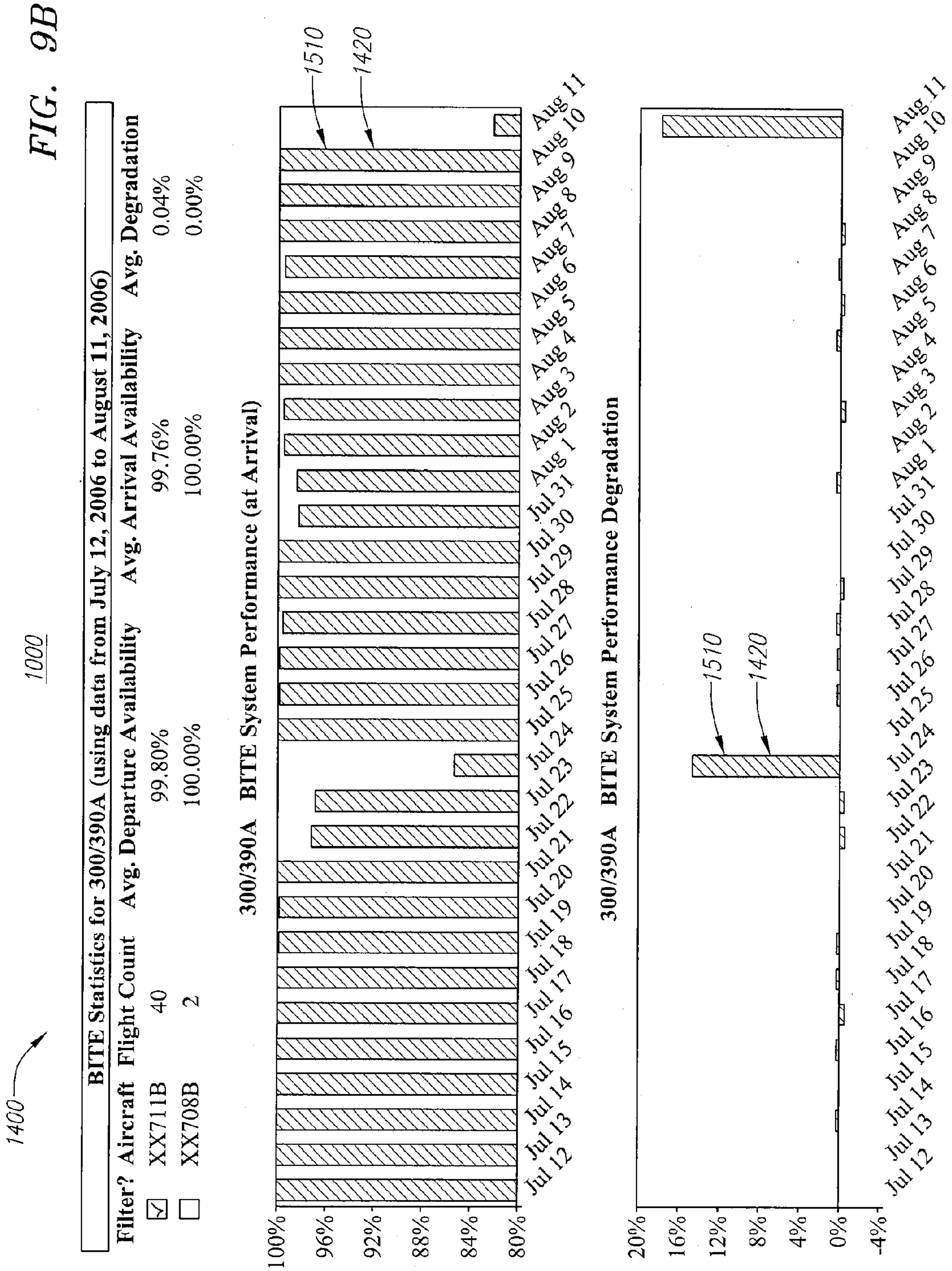
FIG. 9B is an exemplary detail drawing illustrating an alternative embodiment of the performance data monitoring and analysis system of FIG. 9A, wherein the user interface system can present BITE system performance for a selected combination of aircraft type and vehicle information system over time in a graphical display format.

Other typical graphs that can be generated by the data monitoring and analysis system 1000 are shown in FIGS. 9A-B. FIG. 9A, for example, illustrates an exemplary BITE system performance graph. The graph of FIG. 9A shows how each aircraft airframe 390B, vehicle information system 300, and configuration are performing for another hypothetical airline fleet. As illustrated in FIG. 9A, the seat availability aboard some aircraft platforms 300/390, such as aircraft platform 300/390C, remain relatively stable over time; whereas, the seat availability aboard other aircraft platforms 300/390, such as aircraft platform 300/390A, experience marked deviations. This high level view can help upper management drive maintenance resource decisions, providing additional focus on configurations of aircraft platforms 300/390 that have lower performance.

Figure 10A:
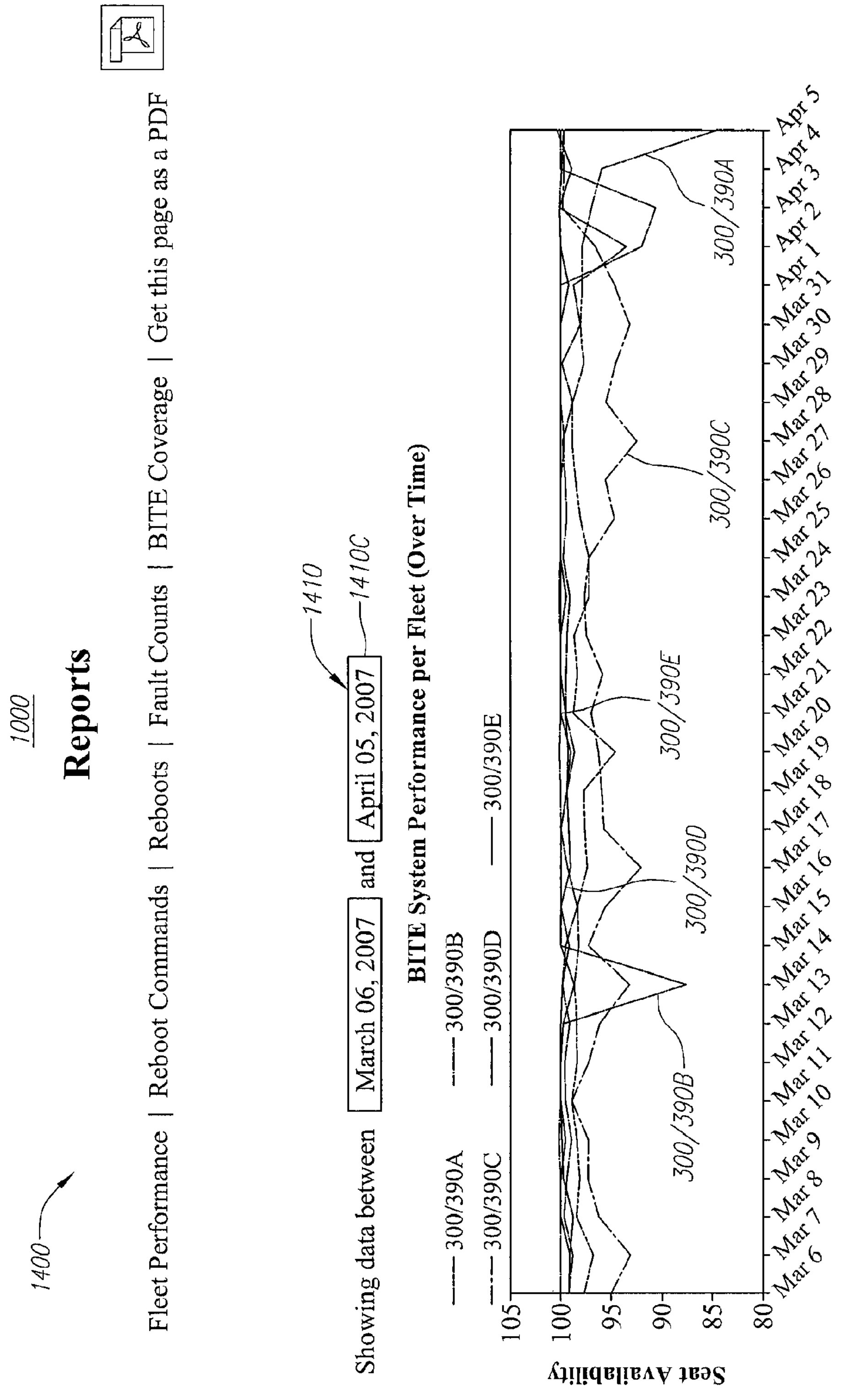
FIG. 10A is an exemplary detail drawing illustrating another alternative embodiment of the performance data monitoring and analysis system of FIG. 1, wherein the user interface system can present a system report setting forth BITE system performance per fleet over time in a graphical display format.
Figure 10B:
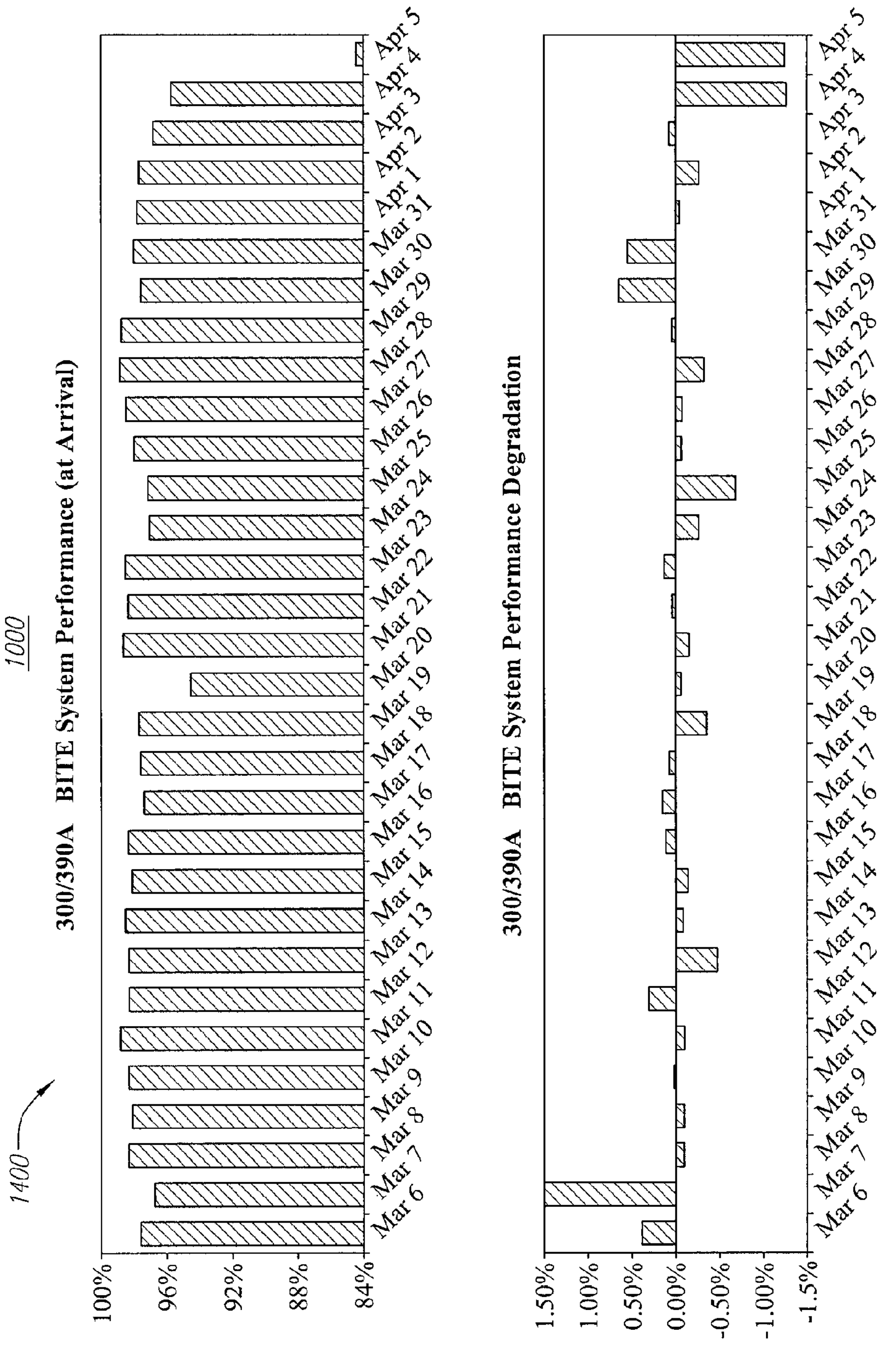
FIG. 10B is an exemplary detail drawing illustrating an alternative embodiment of the performance data monitoring and analysis system of FIG. 10A, wherein the user interface system can present a system report setting forth BITE system performance for a selected combination of aircraft type and vehicle information system throughout a predetermined range of dates.
Figure 10C:
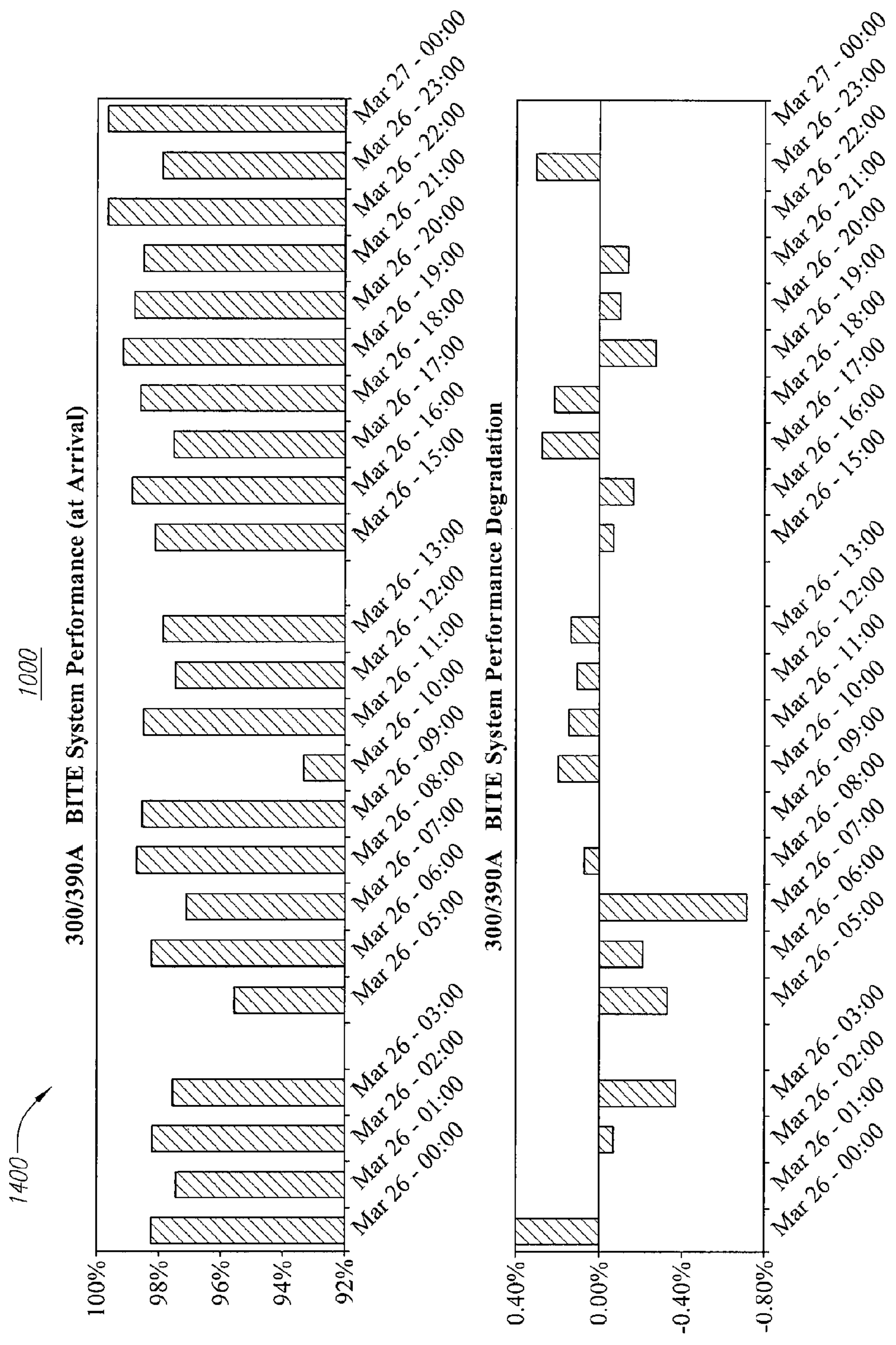
FIG. 10C is an exemplary detail drawing illustrating an alternative embodiment of the performance data monitoring and analysis system of FIG. 10B, wherein the user interface system can present a system report setting forth BITE system performance for the selected combination of aircraft type and vehicle information system for a preselected date.
Figure 10D:
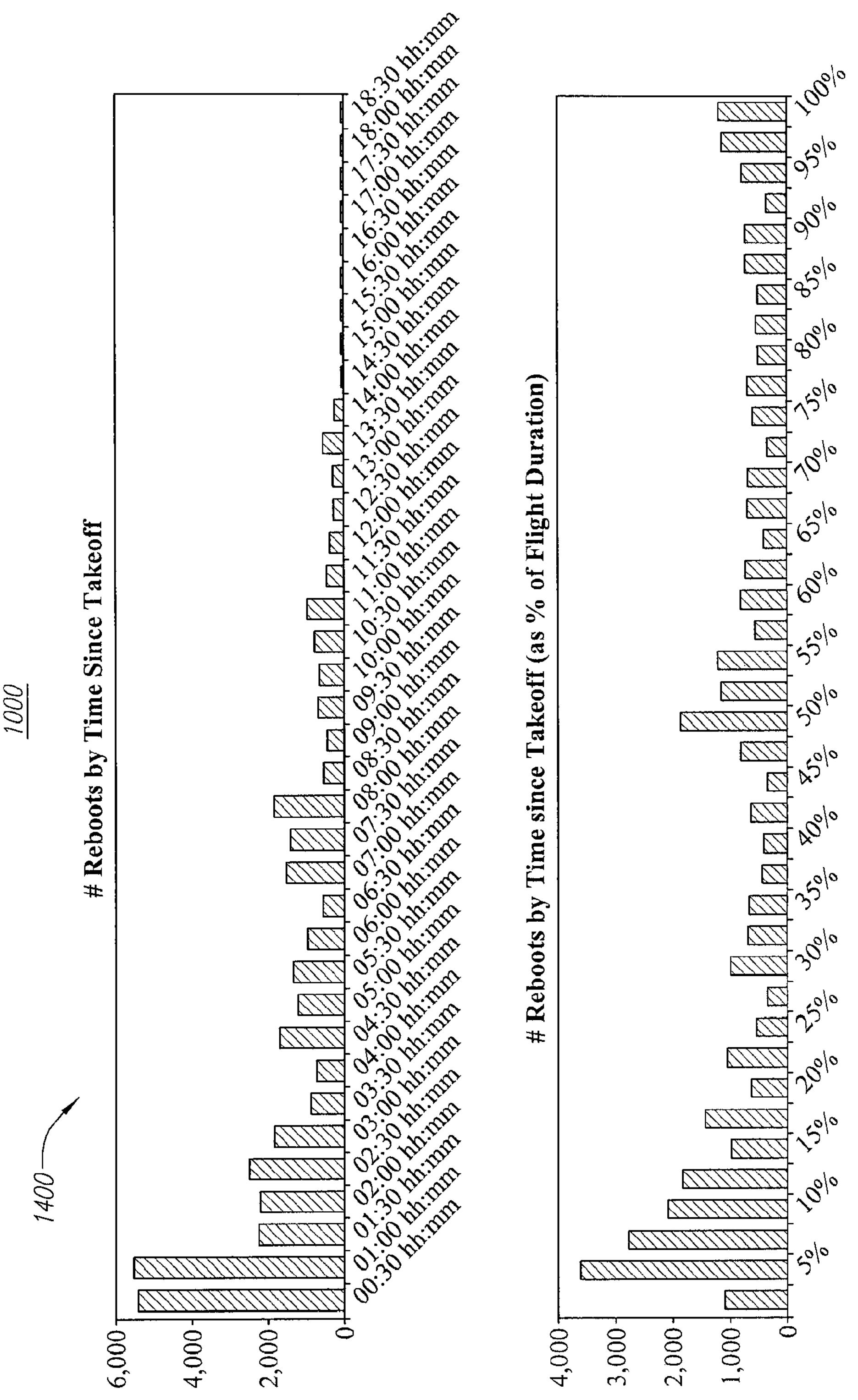
FIG. 10D is an exemplary detail drawing illustrating another alternative embodiment of the performance data monitoring and analysis system of FIG. 10A, wherein the user interface system can present a system report setting forth a number of reboots since aircraft takeoff.
Figure 10E:
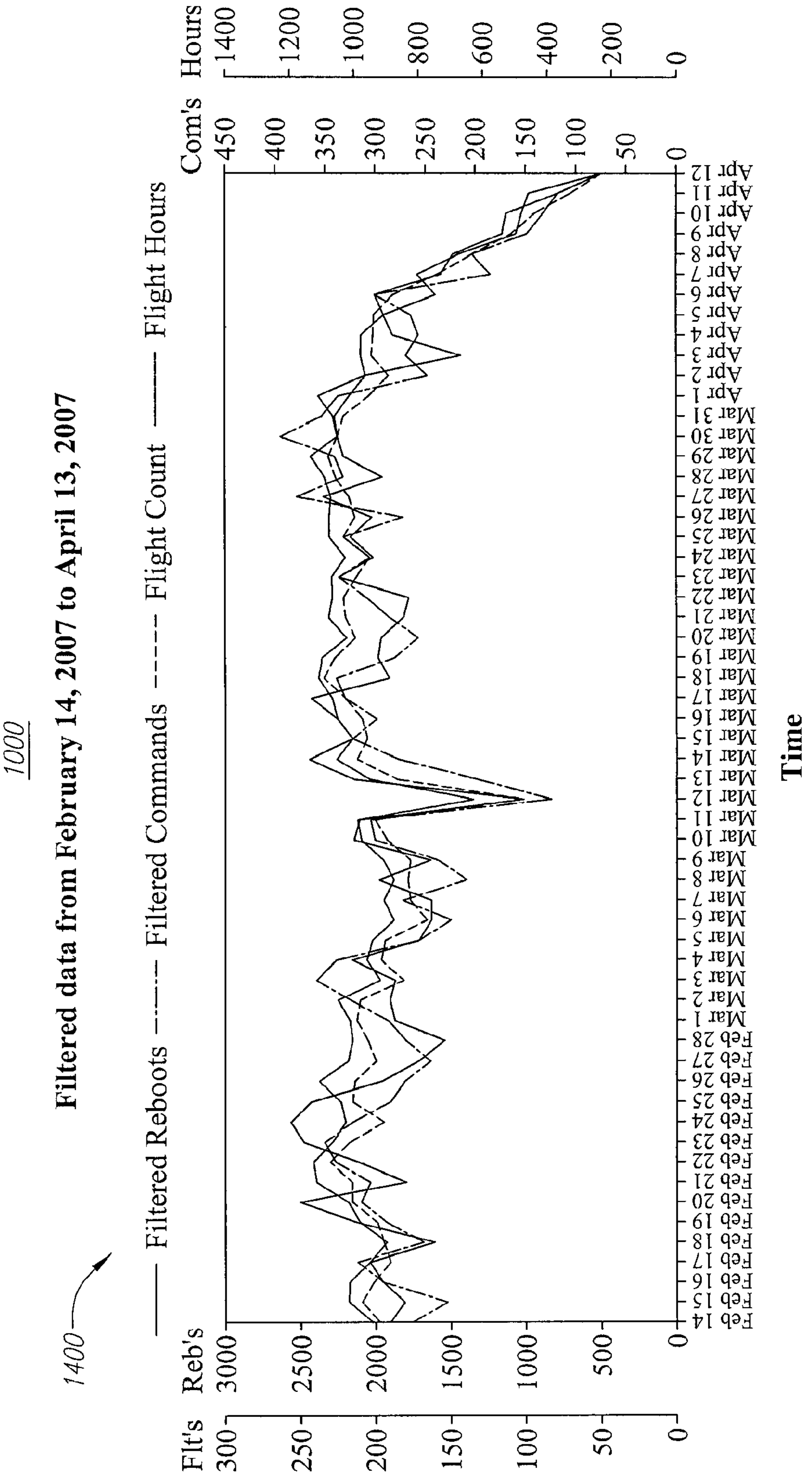
FIG. 10E is an exemplary detail drawing illustrating an alternative embodiment of the performance data monitoring and analysis system of FIG. 10D, wherein the user interface system can present a system report setting forth a number of reboots since aircraft takeoff based upon filtered data accumulated throughout a predetermined range of dates.

As desired, the data monitoring and analysis system 1000 likewise can generate system reports as illustrated in FIGS. 10A-E. Exemplary system reports can include BITE seat availability reports, BITE seat degradation reports, reboot reports, reboot command reports, email usage statistics reports, short message service (SMS) statistics reports, BITE accuracy reports, and/or observed fault seat availability reports. FIG. 10A, for example, shows the user interface system 1400 can present a system report that sets forth BITE system performance per fleet over time in a graphical display format. The system report provides BITE system performance for five exemplary configurations of aircraft platforms 300/390A-E. The user interface system 1400 can present a system report that sets forth BITE system performance and BITE system performance degradation for a selected aircraft platform 300/390A throughout a predetermined range of dates as illustrated in FIG. 10B and/or for a preselected date as shown in FIG. 10C. FIG. 10D shows a system report that sets forth a number of reboots since aircraft takeoff; whereas, FIG. 10E comprises a system report that sets forth a number of reboots since aircraft takeoff based upon filtered data accumulated throughout a predetermined range of dates.

The user interface system 1400 can present system reports in any conventional manner, including with a high-content resolution and/or in multiple-dimensions. Use of multiple-dimensions in the reports advantageously can enhance the system analyses supported by the data monitoring and analysis system 1000. For example, the user interface system 1400 can present a system report that includes a multiple-axis graphical representation of fleet (or tail) health. By presenting fleet health via a multiple-axis graphical representation, many aspects of fleet heath, such as BITE, observed fault data, reboots, and passenger usage, each can be presented on a single graph.

Turning to FIGS. 11A-E, the data monitoring and analysis system 1000 is shown as including a reliability calculation system 1450 for generating selected system reports for the fleet of aircraft 390B (shown in FIG. 3A). The reliability calculation system 1450 can be presented via the user interface system 1400 and can advantageously enable the system operators to generate a wide range of system reports. These system reports can include Mean Time Between Failures (MTBF) reports and/or Mean Time Between Unscheduled Removals (MTBUR) reports. The MTBF reports and the MTBUR reports can be generated for a selected line replaceable unit (LRU), for a selected system component, and/or for a predetermined modification of the vehicle information systems 300 within a fleet.

The reliability calculation system 1450 likewise can support generation of system airline performance reports, such as system global performance reports. Exemplary system airline performance reports can include comparison system reports, such as comparison system reports that compare Guaranteed Mean Time Between Failures (GMTBF) with Actual Mean Time Between Failures (MTBF), Guaranteed Mean Time Between Unscheduled Removals (MTBUR) with Actual Mean Time Between Unscheduled Removals (MTBUR), Predicted Mean Time Between Failures (PMTBF) with Actual Mean Time Between Failures (MTBF), and/or Predicted Mean Time Between Unscheduled Removals (PTBUR) with Actual Mean Time Between Unscheduled Removals (MTBUR).

As desired, the reliability calculation system 1450 can generate performance reports for selected system components of the vehicle information systems 300. The reliability calculation system 1450, for example, can generate performance reports for a selected line replaceable unit (LRU). The performance reports for the selected line replaceable unit can include a comparison report for comparing line replaceable unit repair with line replaceable unit shipped and/or a performance report for the line replaceable unit by time period. The reliability calculation system 1450 likewise can generate part usage reports, such as a part usage report by line replaceable unit and/or a part usage report by customer. Illustrative system reports that can be generated by the reliability calculation system 1450 are shown in FIGS. 11B-E.

Turning to FIGS. 12A-E, the data monitoring and analysis system 1000 is shown as including an electronic cabin log book (or file) 1600. The electronic cabin log book 1600 enables aircraft cabin crews and/or maintenance crews to log, troubleshoot, and/or track cabin faults and other conditions. In one embodiment, the electronic cabin log book 1600 can capture download data 1510 associated with equipment problems, attempted in-flight remedies, and other events that can impact a passenger's travel experience. The download data 1510 can be accessed by the maintenance crews to expedite system repairs and/or to document actions taken. Advantageously, the cabin crew can utilize the electronic cabin log book 1600 to standardize logbook entries so that the entries can be easily interpreted by other system users; while, the electronic cabin log book 1600 enables the maintenance crew to review and/or manage system faults while troubleshooting the aircraft 390B (shown in FIG. 3B). Management likewise can utilize the electronic cabin log book 1600 to analyze the download data 1510 to identify, for example, trends, training deficiencies, and/or passenger satisfaction.

The electronic cabin log book 1600 is illustrated as including an interactive user interface system 1650 for facilitating interaction with the electronic cabin log book 1600. In one preferred embodiment, the user interface system 1650 can be provided as a graphical user interface (or GUI) that can be presented via a touchscreen display system. The user interface system 1650 can enable log entries to be readily sorted for easy viewing. Typical types of log entries can include closed log entries, deferred log entries, and/or open log entries, without limitation. As desired, the different types of log entries can be presented with corresponding background colors. The user interface system 1650 likewise can include an auto-fill feature to assist a system operator with data entry and/or a preview window for providing a brief description of a selected log entry. Additionally, and/or alternatively, the log entries can be associated with priority tags for distinguishing the high-priority log entries from those with lower priorities.

Advantageously, the use of the electronic cabin log book 1600 presents several benefits, including elimination of paper-based log books, eliminating difficulty in deciphering hand-written log book entries, and/or eliminates transfer of cabin log book data into an electronic database after travel is complete. The electronic cabin log book 1600 also eliminates the need for an engineer to interpret cabin logbook data and enables the accuracy of BITE data to be validated by correlating failures reported during travel with human-observed failures. Further, the electronic cabin log book 1600 can be focused on passenger impact of failures, down to the smallest detail. Selected faults likewise can be included in the download data 1510 to enable maintenance crews to prepare for repairing the fault prior to arrival of the passenger vehicle 390 and thereby reduce maintenance downtime for the passenger vehicles 390.

As desired, the electronic cabin log book 1600 can include a hardware and/or software module (not shown) for a selected vehicle information system 300. If the vehicle information system 300 comprises an in-flight entertainment system, for example, the electronic cabin log book 1600 can include a module that includes descriptions of faults, preferably including passenger entertainment system (PES) and/or passenger service system (PSS) faults, that are associated with the in-flight entertainment system. The module likewise can possess BITE associations and/or validation functions for the selected vehicle information system 300 and/or can be executed on a crew panel, crew terminal, seat electronics box, smart display unit (SDU), and/or a portable media device 200 (shown in FIG. 5B). Fault maintenance data thereby can be entered from any passenger seat location within the passenger cabin 380 (shown in FIGS. 5A-B) of a passenger vehicle 390 (shown in FIGS. 5A-B). Further, the module can include fault descriptions for issues that can arise within both the selected vehicle information system 300 and the passenger cabin 380.

The electronic cabin log book 1600, in one embodiment, can be provided as a portable support module (not shown). In other words, the electronic cabin log book 1600 can be integrated with a portable media device 200 that is provided in the manner set forth in more detail above with reference to FIG. 5B. The portable support module can include the functionality described above for the electronic cabin log book 1600 and can include a compact video display system 240 (shown in FIG. 5B) for presenting the graphical user interface system 1650. Maintenance actions thereby can be entered, edited, and/or checked as performed via the portable support module.

Figure 12A:
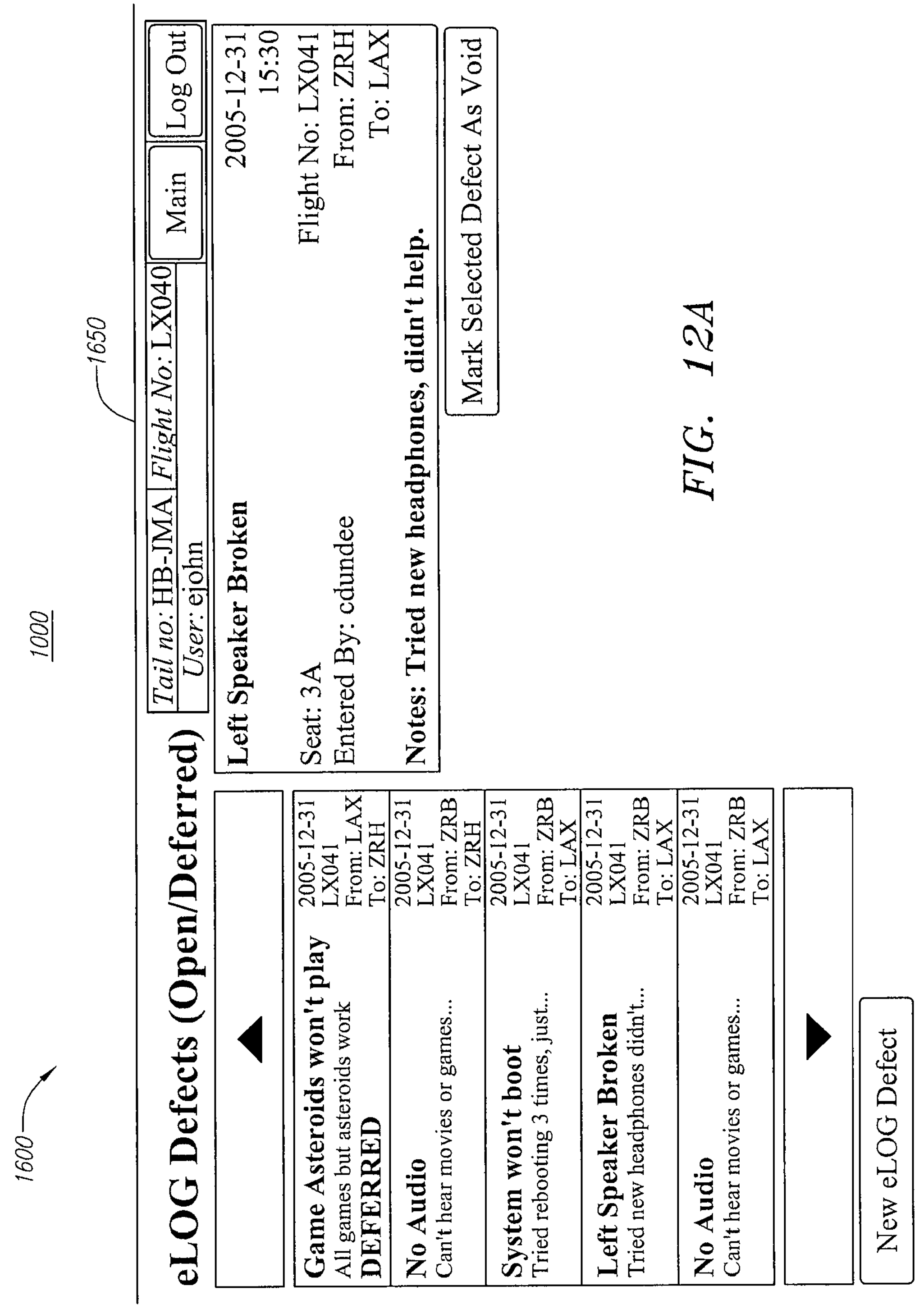
FIG. 12A is an exemplary detail drawing illustrating still another alternative embodiment of the performance data monitoring and analysis system of FIG. 1, wherein the performance data monitoring and analysis system provide an electronic cabin log book for logging, troubleshooting, and tracking faults and other conditions within the passenger cabin.
Figure 12B:
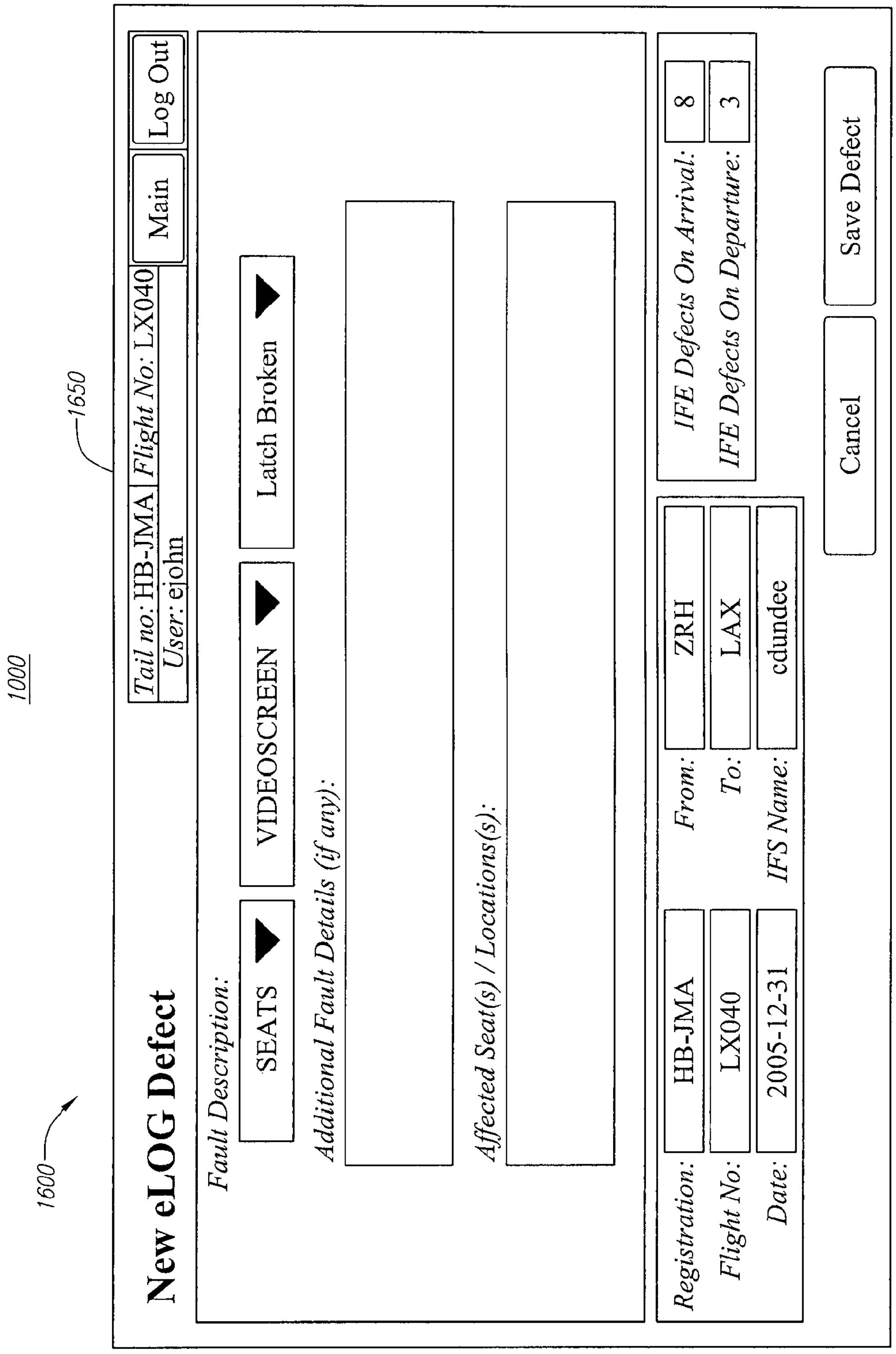
FIG. 12B is an exemplary detail drawing illustrating an embodiment of the electronic cabin log book of FIG. 12A, wherein the electronic cabin log book can present a new defect entry screen.

Exemplary screens that can be presented by the graphical user interface system 1650 of the electronic cabin log book 1600 are illustrated in FIGS. 12B-E. Turning to FIG. 12B, for example, the graphical user interface system 1650 is shown as comprising a cabin crew interface system for use by the cabin crew traveling aboard the passenger vehicle 390 (shown in FIG. 5B). The cabin crew interface system is shown, for example, as presenting a new defect entry screen for enabling a crew member to enter a description (fault data) of a fault that has was observed by a passenger (or crew member) during travel.

Figure 12C:
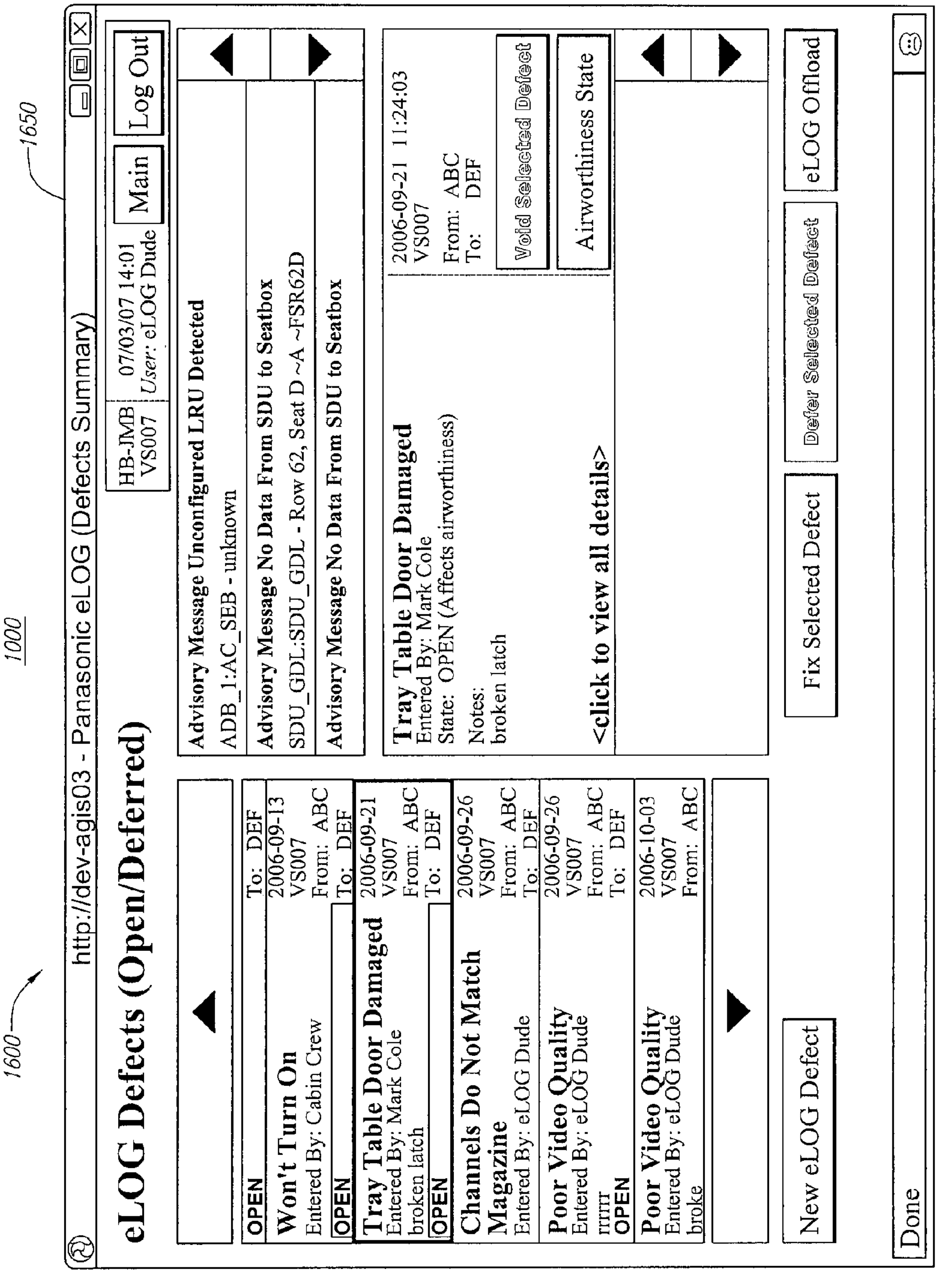
FIG. 12C is an exemplary detail drawing illustrating an alternative embodiment of the electronic cabin log book of FIG. 12A, wherein the electronic cabin log book can simultaneously present observed defect data and BITE defect data.
Figure 12D:
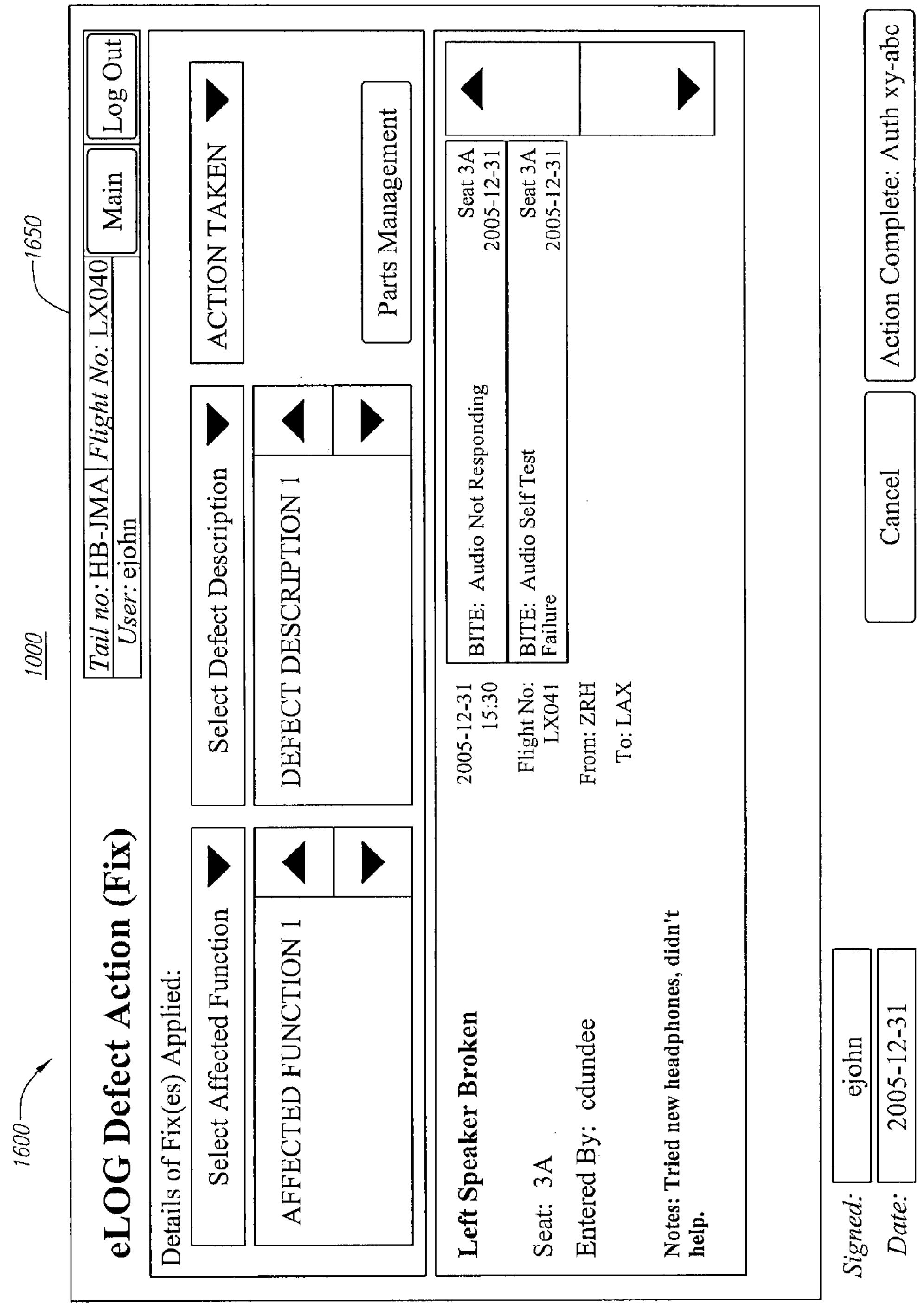
FIG. 12D is an exemplary detail drawing illustrating another alternative embodiment of the electronic cabin log book of FIG. 12A, wherein the electronic cabin log book can present a maintenance action description entry screen.
Figure 12E:
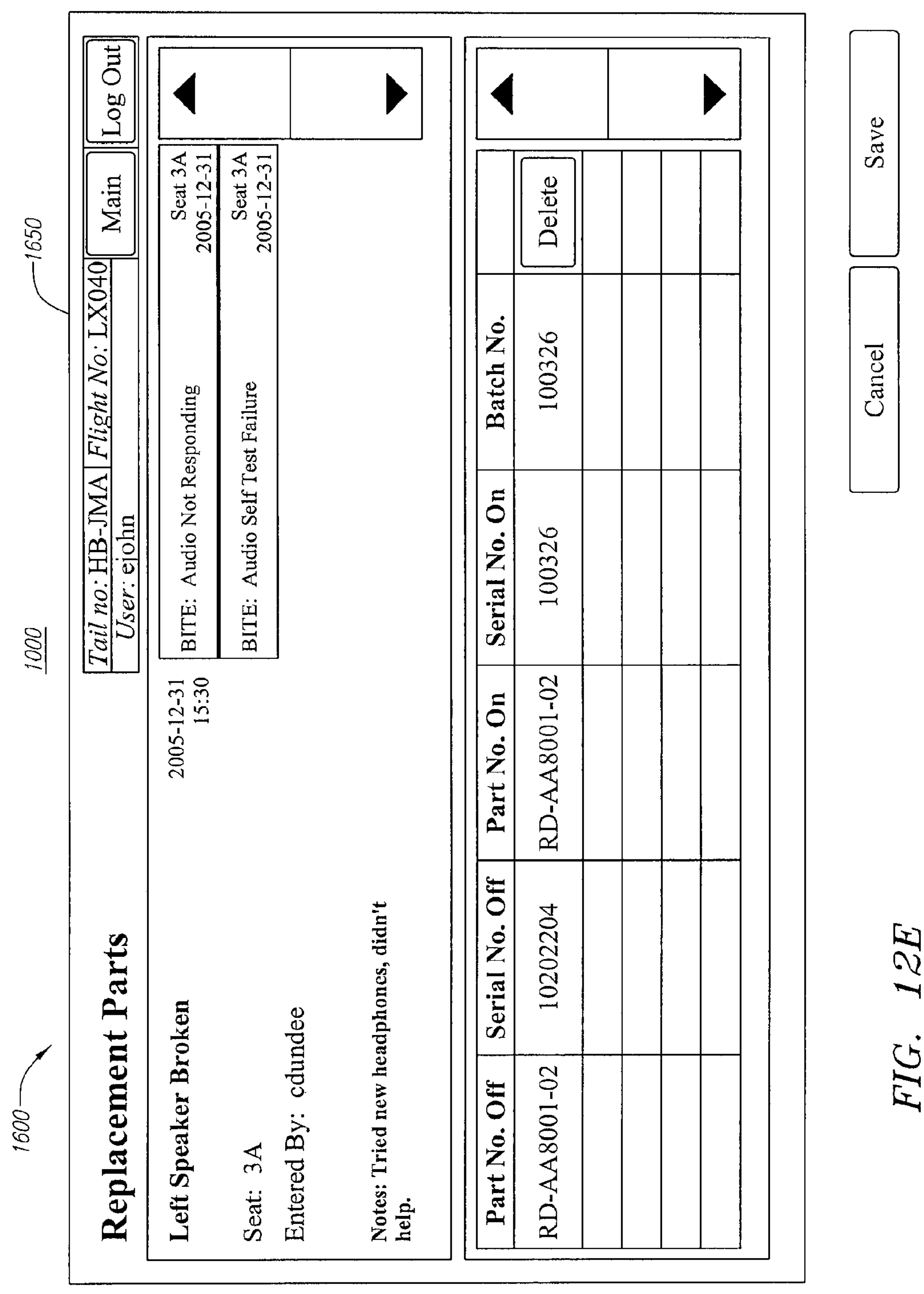
FIG. 12E is an exemplary detail drawing illustrating still another alternative embodiment of the electronic cabin log book of FIG. 12A, wherein the electronic cabin log book can present replacement part information for correlating repair data and inventory data.

Additionally, and/or alternatively, the user interface system 1650 can comprise a maintenance user interface system for use by the maintenance crew as illustrated in FIGS. 12C-E. The maintenance user interface system of FIG. 12C is shown as enabling a maintenance crew member to view the observed fault data received from the passenger vehicle 390. Advantageously, the maintenance user interface system can permit the observed fault data to be simultaneously presented adjacent to BITE defect data. The screen arrangement can facilitate associations between the observed fault data and the BITE defect data.

FIG. 12D illustrates a manner by which the user interface system 1650 can present a maintenance action description entry screen. The maintenance action description entry screen is shown as supporting use of standardized maintenance action descriptions. Turning to FIG. 12E, the user interface system 1650 is illustrated as presenting replacement part information. The replacement part information thereby can be stored in the database system 1100 (shown in FIG. 1) prior to departure of the passenger vehicle 390. Advantageously, the user interface system 1650 can facilitate correlation of the replacement part information with repair data and/or inventory data.

Figure 13A:
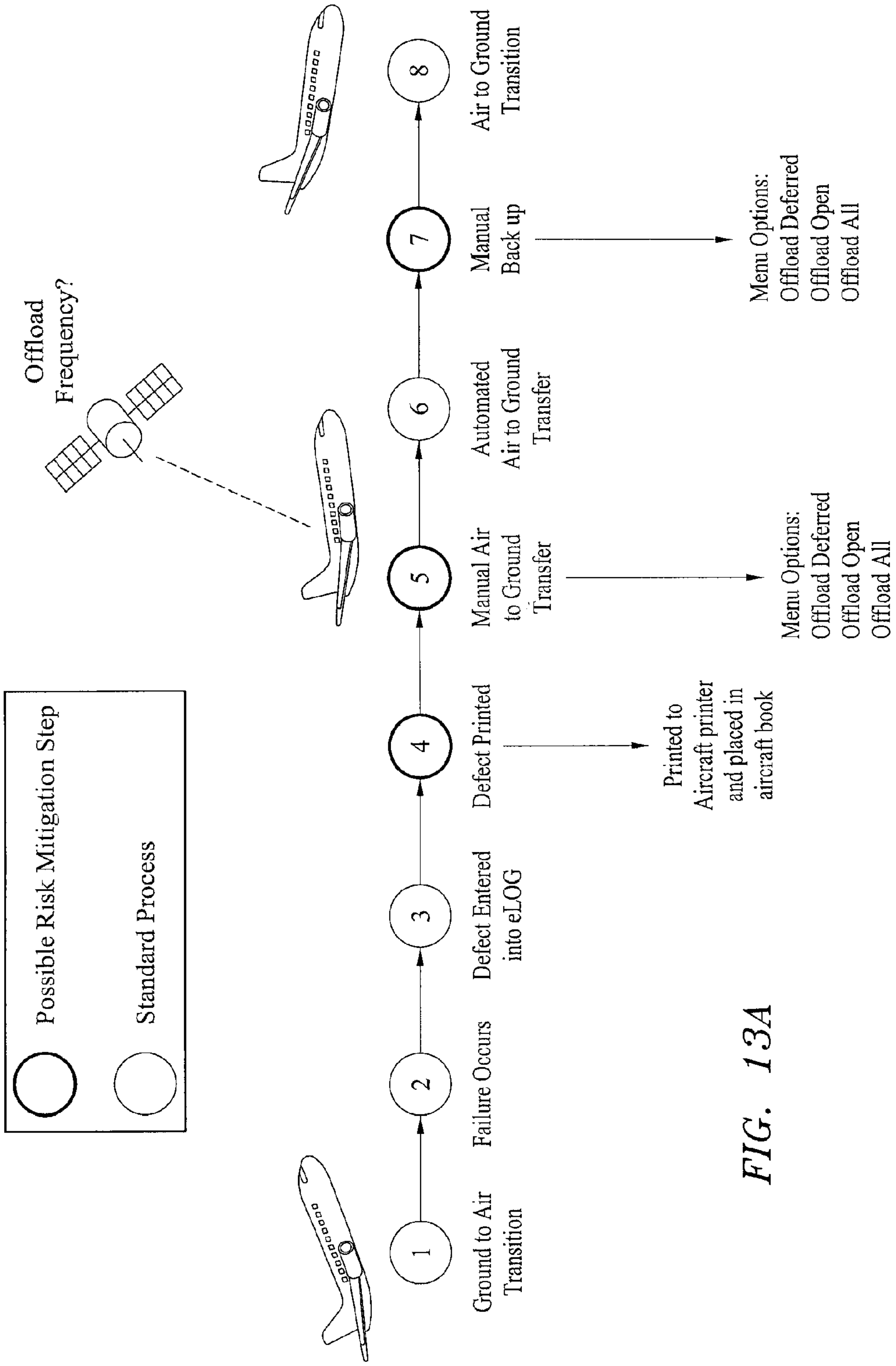
FIG. 13A is an exemplary detail drawing illustrating an embodiment of a maintenance process initiated via the performance data monitoring and analysis system of FIG. 1, wherein the maintenance process is initiated by a failure that occurs during travel.

FIG. 13A illustrates an exemplary maintenance process that can be initiated via the data monitoring and analysis system 1000 if a system failure occurs during travel. The passenger vehicle 390 is shown, at 1, as departing for travel, during which a failure occurs, at 2. Upon observing the failure, a passenger traveling aboard the passenger vehicle 390 can enter the observed failure, at 3, via the electronic cabin log book 1600 (shown in FIGS. 12A-E). As a possible risk mitigation step, the observed defect can be printed to an aircraft printer and placed in an aircraft log book, at 4. Alternatively, and/or additionally, download data 1510 (shown in FIG. 1) associated with the observed defect can be manually transmitted, at 5, from the passenger vehicle 390 to the data monitoring and analysis system 1000 in the manner set forth in more detail above with reference to FIGS. 1 and 2A-C.

The transmission of the download data 1510 to the data monitoring and analysis system 1000 can comprise a possible risk mitigation step and can be performed in a real-time manner and/or in a time-delayed manner. Similarly, the download data 1510 associated with the observed defect can be transmitted alone and/or in combination with download data 1510 associated with one or more other observed defects. As desired, the download data 1510 associated with the observed defect likewise can be automatically transmitted, at 6, from the passenger vehicle 390 to the data monitoring and analysis system 1000. At 7, the electronic cabin log book 1600 can manually back up the previously-transmitted download data 1510 associated with the observed defect. Travel is shown, at 8, as being complete.

Figure 13B:
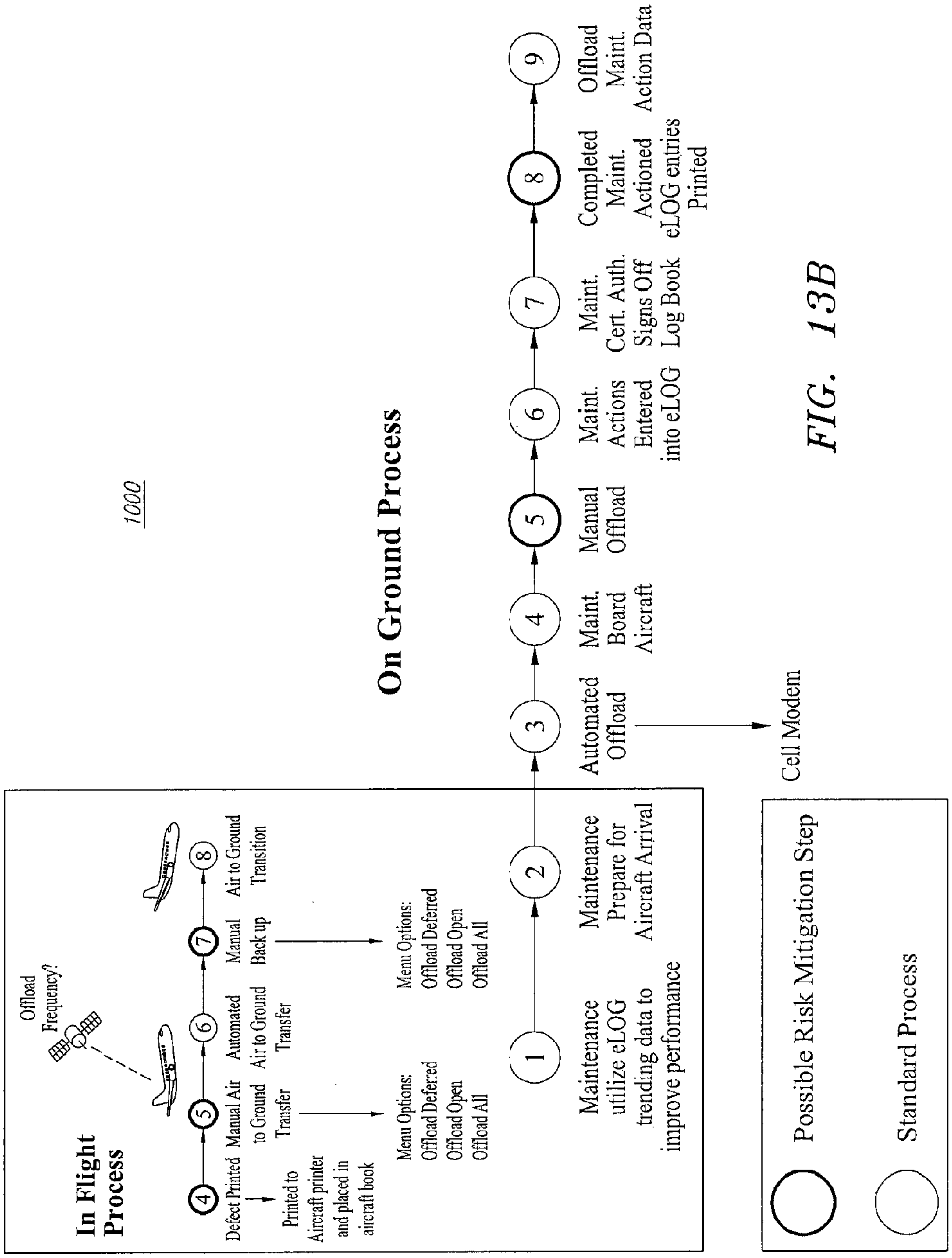
FIG. 13B is an exemplary detail drawing illustrating an alternative embodiment of the maintenance process of FIG. 13A, wherein the maintenance process includes a ground process for resolving the failure.

An exemplary maintenance process for resolving the system failure that occurred during travel is shown in FIG. 13B. Prior to arrival of the passenger vehicle 390, the maintenance crew, at 1, can utilize the maintenance user interface system to receive trending data to improve performance and, at 2, can otherwise prepare for aircraft arrival. As the passenger vehicle 390 approaches the travel destination, the download data 1510 associated with the observed defect can be received, at 3, by the data monitoring and analysis system 1000. At 4, the maintenance crew can board the passenger vehicle 390 and, as desired, manually offload the download data 1510, including the download data 1510 associated with the observed defect, at 5.

The maintenance crew, at 6, can further utilize the maintenance user interface system to enter maintenance actions taken to resolve the observed defect. The maintenance actions can be certified, at 7, and printed via the maintenance user interface system, at 8. Once the observed defect has been resolved, maintenance action data can be offloaded to the data monitoring and analysis system 1000, at 9. The maintenance action data can be offloaded to the data monitoring and analysis system 1000 in any conventional manner. Preferably, the maintenance action data is offloaded to the data monitoring and analysis system 1000 in the manner by which the download data is transmitted to the data monitoring and analysis system 1000 as discussed in more detail above with reference to FIGS. 1 and 2A-C.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

What is claimed is:

1. A method for performing data monitoring and analysis via at least one processor, comprising:

establishing communication connections between the at least one processor and a plurality of vehicle information systems installed aboard respective passenger vehicles associated with a vehicle fleet;

receiving performance data accumulated by the vehicle information systems via the communication connections;

validating the received performance data;

parsing the validated performance data;

consolidating the parsed performance data for the vehicle fleet;

applying the consolidated performance data to generate an aggregate report for the vehicle information systems; and applying selected subsets of the consolidated performance data to generate at least one lower-level report for analyzing a performance aspect of the vehicle information systems, wherein the performance data accumulated by the fleet is presented in real-time for facilitating onsite maintenance as needed.

2. The method of claim 1, wherein said establishing the communication connection comprises establishing a wireless communication connection with the vehicle information system.

3. The method of claim 2, wherein said establishing the wireless communication connections includes establishing a wireless communication connection with a selected vehicle information system via an intermediate communication system.

4. The method of claim 3, wherein said establishing the wireless communication connection comprises establishing the wireless communication connection via the intermediate communication system that is selected from a group consisting of a cellular modem communication system, a broadband satellite communication system, an ARINC Communications Addressing & Reporting System, and a Data 3 communication system.

5. The method of claim 1, wherein said receiving the performance data includes continuously receiving the performance data from the vehicle information systems.

6. The method of claim 1, wherein said receiving the performance data includes manually receiving the performance data from a selected vehicle information system.

7. The method of claim 1, wherein said receiving the performance data includes receiving the performance data selected from a group consisting of aircraft Built In Test Equipment (BITE) data, repair shop data, original equipment manufacturer (OEM) flight hour data, and observed fault and rectification data, and flight information from an external website.

8. The method of claim 1, wherein said receiving the performance data includes receiving travel information from an external website.

9. A computer program product for performing data monitoring and analysis, the computer program product being encoded on one or more machine-readable storage media and comprising:

instruction for establishing communication connections with a plurality of vehicle information systems installed aboard respective passenger vehicles associated with a vehicle fleet;

instruction for receiving performance data accumulated by the vehicle information systems via the communication connections;

instruction for validating the received performance data;

instruction for parsing the validated performance data;

instruction for consolidating the parsed performance data for the vehicle fleet;

instruction for applying the consolidated performance data to generate an aggregate report for the vehicle information systems; and instruction for applying selected subsets of the consolidated performance data to generate at least one lower-level report for analyzing a performance aspect of the vehicle information systems, wherein the performance data accumulated by the fleet is presented in real-time for facilitating onsite maintenance as needed.

10. A system for performing data monitoring and analysis, comprising:

a loadscript system, comprising at least one processor, for establishing communication connections with a plurality of vehicle information systems installed aboard respective passenger vehicles associated with a vehicle fleet, said loadscript system receiving, validating, and parsing performance data accumulated by the vehicle information systems via the communication connections; and a database system for consolidating the parsed performance data for the vehicle fleet, said database system applying the consolidated performance data to generate an aggregate report for the vehicle information systems and applying selected subsets of the consolidated performance data to generate at least one lower-level report for analyzing a performance aspect of the vehicle information systems, wherein the performance data accumulated by the fleet is presented in real-time for facilitating onsite maintenance as needed.

11. The system of claim 10, wherein said database system comprises an Aircraft Ground Information System (AGIS) code database system.

12. The system of claim 10, wherein said receiving the performance data is selected from a group consisting of aircraft Built In Test Equipment (BITE) data, repair shop data, original equipment manufacturer (OEM) flight hour data, and observed fault and rectification data, and flight information from an external website.

13. The system of claim 10, wherein the performance data includes travel information received from an external website.

14. The system of claim 10, wherein the vehicle information systems comprise passenger entertainment systems.

15. The system of claim 10, wherein the passenger vehicles comprise aircraft.

16. A vehicle information system suitable for installation aboard a passenger vehicle and for communicating with the system of claim 10.

17. The vehicle information system of claim 16, wherein the vehicle information system comprises a passenger entertainment system.

18. The vehicle information system of claim 16, wherein the vehicle information system comprises an in-flight entertainment system.

19. A passenger vehicle comprising vehicle information system suitable for installation aboard a passenger vehicle and for communicating with the system of claim 10.

20. The passenger vehicle of claim 19, wherein the passenger vehicle is selected from a group consisting of an aircraft, an automobile, a bus, a recreational vehicle, a boat, and a train.

* * * * *